United States Patent
Chamieh et al.

(10) Patent No.: US 10,831,753 B2
(45) Date of Patent: *Nov. 10, 2020

(54) QUERY PLAN GENERATION AND EXECUTION IN A RELATIONAL DATABASE MANAGEMENT SYSTEM WITH A TEMPORAL-RELATIONAL DATABASE

(71) Applicant: MUREX S.A.S, Paris (FR)

(72) Inventors: Fady Chamieh, Paris (FR); Bilal El Tayara, Bourg La Reine (FR); Philippe Bourgau, La-Celle-St-Cloud (FR)

(73) Assignee: MUREX S.A.S., Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/596,520

(22) Filed: Oct. 8, 2019

(65) Prior Publication Data

US 2020/0034364 A1 Jan. 30, 2020

Related U.S. Application Data

(63) Continuation of application No. 16/231,380, filed on Dec. 21, 2018, now Pat. No. 10,496,644, which is a continuation of application No. PCT/EP2018/055503, filed on Mar. 6, 2018.

(60) Provisional application No. 62/489,935, filed on Apr. 25, 2017.

(51) Int. Cl.
*G06F 16/00* (2019.01)
*G06F 16/2453* (2019.01)
*G06F 16/2452* (2019.01)
*G06F 16/28* (2019.01)
*G06F 16/901* (2019.01)

(52) U.S. Cl.
CPC .. *G06F 16/24542* (2019.01); *G06F 16/24524* (2019.01); *G06F 16/284* (2019.01); *G06F 16/9024* (2019.01)

(58) Field of Classification Search
CPC ......... G06F 16/24542; G06F 16/24524; G06F 16/284; G06F 16/9024
See application file for complete search history.

(56) References Cited

U.S. PATENT DOCUMENTS

| | | |
|---|---|---|
| 5,873,075 A | 2/1999 | Cochrane et al. |
| 8,191,052 B2 | 5/2012 | Chamieh et al. |
| 9,507,755 B1 | 11/2016 | Kerzner |
| 2004/0117359 A1 | 6/2004 | Snodgrass et al. |
| 2005/0055384 A1* | 3/2005 | Ganesh ............ G06F 16/24552 |
| 2012/0166417 A1 | 6/2012 | Chandramouli et al. |
| 2014/0039952 A1 | 2/2014 | Nesamoney et al. |
| 2015/0169683 A1 | 6/2015 | Chandramouli et al. |

(Continued)

OTHER PUBLICATIONS

Amo S.D., et al., "Incremental Maintenance of DataWarehouses Based on Past Temporal Logic Operators," Journal of Universal Computer Science, 2004, vol. 10 (9), pp. 1035-1064.

(Continued)

*Primary Examiner* — Tarek Chbouki
(74) *Attorney, Agent, or Firm* — Nicholson De Vos Webster & Elliott, LLP

(57) ABSTRACT

According to one aspect, a query plan is generated for a newly submitted structured query language (SQL) query received by a relational database management system by reusing at least part of an existing query plan that is being kept in memory after execution.

30 Claims, 19 Drawing Sheets

(56) References Cited

U.S. PATENT DOCUMENTS

2017/0060695 A1  3/2017  Clare et al.
2018/0129708 A1  5/2018  Beavin et al.

OTHER PUBLICATIONS

Arasu A., "Continuous Quries Over Data Streams," The Department of Computer Science, Feb. 2006, pp. 1-196.
Arasu A., et al., "The CQL Continuous Query Language: Semantic Foundations and Query Execution," Stanford University, 2006, 32 pages.
Armbrust M., et al., "Deep Dive into Spark SQL's Catalyst Optimizer," Apr. 13, 2015, downloaded from https://databricks.com/blog/2015/04/13/deep-dive-into-spark-sqls-catalyst-optimizer.html on Dec. 6, 2018, 10 pages.
Babu S., "Adaptive Query Processing in Data Stream Management Systems," Department of Computer Science and the Committee on Graduate Studies of Stanford University, Sep. 2005, pp. 1-220.
Bhatotia P., et al., "Large-scale Incremental Data Processing with Change Propagation," Computer Science Department, Jun. 2011, 6 pages.
Bussche J.V.D., et al., "Translating SQL into the Relational Algebra," downloaded from httpscs.ulb.ac.bepublic_mediateachinginfoh417sql2alg_eng.pdf on Oct. 2016, pp. 1-19.
Chandramouli B., et al., "The Trill Incremental Analytics Engine," Microsoft Research Technical Report MSR-TR-2014-54, Apr. 2014, 14 pages.
Condie T.,et al., "MapReduce Online," Electrical Engineering and Computer Sciences University of California, Berkeley, Oct. 9, 2009, 15 pages.
Diwan A.A., et al., "Scheduling and Caching in Multi-Query Optimization," International Conference on Management of Data COMAD, Delhi, India, Dec. 14-16, 10 pages.
"Execution Plan Caching and Reuse," Mar. 10, 2012, 6 pages.
Hellerstein J.M., et al., "Anatomy of a Database System," 2011, 54 pages.
Hellerstein J.M., et al., "Architecture of a Database System," Foundations and Trends in Databases, 2007, vol. 1 (2), pp. 141-259.
International Search Report and Written Opinion for Application No. PCT/EP2018/055503, dated May 7, 2018, 13 pages.
International Standard, "Information technology—Database languages—SQL—Part 2: Foundation (SQL/Foundation)," Fourth edition, Dec. 15, 2011, pp. 1-1448.
Kajic R., "Evaluation of the Stream Query Language CQL," Department of Information Technology, May 2010, 32 pages.
Kifer M., et al., "Database Systems: An Application-Oriented Approach," downloaded from http://testbank360.eu/solution-manual-database-systems-2nd-edition-kifer, 17 pages.
LearnNowOnline, "The Stages of Query Complication," downloaded from http://blogs.learnnowonline.com/2013/11/13/the-stages-of-query-complication/ on Apr. 23, 2015, 6 pages.
Logothetis D., et al., "Stateful Bulk Processing for Incremental Analytics," Indianapolis, SoCC'10, Jun. 10-11, 2010, 12 pages.
Mokbel M.F., "Continuous Query Processing in Spatio-temporal Databases," Department of Computer Sciences, Purdue University, 2004, 10 pages.
Mokbel M.F., et al., "Continuous Query Processing of Spatio-temporal Data Streams in PLACE," Proceedings of the Second Workshop on Spatio-Temporal Database Management, Toronto, Canada, Aug. 2004, 8 pages.
Neumann T., "Efficient Generation and Execution of DAG-Structured Query Graphs," 2005, dowloaded from https://pdfs.semanticscholar.org/c8f3/161654536b74be98cdc5fba90b613d5b9d32.pdf on Apr. 25, 2018, 170 pages.
Non-Final Office Action from U.S. Appl. No. 16/231,380, dated Mar. 28, 2019, 23 pages.
Notice of Allowance from U.S. Appl. No. 16/231,380, dated Aug. 8, 2019, 15 pages.
Olston C., et al., "Nova: Continuous Pig/Hadoop Workflows," SIGMOD'11, Jun. 12-16, 2011, 10 pages.
Peng D., et al., "Large-scale Incremental Processing Using Distributed Transactions and Notifications," Proceedings of the 9th USENIX Symposium on Operating Systems Design and Implementation, USENIX, 2010, 14 pages.
Pfoser D., et al., "Incremental Join of Time-Oriented Data," Department of Computer Science, Aalborg University, Denmark, 1999, 12 pages.
Ramnarayan J., et al., "SnappyData: Streaming, Transactions, and Interactive Analytics in a Unified Engine," SIGMOD '16, Jun. 26-Jul. 1, 2016, 12 pages.
Safaeei A.A.,"Caching Intermediate Results for Multiple-Query Optimization," IEEE, Jun. 2007, pp. 412-415.
Snodgrass R.T., et al., "Change Proposal for SQL/Temporal Adding Valid Time-Part A," International Organization for Standardization as an ANSI Experts Contribution, Dec. 1995, pp. 1-36.
Wikipedia, "Apache Hadoop," downloaded from https://en.wikipedia.org/wiki/Apache_Hadoop on Mar. 16, 2016, 14 pages.
Wikipedia, "Business Intelligence," downloaded from https://en.wikipedia.org/wiki/Business_intelligence on Mar. 5, 2017, 12 pages.
Wikipedia, "Complex event processing," downloaded from https://en.wikipedia.org/wiki/Complex_event_processing on Mar. 16, 2016, 8 pages.
Wikipedia, "Hybrid Transactional/Analytical Processing (HTAP)," downloaded from https://en.wikipedia.org/wiki/Hybrid_Transactional/Analytical_Processing_(HTAP) on Mar. 16, 2016, 2 pages.
Wikipedia, "Online analytical processing," downloaded from https://en.wikipedia.org/wiki/Online_analytical_processing on Mar. 16, 2016, 7 pages.
Wikipedia, "Power BI"downloaded from https://en.wikipedia.org/w/index.php?title=Power_BI&oldid=740724774 on Nov. 28, 2016, 2 pages.
Yang J., et al., "Incremental Computation and Maintenance of Temporal Aggregates," Proceedings 17th International Conference on Data Engineering, Apr. 2001, 24 pages.
Yang J., et al., "Maintaining Temporal Views Over Non-Temporal Information Sources for Data Warehousing," Computer Science Department Stanford University, 1998, pp. 1-35.
Yang J., et al., "Temporal View Self-Maintenance in a Warehousing Environment," Computer Science Department, Stanford University, 1999, 36 pages.
Communication pursuant to Article 94(3) EPC for EP Application No. 18711857.5, dated Sep. 18, 2019, 7 pages.
International Preliminary Report on Patentability PCT Application No. PCT/EP2018/055503, dated Nov. 7, 2019, 8 pages.
Rybak, "Problems With Storing Temporal Data", 2006, 20 pages, downloaded from http://yadda.icm.edu.pl/baztech/download/import/contents/BPB2-0026-0036httpwww_wi_pb_edu_plplikinaukazeszytyz2rybak-full.pdf on Mar. 3, 2020.
Snodgrass, "Temporal Databases", Oct. 1986, 37 pages, downloaded from https://www.researchgate.net/publication/2960699_Temporal_Databases on Mar. 3, 2020.
Chen et al., "NiagaraCQ: A Scalable Continuous Query System for Internet Databases", ACM SIGMOD Record, vol. 29, No. 2, Jun. 2000, 12 pages.
Dalvi et al., "Pipelining in MultiQuery Optimization", Journal of Computer and System Sciences, vol. 66, No. 4, Jun. 2003, 12 pages.
Finkelstein, Sheldon, "Common Expression Analysis in Data base Applications", In Proceedings of the ACM-SIGMOD International Conference on the Management of Data, 1982, pp. 235-245.
Goldstein et al., "Optimizing Queries Using Materialized Views: A Practical, Scalable Solution", Proceedings of the 2001 ACM SIGMOD international conference on Management of data, vol. 30, 2001, pp. 1-12.
Gupta et al., "Aggregate-Query Processing in Data Warehousing Environments", Proceedings of the 21st VLDB Conference, Zurich, Swizerland, 1995, pp. 358-369.
Pirahesh et al., "Extensible/Rule Based Query Rewrite Optimization in Starburst", IBM Almaden Research Center, ACM SIGMOD, 1992, pp. 39-48.

(56) References Cited

OTHER PUBLICATIONS

Roy et al., "Efficient and Extensible Algorithms for Multi Query Optimization", ACM SIGMOD Record, vol. 29, No. 2, Nov. 1999, 12 pages.
Sellis, Timos K., "Multiple-Query Optimization", ACM Transactions on Database Systems, vol. 13, No. 1, Mar. 1988, pp. 23-52.
Yang et al., "Algorithms for Materialized View Design in Data Warehousing Environment", Proceedings of the 23rd VLDB Conference, Athens, Greece, 1997, pp. 136-145.
Zaharioudakis et al., "Answering Complex SQL Queries Using Automatic Summary Tables", IBM Almaden Research Center, ACM SIGMOD, May 2000, pp. 105-116.
Liarou E., et al., "A Column-oriented Data Stream Engine," 1 page, downloaded on Apr. 26, 2016.
Olston C., "Modeling and Scheduling Asynchronous Incremental Workflows," 13 pages, downloaded from http://infolab.stanford.edu/~olston/publications/asynchronousWorkflowsTR.pdf on Apr. 26, 2016.

* cited by examiner

"CUSTOMERS" TABLE AT TIME T=0

| CustomerID (INT) | Name (VARCHAR) | PostalCode (VARCHAR) | valid_from (TIMESTAMP) | valid_to (TIMESTAMP) |
|---|---|---|---|---|
| 1 | Smith | 10001 | 1 | infinity |
| 2 | Doe | 10002 | 1 | infinity |

Fig. 3A

"ORDERS" TABLE AT TIME T=0

| OrderID (INT) | CustomerID (INT) | Price (DOUBLE) | Quantity (DOUBLE) | valid_from (TIMESTAMP) | valid_to (TIMESTAMP) |
|---|---|---|---|---|---|
| 1 | 1 | 20 | 2 | 1 | infinity |
| 2 | 2 | 50 | 5 | 1 | infinity |

Fig. 3B select * from CUSTOMERS, ORDERS where ORDERS.CustomerID=CUSTOMERS.CustomerID and CUSTOMERS.PostalCode=10001 and ORDERS.Quantity>4

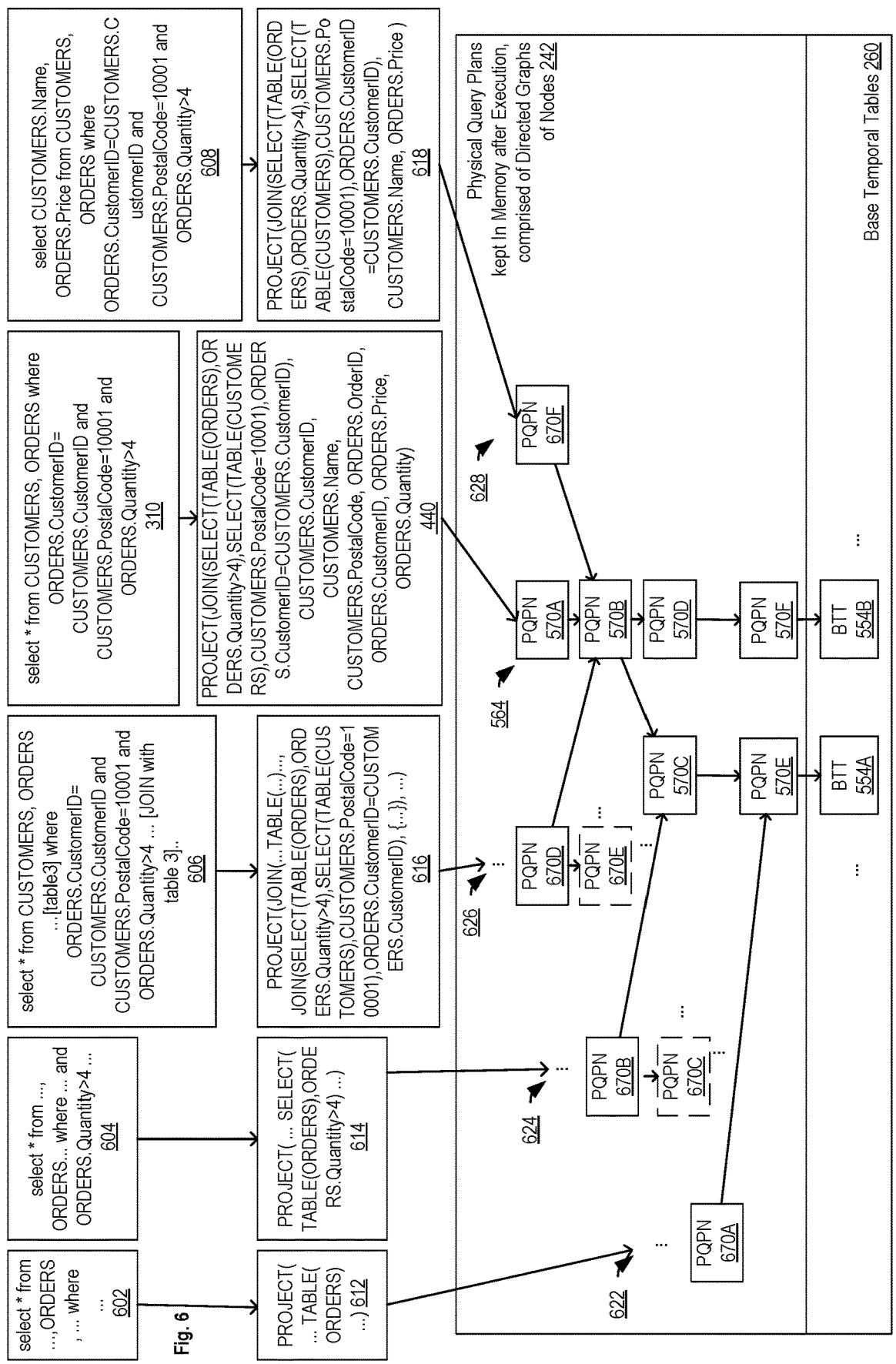

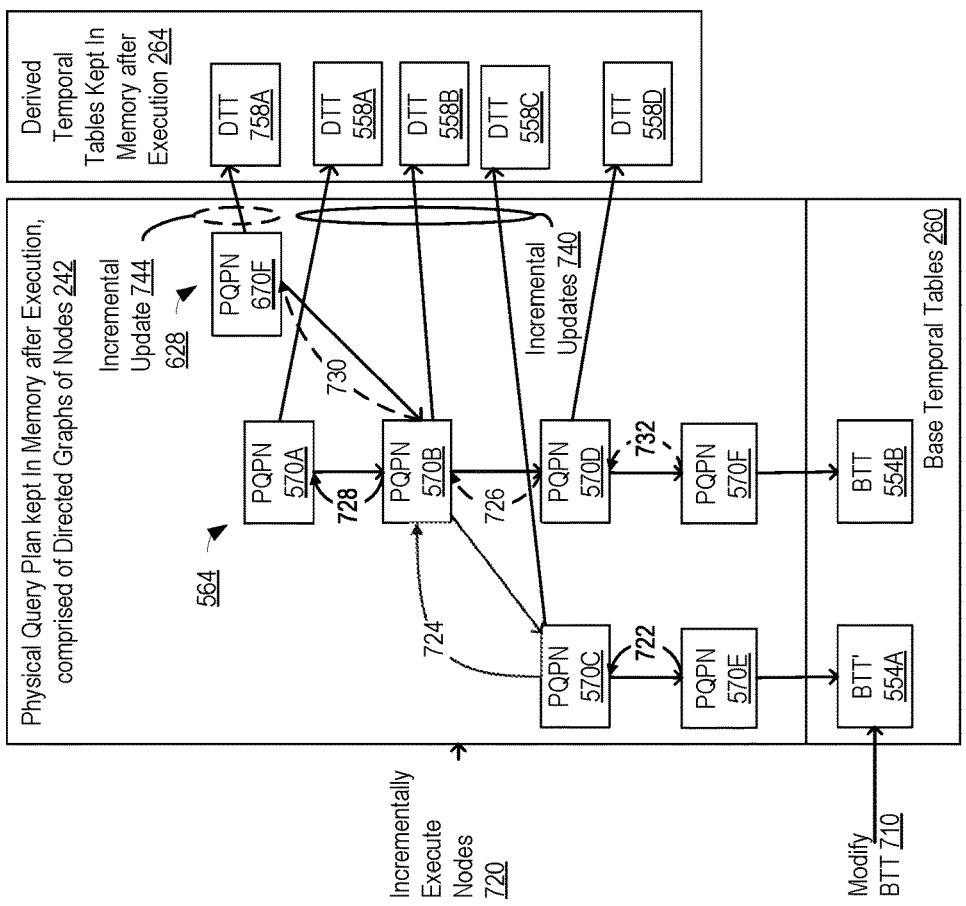

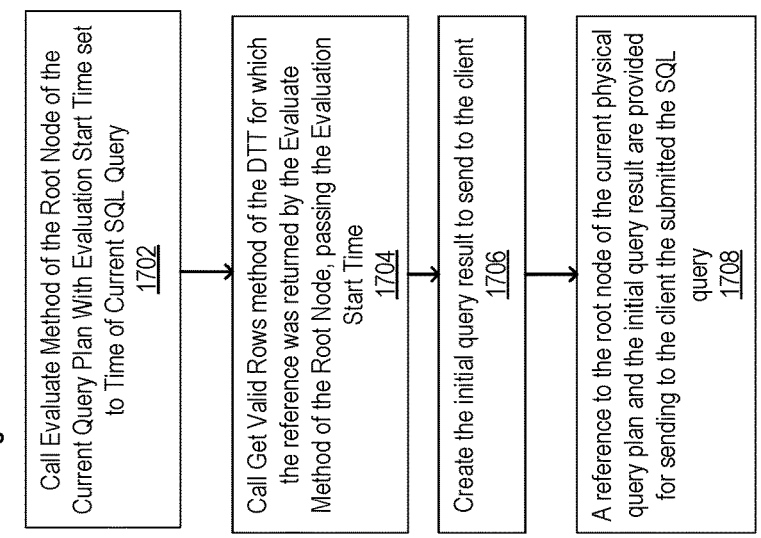
Fig. 17
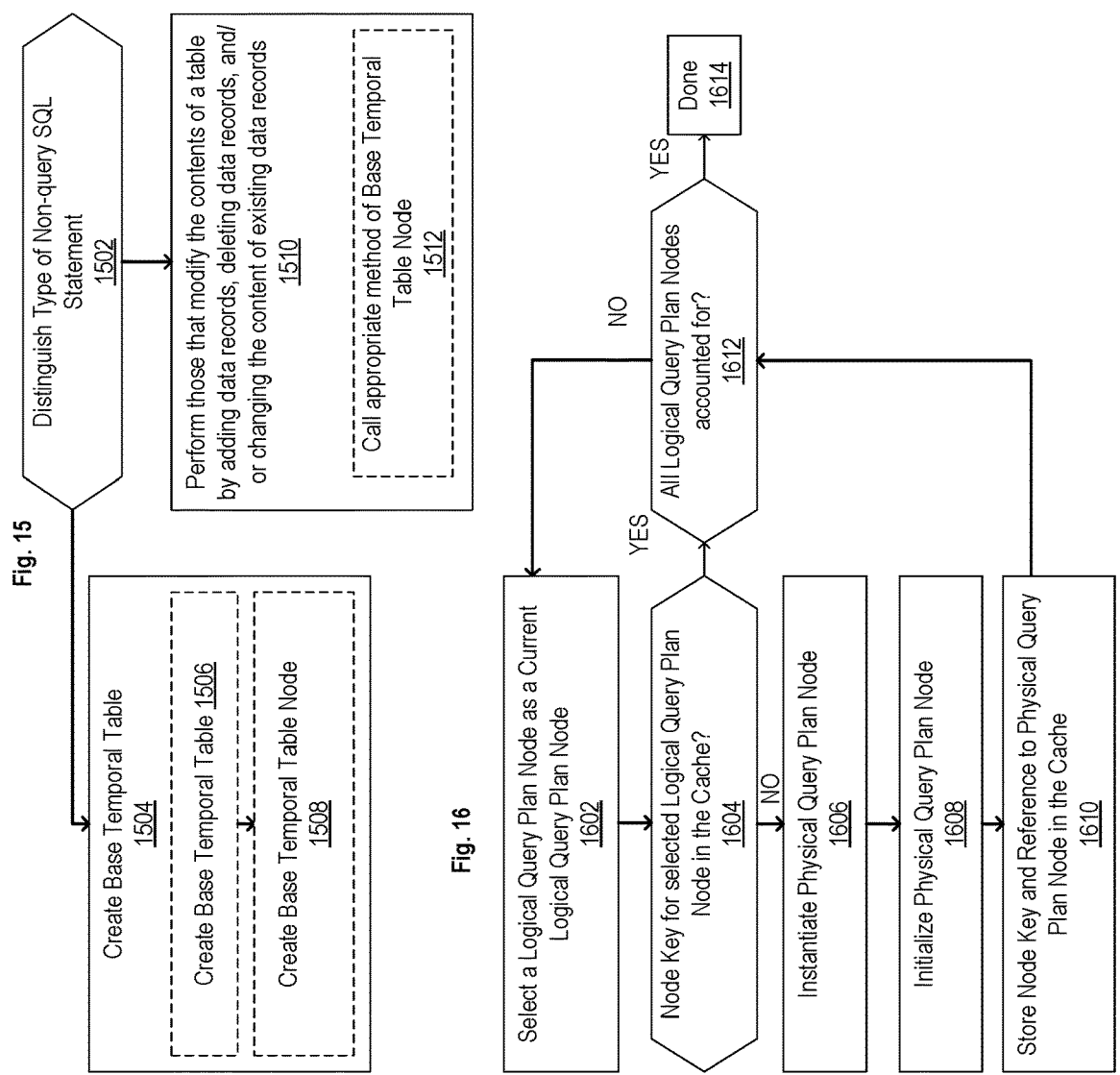
Fig. 15
Fig. 16

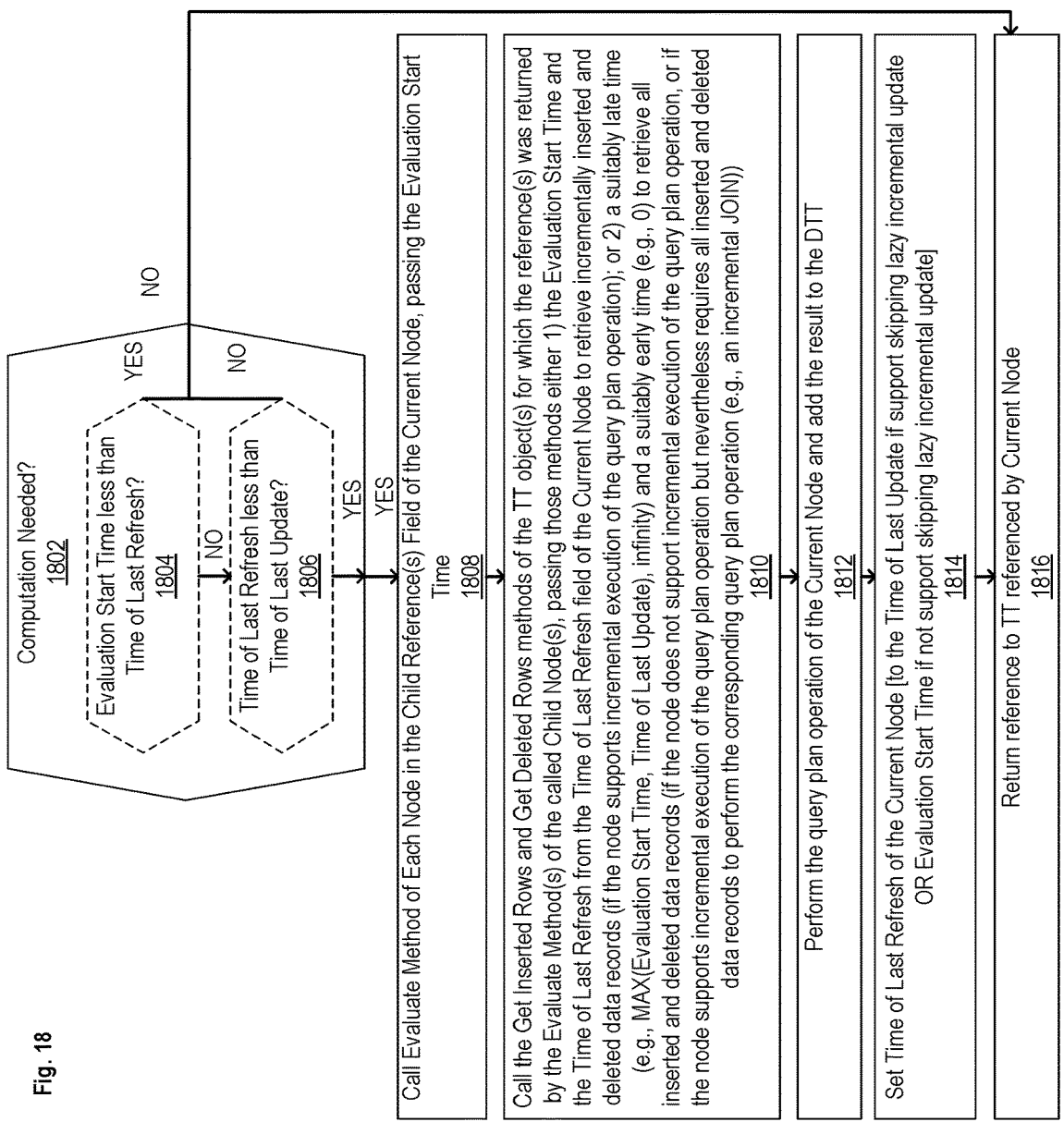

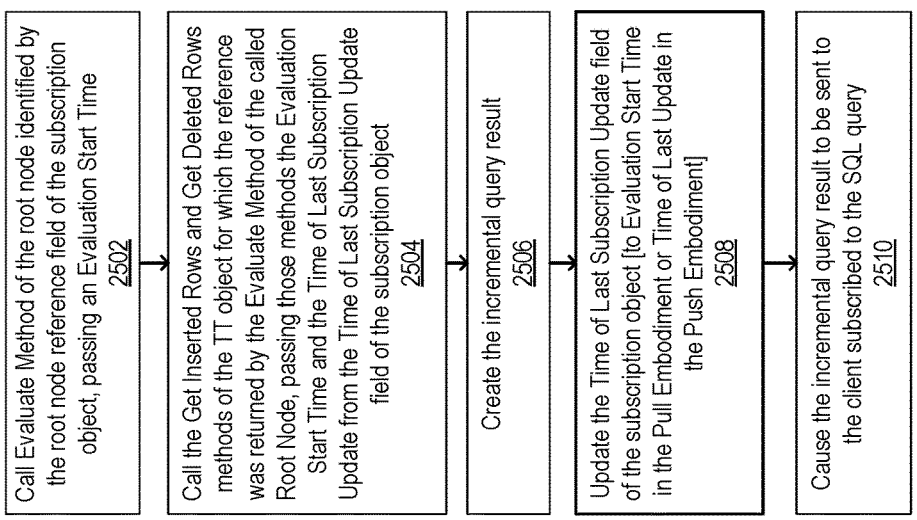
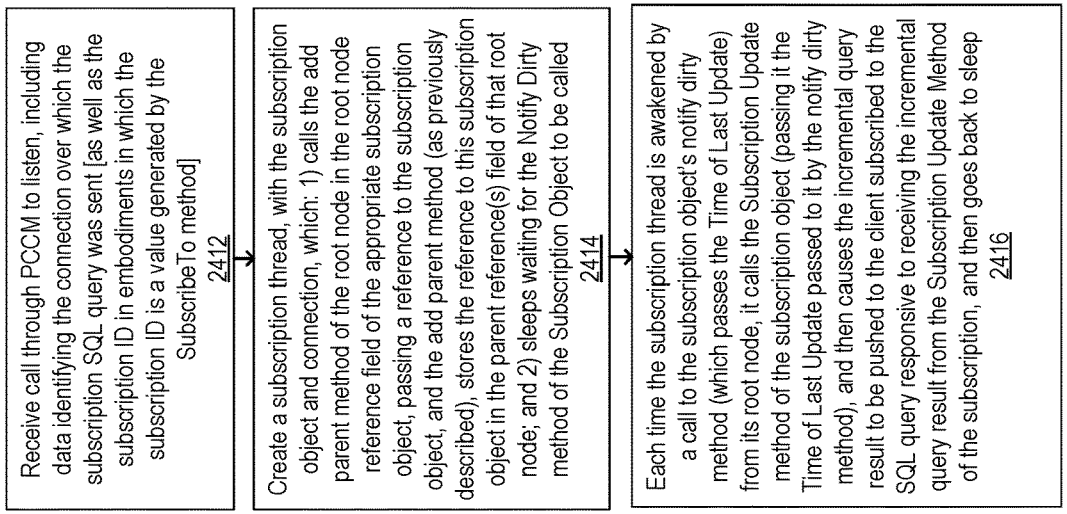
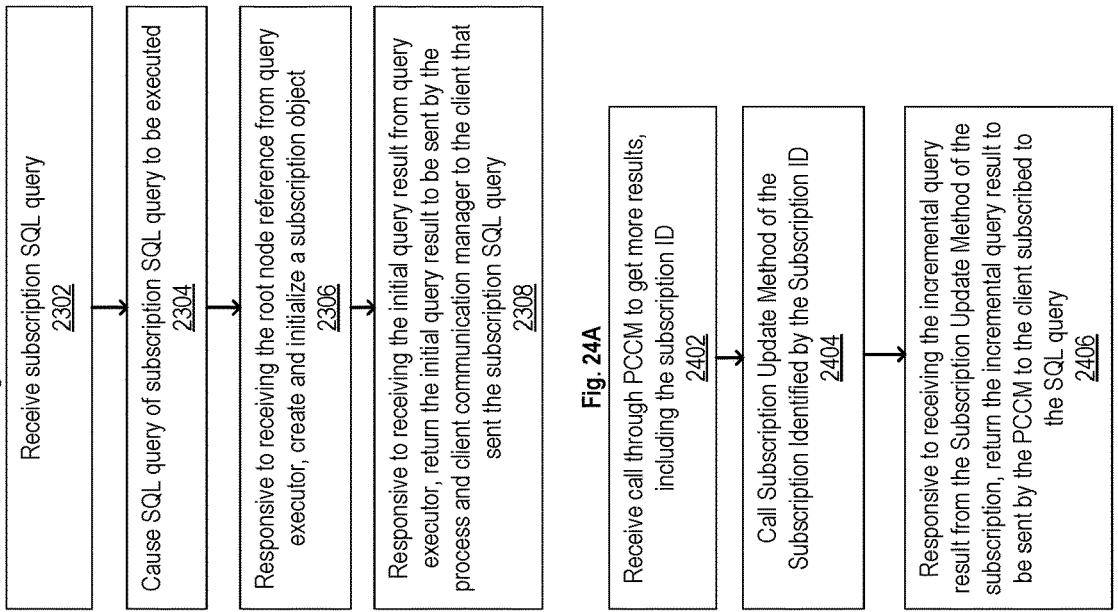

QUERY PLAN GENERATION AND EXECUTION IN A RELATIONAL DATABASE MANAGEMENT SYSTEM WITH A TEMPORAL-RELATIONAL DATABASE

CROSS-REFERENCE TO RELATED APPLICATIONS

This application is a continuation of U.S. application Ser. No. 16/231,380, filed Dec. 21, 2018, which is a continuation of International Application No. PCT/EP2018/055503, filed Mar. 6, 2018, which claims the benefit of U.S. Provisional Application No. 62/489,935, filed Apr. 25, 2017, which are hereby incorporated by reference.

FIELD

Embodiments of the invention relate to the field of databases; and more specifically, to relational database management systems.

BACKGROUND

Enterprise software systems are typically sophisticated, large-scale systems that support many, e.g., tens, hundreds or thousands, of concurrent users. Examples of enterprise software systems include financial planning systems, budget planning systems, order management systems, inventory management systems, sales force management systems, business intelligence tools, enterprise reporting tools, project and resource management systems, and other enterprise software systems.

One approach to enterprise software systems is to develop a custom user interface on top of custom hardcoded software (e.g., U.S. Pat. No. 8,191,052). In such an approach, the custom user interface has limited flexibility in terms of reports and data exploration, while the custom hardcoded software has insufficient performance when dealing with large volumes of data.

An alternative approach to enterprise software systems is the use of generic Business Intelligence, or BI, tools to interface, through zero or more software layers, with a multi-dimensional in-memory data store, an "OLAP" cube. The BI front-end "speaks" the language MDX; i.e., it transmits MDX expressions to the OLAP cube, which interprets the MDX and provides responsive query results to the BI front-end. Generic BI tools may be used to prepare and aggregate individual reports and analyses by executing queries on underlying data sources, and to present those reports and analyses to a user-accessible format such as a BI dashboard environment. However, the use of a generic BI tool does not provide "near real-time" performance when dealing with large volumes of data (where "near real-time" refers to the time delay introduced, by data processing and/or network transmission, between the occurrence of an event and the use of the processed data, such as for display).

As is known in the art, a relational database management system (RDBMS) is a database management system (DBMS) that is based on the relational model. The RDBMS provides an integrated set of computer software that allows users to interact with one or more databases and provides access to all the data contained in the databases (restrictions may exist that limit access to particular data). The RDBMS provides various functions that allow data entry, storage and retrieval of large quantities of information and provides ways to manage how that information is organized. RDBMSs typically support queries expressed in Structured Query Language (SQL). On receiving an SQL query, an RDBMS traditionally creates a query plan to determine how the SQL query may be executed on one or more of the database tables to retrieve a result satisfying the query. The query plan identifies the one or more database tables which need to be accessed, the operations which need to be applied to the database tables (and often the data therein), and the order in which the operations must occur. A query plan can be optimized for certain parameters, typically to minimize query execution time and/or the total amount of data accessed. A query plan is executed to determine a query result, where "executed" is defined herein to include various forms of determining a query result from a query plan (e.g., query plan operators, implemented by functions, methods or other executable code, are executed, interpreted, etc.). In other words, a query plan (or query execution plan) generated for an SQL query in a relational database management system is an ordered set of operations to access and operate on tables (and often the data therein) from one or more databases managed by the relational database management system.

As is known in the art, a temporal database contains time-referenced, or time stamped, data records. A temporal-relational database includes temporal tables, where each such temporal table is to store data in data records. For each temporal table, the data records of that temporal table are each composed of a number of fields, one or more of which stores data and one or more of which stores timestamp(s) for that data record. Temporal tables are designed such that data records stored in the temporal tables are not overwritten. Rather, a change to data in a data record in a temporal table is performed by: 1) changing the timestamp of the data record which would otherwise have been overwritten or modified to reflect the time of the change; and 2) creating an additional data record that reflects the change. Because temporal tables capture the changes in their data records over time, a "delta" of the temporal table between two times can be determined. The data stored in the temporal table is sometimes referred to as the contents of the temporal table and is distinguishable from the schema of the temporal table. Taking a logical view, a temporal table can be thought of as a table with rows and columns, where a header of the table defines the schema of the table, each of the rows (which store the contents of the temporal table) is a data record, each intersection of a column and a row is a field of one of the data records, and one or more of the columns stores the above discussed timestamp(s). However, the contents of temporal tables may be stored in different ways (e.g., a "row-oriented" organization that mimics the above discussed logical view (sometimes referred to as "row-oriented" temporal tables), a "column-oriented" (also known as a "columnar") organization (sometimes referred to as "column-oriented" or "columnar" temporal tables), etc.). Implementations of the typical relational database query plan operators (e.g., PROJECT, JOIN, SELECT) that operate on temporal tables are known in the art (e.g., D. Pfoser and C. S. Jensen, "Incremental Join of Time-Oriented Data," In Proc. 11$^{th}$ Intl. Conf. Scientific and Statistical Database Management, pages 232-243, 1999; Jun Yang and Jennifer Widom, "Maintaining Temporal Views Over Non-Temporal Information Sources For Data Warehousing," In EDBT '98 Proc. 6$^{th}$ Int. Conf. on Extending Database Technology: Advances in Database Technology, pages 389-403, 1998). Such implementations when applied on input temporal table(s) can sometimes determine and operate on just the "deltas," thereby avoiding the need to re-execute operations on the totality of the data records in the temporal table(s). In the context of temporal-relational tables, a query plan (or query execution plan) generated for an SQL query by a relational database management system is an ordered set of temporal-relational operations used to access and operate on one or more temporal tables (and, often, the data therein) of one or more temporal-relational database(s) managed by the relational database management system.

SUMMARY

Query plan generation and execution in a relational database management system with a temporal-relational database is described. According to one aspect, a query plan is generated for a newly submitted structured query language (SQL) query received by a relational database management system by incorporating at least part of an existing query plan that is being kept in memory after execution. The relational database management system manages a temporal-relational database comprising temporal tables. The existing query plan comprises a directed graph of nodes connected by edges, the directed graph representing an ordered set of query plan operators that when executed generate a query result for an earlier submitted SQL query that required accessing data from the temporal-relational database. The query plan for the newly submitted SQL query comprises a directed graph of nodes connected by edges representing an ordered set of query plan operators that when executed will generate a query result for the newly submitted SQL query. The directed graph for the newly submitted SQL query is connected by at least one of its edges to at least one node of the directed graph for the earlier submitted SQL query such that the directed graphs share at least one node. At least one of the nodes of each of the directed graphs identifies one of the temporal tables of the temporal-relational database, and at least one of the nodes of each of the directed graphs identifies a temporal table that is kept in memory after execution and that was created to store a result of executing the query plan operator represented by that node.

According to an additional aspect, after modification of a given one of the temporal tables that is part of the temporal-relational database and that at least the existing (or newly submitted) SQL query requires accessing data from, the temporal tables that store the results of executing the query plan operators identified by those of the nodes that are of the existing query plan (or query plan for the newly submitted SQL query) and that depend directly or indirectly upon the node that identifies the given one of the temporal tables are incrementally updated. Then, data that identifies the incremental update to the temporal table identified by a root node of the directed graph of the existing query plan (or query plan for the newly submitted SQL query) is transmitted to a client that submitted the earlier submitted (or newly submitted) SQL query.

According to another aspect, responsive to receiving at a relational database management system a plurality of structured query language (SQL) queries that will require accessing data from temporal tables of a temporal-relational database managed by the relational database management system, the plurality of SQL queries is executed to generate a query result for each. The execution of the plurality of SQL queries includes generating and executing a plurality of query plans that are kept in memory after execution, where each of the plurality of query plans comprises a directed graph of nodes connected by edges. Each of the directed graphs represents an ordered set of query plan operators that, when executed, generates the query result for one of the plurality of SQL queries, and each of the nodes of the directed graphs represents one of the query plan operators. Each of the directed graphs is connected by at least one of its edges to at least one node of another of the directed graphs such that those directed graphs share at least one node, and at least one of the nodes of each of the directed graphs identifies one of the temporal tables of the temporal-relational database. At least one of the nodes shared by the directed graphs identifies a temporal table that is kept in memory after execution and that was created to store a result of executing the query plan operator represented by that node. The execution of the plurality of SQL queries also includes transmitting the query result for each of the plurality of SQL queries to one or more clients that transmitted that SQL query to the relational database management system.

BRIEF DESCRIPTION OF THE DRAWINGS

The invention may best be understood by referring to the following description and accompanying drawings that are used to illustrate embodiments of the invention. In the drawings:

FIG. 3A illustrates an exemplary temporal table named "CUSTOMERS" at time T=0 according to one embodiment.

FIG. 3B illustrates an exemplary temporal table named "ORDERS" at time T=0 according to one embodiment.

FIG. 3C illustrates an exemplary SQL query according to one embodiment.

FIG. 6 illustrates exemplary overlapping physical query plans according to one embodiment.

FIG. 7A is a flow diagram illustrating incrementally updating temporal tables responsive to a modification of at least one of the temporal tables of the temporal-relational database, according to one embodiment.

FIG. 7B illustrates incremental execution and incremental update relative to the exemplary physical query plan 564 and exemplary physical query plan 628 according to one embodiment.

FIG. 15 is a flow diagram for the non-query executor 228 of FIG. 2 according to one embodiment.

FIG. 16 is a flow diagram for the query plan connector 232 of FIG. 2 according to one embodiment.

FIG. 17 is a flow diagram for the query executor 240 according to one embodiment.

FIG. 18 is a flow diagram for the Evaluate method 1212 according to one embodiment.

FIG. 19 is a flow diagram for the method(s) 1322 according to one embodiment.

FIG. 20 is a flow diagram for the Notify Dirty method 1220 according to one embodiment.

FIG. 23 is a flow diagram for the Subscribe To method 2222 according to one embodiment.

FIG. 24A is a flow diagram for the Incremental Update method 2224 according to an embodiment that implements a pull model.

FIG. 24B is a flow diagram for the Incremental Update method 2224 according to an embodiment that implements a push model.

FIG. 25 is a flow diagram for the Subscription Update method 2238 according to one embodiment.

DESCRIPTION OF EMBODIMENTS

Figure 1:
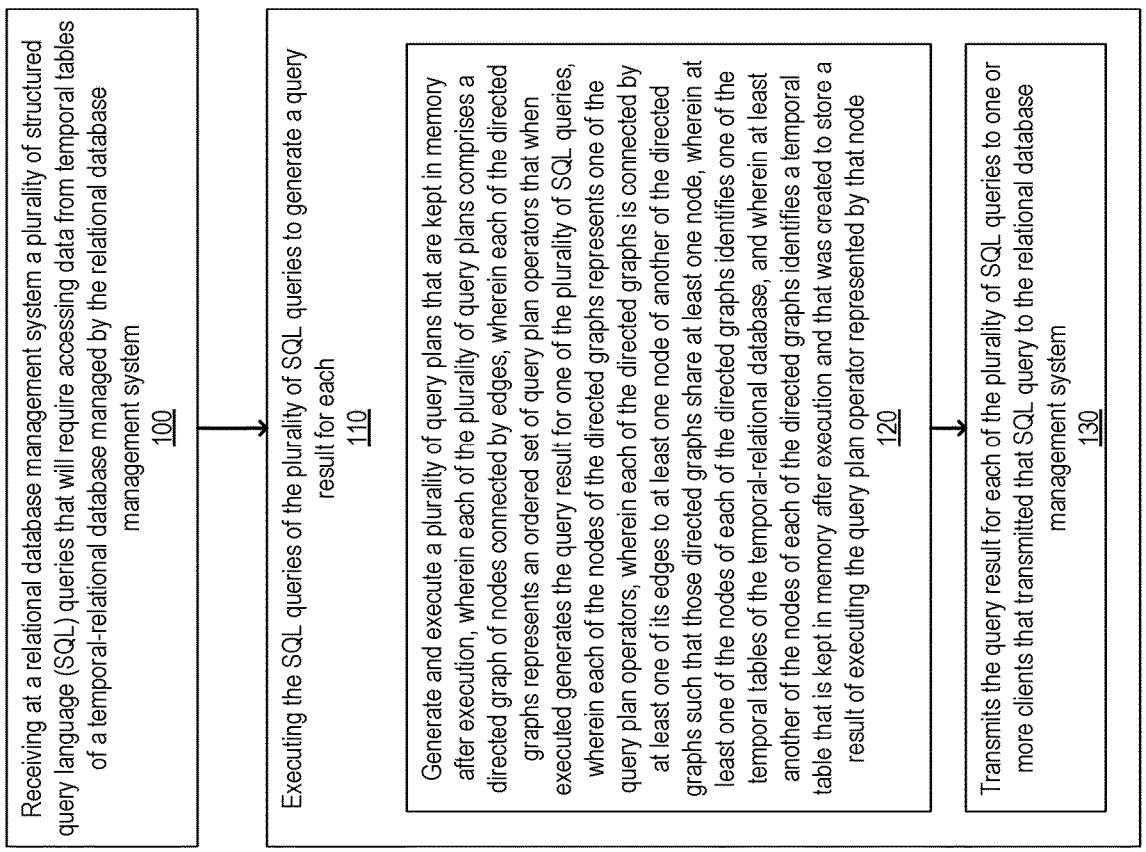
FIG. 1 is a flow diagram for query plan generation and execution in a relational database management system (RDBMS) with a temporal-relational database according to one embodiment.

The following description describes methods and apparatus for query plan generation and execution in a relational database management system with a temporal-relational database. In the following description, numerous specific details such as resource partitioning/sharing/duplication implementations, types and interrelationships of system components, and logic partitioning/integration choices are set forth in order to provide a more thorough understanding of the present invention. It will be appreciated, however, by one skilled in the art, that the invention may be practiced without such specific details. In other instances, control structures, logic implementations, opcodes, means to specify operands, and full software instruction sequences have not been shown in detail in order not to obscure the invention. Those of ordinary skill in the art, with the included descriptions, will be able to implement the invention without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations and/or structures that add additional features to some embodiments. However, such notation should not be taken to mean that these are the only options or optional operations, and/or that blocks with solid borders are not optional in certain embodiments.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams will be described with reference to the exemplary embodiments of the other figures. However, the operations of the flow diagrams can be performed by embodiments other than those discussed with reference to the other figures, and the embodiments discussed with reference to these other figures can perform operations different than those discussed with reference to the flow diagrams.

The term "client" is used herein in several contexts, including to refer to a "database client" (also known as an RDBMS client), a "BI client," and an "end user client." A database client is a client of an RDBMS, while a BI client is a client of a BI service. An end user client may be a database client, an end user client may be a BI client (with the BI service being a database client), and/or an end user client may be both a database client and a BI client (with the BI service being a database client).

Overview

FIG. 1 is a flow diagram for query plan generation and execution in a relational database management system (RDBMS) with a temporal-relational database, according to one embodiment. At block 100, the relational database management system receives a plurality of structured query language (SQL) queries that will require accessing data from temporal tables of a temporal database managed by the relational database management system. As discussed above, while temporal tables can logically be thought of as tables with rows and columns, the contents of temporal tables may be stored in memory (i.e., in volatile memory, non-volatile memory, and/or combinations thereof) in different ways (e.g., a "row-oriented" organization that mimics the above discussed logical view (sometimes referred to as "row-oriented" temporal tables), a "column-oriented" (also known as a "columnar") organization (sometimes referred to as "column-oriented" temporal tables), etc.). In one embodiment, each data record stored in a temporal table is associated with a pair of timestamps: a first timestamp (e.g., stored in a valid_from field, corresponding to a "valid_from" column) corresponding to the earliest time for which the record is valid, and a second timestamp (e.g., stored in a valid_to field corresponding to a "valid_to" column) corresponding to the latest time for which the record is valid (and is set to infinity, or INF, if that time is yet unknown). While embodiments are described herein relative to the above discussed logical view and using the terms valid_to and valid_from columns (as is sometimes done in the art), alternative embodiments may implement the temporal tables differently (e.g., store the contents of the temporal tables in different ways (e.g., using a row-oriented organization, using a column-oriented organization, using both a row-oriented and column-oriented organization for one or more temporal tables, using a row-oriented organization for one or more temporal tables and a column-oriented organization for one or more other temporal tables, etc.), store the timestamp information for the data records another way (e.g., using more or less fields), refer to the timestamp information by different terms, etc.) It should be noted that the plurality of SQL queries in block 100 need not be received at the same time. From block 100, control passes to block 110.

In block 110, the SQL queries of the plurality of SQL queries are executed to generate a query result for each. In one embodiment, this execution includes block 120 followed by block 130. Block 120 includes the generating and executing of a plurality of query plans that are kept in memory (i.e., in volatile memory, non-volatile memory, and/or combinations thereof) after execution, where each of the plurality of query plans comprises a directed graph of nodes connected by edges. Each of the directed graphs represents an ordered set of query plan operators that when executed generate the query result (also referred to as a "result set") for one of the plurality of SQL queries, and each of the nodes of the directed graphs represents one of the query plan operators. Each of the query plan operators represented by the nodes of the directed graphs represents a type of operation to be performed as part of the query plans. Thus, as used here, a "query plan operator" represents a type of operation (e.g., a type of relational operation (e.g., PROJECT, SELECT, JOIN, TABLE, etc.) or other type of operation (e.g., RENAME, etc.)) to be performed as part of a query plan. When such a query plan operator represents a relational operation on temporal tables, the operation is referred to as a temporal-relational operation. A directed graph is a graph where the edges have a direction associated with them. The nodes within each of the directed graphs have a parent child relationship; that is, an edge connecting one of the nodes to another of the nodes represents that they are respectively a parent node and a child node relative to each other and that the results of the child node are accessible by the parent node. It should be noted that the plurality of SQL queries need not be executed in block 110 at the same time.

In the illustrated example, the SQL queries are such that each of the directed graphs shares at least one of its nodes with another of the directed graphs (each of the directed graphs is connected by at least one of its edges to at least one node of another of the directed graphs such that those directed graphs share at least one node). In other words, each of the directed graphs includes an edge connected to a node of another of the directed graphs such that at least that node is shared by those directed graphs. Thus, the query plans are connected (also referred to as "overlap") in that they share at least a node. The query plans can also share more than one node (e.g., a subgraph of two or more nodes and one or more edges). For there to be one or more shared nodes, at least one query plan operation must be the same in more than one query plan. One embodiment supports one of the query plans being generated and executed prior to another of the query plans being generated and executed. For instance, in one embodiment, the generating and executing of one of the directed graphs includes connecting an edge of the one of the directed graphs being generated to a node of an earlier generated one of the directed graphs such that the one of the directed graphs being generated shares at least the node with the earlier generated one of the directed graphs through reuse (more specifically, through incorporation) of at least the node of the earlier generated one of the directed graphs. Thus, where a first query plan is already generated and kept in memory after execution, then the generation of a second query plan does not require creating those one or more nodes (and possibly one or more subgraphs of nodes and edge(s)) that are already in the first query plan and can be shared because they are the same; the generation of the second query plan reuses (more specifically, "incorporates") those of the one or more nodes (and possibly one or more subgraphs) from the first query plan that are the same.

In FIG. 1, the SQL queries are such that each of the directed graphs is connected by at least one of its edges to at least one node of another of the directed graphs (e.g., SQL queries requiring such query plans have been submitted and the query plans are in memory at the same time). In other words, FIG. 1 illustrates a capability dependent on SQL queries and resulting query plans sharing certain characteristics and timing (the SQL queries may be submitted simultaneously or at different times, but the query plans are in memory at the same time) as described later herein. While embodiments have this capability, embodiments also support having at different points in time: 1) no query plans in memory; 2) one query plan in memory after execution; 3) multiple query plans in memory after execution, but each is independent in that it does not connect (share any nodes) with another of the query plans in memory; 4) multiple query plans in memory after execution, where one or more is independent and a group are connected; 5) multiple groups of query plans in memory after execution, where the query plans in each group are connected, but wherein no query plan in a given group is connected to a query plan in another of the groups (the different groups are independent); etc.).

Additionally or alternatively, one embodiment supports each of the directed graphs including a root node, and at least some of the directed graphs not sharing a root node (in other words, the resulting query plans are such that a root node of each of these particular directed graphs is not shared with another of the directed graphs). Additionally or alternatively, one embodiment supports at least two of the directed graphs each including a root node, at least one or more leaf nodes, and one or more intermediate nodes; where an intermediate node is one which has both one or more parent nodes and one or more child nodes (the root node is connected to at least one of the intermediate node(s), and each of the intermediate nodes is connected to at least another of the intermediate nodes or one of the leaf nodes); and these two directed graphs at least sharing one of the intermediate nodes and its descendant nodes. In other words, one embodiment supports at least two of the query plans sharing a subgraph of the nodes and edge(s). Additionally or alternatively, one embodiment supports at least two of the directed graphs each including a root node and one or more leaf nodes; and a first of these two directed graphs being a subgraph of the second (in other words, the root node and intermediate nodes of the first graph are intermediate nodes of the second, and the leaf nodes of the first graph are also leaf nodes of the second).

At least one of the nodes of each of the directed graphs identifies one of the temporal tables of the temporal database, and at least another of the nodes of each of the directed graphs identifies a temporal table that is kept in memory after execution and that was created to store a result of executing the query plan operator represented by that node. Additionally or alternatively, in one embodiment at least one of the nodes shared by the directed graphs identifies a temporal table that is kept in memory after execution and that was created to store a result of executing the query plan operator represented by that node. Additionally or alternatively, each of the nodes of the directed graphs identify one of the temporal tables of the temporal-relational database or one of the temporal tables that was created to store the result of executing the query plan operator represented by that node. Additionally or alternatively, each of the temporal tables that stores the result of executing one of the query plan operators is kept in memory after execution for at least as long as the node that identifies that temporal table is kept in memory after execution. Additionally or alternatively, in one embodiment the query plans are kept in memory after execution so that the nodes and subgraphs of the directed graphs are available for potential reuse. Additionally or alternatively, in one embodiment each of the temporal tables that was created to store the result of executing the query plan operator represented by that node is being kept in memory after execution for potential reuse. Additionally or alternatively, in one embodiment, where a second query plan includes one or more of the same query plan operations (i.e., a same query plan operator operating on the same input temporal tables with the same parameter(s)) as a first query plan which has already been executed, the second query plan can reuse, incrementally updating as necessary, the temporal tables(s) in common with the first query plan. Incrementally updating a temporal table refers to the above described manner of reflecting changes through the changing of a timestamp of an existing data record and/or the creation of a new data record (as opposed to just editing or deleting an existing record). Incrementally updating a temporal table identified by a node refers to incrementally updating that temporal table responsive to the query plan operator represented by that node being executed (be it incremental or full execution). Incrementally updating a temporal table identified by a node may be unnecessary when executing the query plan operator represented by that node is unnecessary (e.g., when there is an optimization indicating that executing may be avoided). Thus, incrementally updating, as necessary, a temporal table identified by a node refers to executing (be it incremental or full execution) the query plan operator represented by that node, and incrementally updating the temporal table, when there is not an optimization indicating that the executing may be avoided (and thus includes embodiments that do not implement such an optimization, or in embodiments that do but the situation is such that the optimization does not allow the execution and incremental update to be avoided). Additionally or alternatively in some embodiments, if no changes have taken place, newly submitted query plans which share a node with an existing query plan can reuse the temporal table identified by the shared node without any re-execution of the query plan operator represented by that node. However, a change to an input temporal table of the query plan operator may necessitate the query plan operator be executed (incrementally or fully).

The sharing of nodes by the query plans and the keeping of the query plans and temporal tables in memory after execution (particularly, where at least one of the nodes of each of the directed graphs identifies a temporal table that is kept in memory after execution and that was created to store a result of executing the query plan operator represented by that node) allows some embodiments to support near real-time streaming performance, including when working with large volumes of data. This is in part because: 1) keeping the query plans in memory after execution and having them share nodes (where possible), and thus share the temporal tables which those shared nodes identify, reduces required memory, compute resources, and compute time; and 2) the use of temporal tables and keeping them in memory after execution allows certain embodiments to implement one or more of the query plan operators to perform "incremental execution" (execution on only the "delta"; also referred to as "incremental query processing" and "incremental re-computation") to incrementally update, as necessary, the temporal tables identified by the nodes representing those query plan operators (incremental execution reduces required compute resources and compute time as compared to re-execution/re-computation of query plan operators on the entirety of each of the temporal table inputs to those query plan operators (referred to herein as "full re-execution")). Thus, if the execution of a query plan operator, which has as input(s) a set of one or more temporal tables, includes accessing from at least one of those temporal tables only the incrementally inserted and deleted data records (the delta, as opposed to all data records), then the execution is an "incremental execution." In contrast, if the execution of a query plan operator, which has as input(s) a set of one or more temporal tables, requires accessing all of the valid data records from all of the temporal tables in the set, then the execution is a "full execution." A given query plan operator may be implemented to perform incremental execution, full execution, or both (and in the case of both, it performs incremental execution when possible). Additionally or alternatively, in one embodiment the generation and execution in block 120 includes incrementally executing at least the query plan operator represented by one of the nodes shared by two of the directed graphs. For example, where a first query plan is already generated and executed, and its nodes and the temporal tables they identify are kept in memory after execution, then the generation of a second query plan does not require creating those one or more nodes (and possibly one or more subgraphs of nodes and edge(s)) needed for the second query plan that are already in the first query plan as those nodes can be shared, and the execution of the second query plan may include incrementally executing the query plan operators represented by those shared nodes on the temporal tables which require updating.

Block 130 includes transmitting the query result for each of the plurality of SQL queries to the client(s) that transmitted that SQL query to the relational database management system. The term "client" here refers to a client of the RDBMS, and thus such a client can also be referred to as a "database client" or a "RDBMS client."

Additionally or alternatively, in one embodiment the generating and executing may include, as part of generating one of the directed graphs, the: 1) identification of at least one of the nodes that is part of an earlier generated one of the directed graphs and that may be reused (more specifically, incorporated); and 2) addition to the one of the directed graphs an edge connected to the one of the nodes that is part of the earlier generated one of the directed graphs. Additionally, in one embodiment the one of the nodes to which the added edge is connected may be one of the nodes that identify temporal tables that were created to store the result of executing the query plan operator represented by that node, and wherein the generating and executing may include, as part of executing the one of the directed graphs, reusing, including incrementally updating as necessary, the temporal table identified by the one of the nodes to which the added edge was connected. This is more efficient than re-creating that temporal table; and further, if updating is required, there are further efficiency gains when the query plan operator represented by that node may be incrementally executed (as opposed to re-executing the query plan operator represented by that node on the entire temporal table identified by a child node of that node (i.e., as opposed to full re-execution)). Alternatively, in one embodiment the generating and executing may include: 1) identifying parts of already generated ones of the directed graphs that may be reused as part of others of the directed graphs that are currently being generated; and 2) reusing those identified parts in the generating of the others of the directed graphs rather than recreating those identified parts. Additionally, in one embodiment the reused parts may include one or more of the nodes that identify temporal tables that were each created to store the result of executing the query plan operator represented by that node, and wherein the generating and executing may include, reusing, including incrementally updating as necessary, the temporal tables identified by the one or more nodes of the reused parts. This is more efficient than re-creating the one or more temporal tables identified by the one or more nodes of the reused parts; and further, if updating is required, there are further efficiency gains when one or more of the query plan operators represented by one or more of the nodes of the reused parts may be incrementally executed (as opposed to re-executing the query plan operator of such a node on the valid rows of the temporal table identified by each child node of that node (full re-execution)).

Different embodiments may use different techniques to determine how long any part(s) (one or more of the nodes and edges connected thereto) or entire ones of the query plans and the corresponding temporal tables (TTs) are kept in memory after execution. For each of the query plans, the nodes and edges of the directed graph (or part(s) thereof) and the corresponding TTs are kept in memory after execution: 1) for potential reuse while they are still required (e.g., while any of the clients are to receive updates to the SQL query for which that query plan was generated); and/or 2) to provide an opportunity for reuse in generating and executing one or more other query plans. The length of time to keep the query plans, or part(s) thereof, in memory after execution to provide this opportunity may be based on a period of time it is deemed worthwhile to utilize the required memory on the chance that the generation and execution of another query plan may reuse part(s) or the entire query plan (and corresponding TTs) (e.g., a fixed period of time; a programmable period of time; a calculated amount of time based on: (i) likelihood of reuse of some or all of that query plan, (ii) the nodes and edges being kept in memory after execution (e.g., to balance memory consumption and opportunity for reuse, based on the nodes' connectedness to other nodes, the types of the nodes, their historical use, etc.), (iii) the arrival rate of other SQL queries, and/or (iv) available resources (e.g., when a threshold amount of memory is exceeded by the query plans and corresponding TTs in memory)). Additionally or alternatively, in one embodiment an identification of "active" or "inactive" is maintained for each of the query plans (e.g., the identification is associated with the root node of the directed graph of each of the query plans), and those nodes (and the TTs they identify) that are not part of an "active" query plan are candidates for removal from being kept in memory. Different embodiments may determine when to make the indication "inactive" differently (e.g., the connection corresponding to that SQL query has been closed; the client who submitted that SQL query has indicated that the query is no longer of interest; a fixed or programmable period of time has passed). Also, different embodiments may perform the actual removal at different times (e.g., immediately, after a fixed or programmable period time, when a threshold amount of memory is exceeded by the query plans and TTs in memory, as part of normal garbage collection operations). Alternative embodiments may forgo the "active" and "inactive" indications, and check whether a client connection is closed to determine whether any corresponding query plans are candidates for removal.

Additionally or alternatively, in one embodiment at least two of the directed graphs may start with a root node, include one or more intermediate nodes, and end in one or more leaf nodes, and the root node and the one or more intermediate nodes of each directed graph each identify for that node one or more other of the nodes of that directed graph as child nodes. Further, each of the query plan operators represented by each of the root node and intermediate nodes operates on the one or more of the temporal tables (or a view or copy thereof) identified by the one or more child nodes of that node. Additionally or alternatively, in one embodiment, execution of the query plan operator represented by each of the one or more leaf nodes results in retrieving data from (e.g., returning a reference to (or a view or copy of)) one of the temporal tables in the temporal-relational database. Additionally, in one embodiment one or more of the query plan operators represented by the nodes (e.g., the root and intermediate nodes) may perform temporal-relational algebra operations (a temporal-relational algebra operation is a relational algebra operation that is performed on temporal tables).

Additionally or alternatively, in one embodiment the RDBMS is designed to support multiple, in fact many, "overlapping" query plans at a time. There are various reasons for there to be multiple overlapping query plans. For example, certain use cases require SQL queries for which the query plans have relatively large "query depth," where query depth for a given query plan is measured by the maximum count of edges between successive nodes on a path between the root node and a leaf node. While in one embodiment a query plan with a large query depth is one that includes a path have more than 10 nodes, alternative embodiments may use a threshold in the range of 50-100 nodes. Generating query plans with relatively large query depth results in a relatively large number of nodes, and therefore a larger opportunity for overlap. Further, because SQL queries requiring query plans with large query depth may require significant processing to redo from scratch, the ability of the database to incrementally execute query plan operators has the advantage of further improving efficiency (e.g., reducing the time required to generate the query result, as well as reducing the power requirements of the processing resources, making the processing resources available for other tasks, allowing the database to support more queries simultaneously, reducing the number of memory read/write operations, etc.). By way of specific example, in one embodiment the relational database management system may be used for complex analytics or analytical processing; a use case that requires SQL queries for which the query plans have relatively large query depth.

Embodiments may support incremental update, lazy update, skipping update and combinations thereof, as described herein. In one embodiment that supports incremental update, the following is performed responsive to modifying contents of at least a given one of the temporal tables that is part of the temporal-relational database and that an SQL query requires accessing data from: 1) incrementally updating (through incremental execution where possible) at least the temporal tables identified by the ancestors of the node identifying that modified temporal-relational database table (incrementally updating those of the temporal tables identified by those of the nodes that are of the directed graph of the query plan for the SQL query and that depend directly or indirectly upon the node that identifies the given one of the temporal tables); and 2) transmitting, to the clients that submitted the SQL query, an incremental update to the query result (referred to as an "incremental query result") for the SQL query. In embodiments that support lazy update, the TTs that were created to store the result of executing the query plan operators are not immediately updated responsive to the contents of one of the temporal tables of the temporal-relational database being modified (and from which at least one of the SQL queries requires accessing data). Rather, the updating is delayed until one or more events occur (e.g., a need to send a query result (e.g., initial or incremental) to a client, a fixed amount of time elapses, a programmable amount of time elapses, a calculated amount of time based the nodes and edges (e.g., based on the nodes' connectedness to other nodes, the types of the nodes, their historical use, etc.) elapses, the arrival rate of other SQL queries exceeds a threshold, and/or available computational resources falls below a threshold) to allow for batch processing if other modifications are received. Incrementally updating a temporal table identified by a node may be unnecessary when executing the query plan operator represented by that node is unnecessary (e.g., when there is an optimization, such as skipping update, indicating that executing may be avoided). There are different types of skipping update and embodiments may support none, one, or more than one. So additionally or alternatively, some embodiments support a skipping update optimization which may avoid the execution of the query plan operators represented by nodes: 1) that do not depend directly or indirectly on a node that identifies a temporal table that was since modified; and/or 2) that have been executed recently enough (referred to herein as "refreshed" recently enough) (e.g., this could occur in embodiments that support the execution of query plans in parallel and/or that support query execution "as of a past date"). For instance, in some embodiments that support a skipping update optimization, responsive to modifying contents of at least a given one of the temporal tables that is part of the temporal-relational database and that at least one of the SQL queries requires accessing data from, execution of the query plan operations represented by those of the nodes that are part of the query plan being executed and that do not depend directly or indirectly upon the node that identifies the given one of the temporal tables that was modified is skipped (be it incremental execution or full re-execution). As another example, in some embodiments that support a skipping update optimization, when executing a query plan, execution of the query plan operators represented by the nodes that are part of the query plan being executed and that have been executed recently enough (referred to here as refreshed recently enough) is avoided. Thus, incrementally updating, as necessary, a temporal table identified by a node refers to executing (be it incremental or full execution) the query plan operator represented by that node and incrementally updating the temporal table when there is not an optimization indicating that the executing may be avoided (and thus includes embodiments that do not implement such an optimization, or in embodiments that do but the situation is such that the optimization does not allow the execution and incremental update to be avoided).

Additionally or alternatively, in one embodiment the SQL queries in block 110 may include a first SQL query and a second SQL query that were received by the relational database management system. Further, the generation and execution in block 120 includes generating a first query plan for the first SQL query and a second query plan for the second SQL query, and the directed graph for the second query plan is connected by at least one of its edges to at least one node of the directed graph for the first query plan such that those directed graphs share at least one node. Additionally or alternatively, in one embodiment the at least one node shared by the directed graphs for the first and second query plans is one that was created to store the result of executing the query plan operator represented by that node. Additionally or alternatively, in one embodiment the generation and execution of the second query plan includes incrementally executing at least the query plan operator represented by the at least one node shared by the directed graphs for the first and second query plans. Additionally or alternatively, the first SQL query and the second SQL query were received by the relational database management system to respectively populate a first dashboard content element and a second dashboard content element. Additionally, in one embodiment the first and second dashboard content element may be part of different dashboards to be displayed by different end user clients. Alternatively, in one embodiment the first and second dashboard content element may be part of the same dashboard to be displayed.

Some embodiments additionally or alternatively support subscription SQL queries, which are SQL queries for which clients may receive updates to the query results. In one embodiment, when a client submits a subscription SQL query, the RDBMS initially transmits to the client the initial query result representing the data when the subscription SQL query was initially executed. Thereafter, the RDBMS may transmit to the client any updates to those query results which are caused by modification(s) of the contents of any temporal tables of the temporal-relational database that the subscription SQL query requires accessing data from. In one embodiment, the query plan for a subscription SQL query (and temporal tables identified by the query plan's nodes) is kept in memory after execution at least until the client that submitted that subscription SQL query submits a close subscription message for that subscription SQL query. As such, if the RDBMS receives further SQL queries, the use of subscription SQL queries increases the chances for there to be multiple overlapping query plans (i.e., the opportunity for a later generated query plan to overlap with an existing query plan is increased the longer the existing query plan is kept in memory after execution). In some cases, reuse of a query plan for the subscription SQL query may include incrementally executing one or more of the query plan operators represented by one or more nodes of the query plan to incrementally update the existing temporal tables those one or more nodes identify (as opposed to full re-execution). Different embodiments that support both SQL queries and subscription SQL queries may distinguish the two using different techniques (e.g., a subscription SQL query may be preceded by a phrase/prefix such as "subscribe to"). In addition, in one embodiment that supports only subscription SQL queries, the RDBMS treats each submitted SQL query as a subscription SQL query and requires no such phrase/prefix. In one embodiment, the SQL queries in block 110 may include a first SQL query that is a subscription SQL query, and block 120 includes generating a first of the query plans for the first SQL query. Further, the SQL queries in block 110 may include a second SQL query that is received after the first SQL query plan was generated and while the first query plan was being kept in memory after execution because it is a subscription SQL query. The phrase "for potential reuse" means that nodes (and the temporal tables they identify) of existing query plans are kept in memory after execution so that embodiments may support one or more of: 1) incorporating one or more parts (nodes and/or subgraphs) of those existing query plan(s) (or one or more of those existing query plan(s)) into a query plan currently being generated; 2) when at least one of the nodes has been so incorporated, using the temporal table identified by that node as-is when possible (as opposed to requiring any re-execution of the query plan operation represented by the node identifying that temporal table); 3) when at least one of the nodes has been so incorporated, incrementally executing the query plan operator represented by that node to incrementally update the existing temporal table identified by that node (as opposed to full re-execution); 4) when at least one of the nodes has been so incorporated, full re-executing the query plan operator represented by that node to incrementally update the existing temporal table identified by that node; 5) when the contents of a temporal table represented by a leaf node of an existing query plan for a subscription SQL query are updated, reusing that existing query plan; and/or 6) when the contents of a temporal table represented by a leaf node of an existing query plan for a subscription SQL query are updated, incrementally executing at least one of the query plan operators represented by a node of that existing query plan to incrementally update the existing temporal table storing the result of that query plan operator (as opposed to full re-execution).

Figure 2:
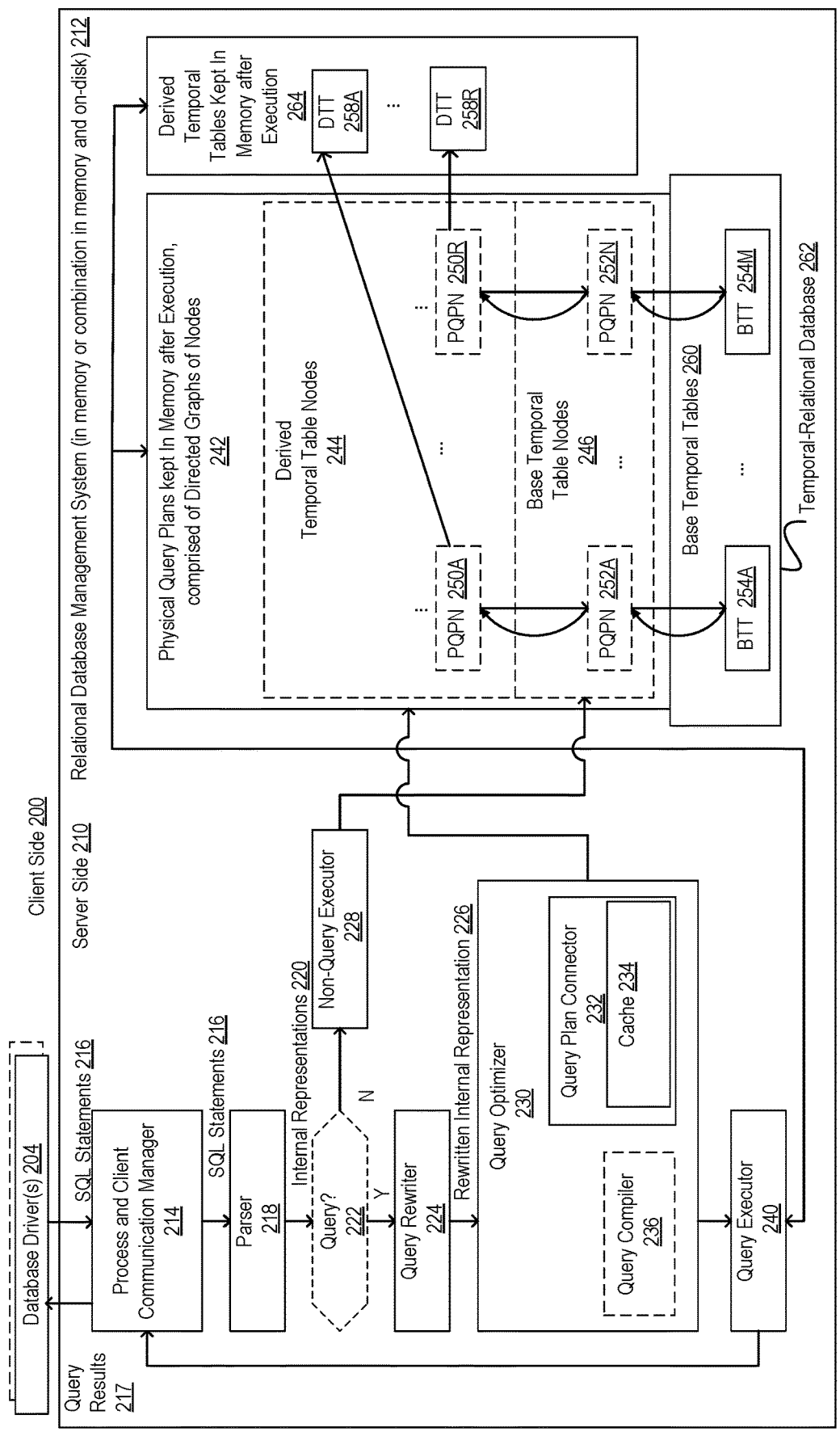
FIG. 2 is a block diagram illustrating a relational database management system according to one embodiment.

FIG. 2 is a block diagram illustrating a relational data base management system according to one embodiment. FIG. 2 is divided into a client side 200 and a server side 210. The client side 200 includes one or more clients (not shown), each including one of the database driver(s) 204 (also known as a remote procedure call (RPC) module) as well as other components known in the art (not shown).

The server side 210 includes the relational database management system (RDBMS) 212. The RDBMS 212 includes a temporal-relational database 262 in which clients store, and from which clients retrieve, data. The RDBMS 212 includes components named according to the components commonly found in RDBMSs (e.g., Joseph M. Hellerstein, Michael Stonebraker, and James Hamilton, "Architecture of a Database," Foundations and Trends in Databases, Vol. 1, No. 2 (2007), pages 141-259; Joseph M. Hellerstein and Michael Stonebraker, "Anatomy of a Database," Readings in Database Systems, Fourth Edition, The MIT Press (2005), pages 42-95), such as a process and client communication manager (PCCM) 214, a parser 218, a query rewriter 224, a query optimizer 230 and a query executor 240 (also known as an executor or query plan executor). The term "query processor" is sometimes used to refer to the combination of the parser 218, the query rewriter 224, the query optimizer 230 and the query executor 240. In relation to FIG. 1, in one embodiment the PCCM 214 performs blocks 100 and 130, and the query processor performs the rest of block 110 (the combination of the query optimizer 230 and query executor 240 performing block 120).

The process and client communication manager 214 (which, in some embodiments, is implemented as separate managers; and is also sometimes referred to as just the process manager) may perform a variety of tasks, including: 1) establishing and storing the connection state for the client(s), responding to client requests in the form of SQL statements 216, and returning query results 217; and/or 2) encapsulating and scheduling the various tasks of the RDBMS 212 (including performing admission control). Connections are established between the database driver(s) 204 of the client(s) and the process and client communication manager 214. The database driver(s) 204 submit the SQL statements 216 to the PCCM 214.

The PCCM 214 provides the SQL statements 216 to the parser 218. In one embodiment, the tasks of the parser 218 include converting the SQL statements 216 into internal representations 220 (e.g., abstract syntax trees (ASTs)). A decision block 222 illustrates that those of the SQL statements 216 that are SQL queries are distinguished from those that are not. Decision block 222 is dashed because this decision can be made at one or more different locations in the RDBMS 212 (e.g., at its illustrated location, and/or between the query optimizer 230 and the query executor 240, and/or as part of the query executor 240). At the illustrated location, those of the internal representations 220 that were generated from the SQL statements 216 that are SQL queries are provided to the query rewriter 224, while those that are not are provided to a non-query executor 228.

The query rewriter 224 simplifies and normalizes the internal representations 220 of the SQL queries to produce rewritten internal representations 226 (e.g., rewritten ASTs representing the structure and contents of the query strings) that are provided to the query optimizer 230. While the query rewriter 224 is illustrated as a separate component, in some embodiments it is part of the parser 218 or the query optimizer 230 as in some commercial RDBMSs.

The query optimizer 230 generates query plans (which may include performing query plan optimization) from the rewritten internal representations 226. In some embodiments, for each of the rewritten internal representations 226, the query optimizer 230 first creates a "logical query plan" (further described later herein) prior to creating a "physical query plan" (also known as "fully specified query plan") in physical query plans 242. Different embodiments may generate logical query plan in different ways, including those that are well known in the art (e.g., Van den Bussche, J., Vansummeren, S., Translating SQL into the Relational Algebra, available at https://cs.ulb.ac.be/public/_media/teaching/infoh417/sql2alg_eng.pdf, retrieved October 2016; Kifer, M. et al, Database Systems: Application Oriented Approach, Complete Version—2nd edition, ISBN-13: 978-0321268457, Mar. 26, 2005). For example, in one embodiment a logical query plan is created from a rewritten internal representation by walking the AST and creating nodes from the AST which correspond to query plan operators (e.g., PROJECT for a "select" statement, JOIN or SELECT for a "where" clause, etc.).

The query executor 240 executes the physical query plans 242 corresponding to the SQL queries, which includes accessing the specified data from the specified temporal tables in the temporal-relational database 262, performing the query plan operations specified by those physical query plans, and providing the results to the process and client communication manager 214; which in turn provides those results (shown as query results 217) to the respective ones of the clients that submitted the respective SQL queries.

Each of the physical query plans 242 comprises a directed graph of nodes connected by edges, wherein each of the directed graphs represents an ordered set of query plan operators that when executed provides the query result for an SQL query. The query optimizer 230 includes a query plan connector 232. In one embodiment, for each of the logical query plans, the query plan connector 232 determines whether the required physical query plan can be generated by reusing or incorporating into the required physical query plan, one or more of the nodes and/or subgraphs (as well as, in some embodiments, entire directed graphs) already in the physical query plans 242 that are currently being kept in memory (i.e., in volatile memory, non-volatile memory, and/or combinations thereof) after execution. If the query plan connector 232 determines that reuse or incorporation is possible for a given logical query plan, then only the missing part(s) (if any) for the physical query plan (be it one or more nodes, edges, and/or subgraphs) are added to the physical query plans 242 and connected by one or more edges to the one or more nodes and/or subgraphs (as well as, in some embodiments, entire directed graphs) that were determined to be reusable. The operation of the query plan connector 232 can be performed in conjunction with query plan optimization, after query plan optimization (on the optimized query plan), or both.

In one embodiment, the query plan connector 232 includes a cache 234 (also referred to as a node key-to-node cache) to store a mapping of node keys to corresponding nodes in the physical query plans 242. In one embodiment, each of the nodes in the physical query plans 242 has an entry in the cache 234, and the entry for each of the nodes stores a node key and a reference used to locate that node in the physical query plans 242. A "reference" used to locate a data structure (e.g., a node) may be implemented a variety of ways (e.g., a pointer, an index, a handle, a key, an identifier, etc.) The node keys are such that the query plan connector 232 may make, for each node of the logical query plans, the above discussed determination (whether the required physical query plan can be generated by reusing or incorporating one or more of the nodes, subgraphs, and/or entire directed graphs already in the physical query plans 242 that are currently being kept in memory after execution). Additionally or alternatively, in one embodiment a logical query plan is created irrespective of what is stored in the cache 234, and then that logical query play is used to produce node keys as needed for comparison to the node keys already in the cache 234; where a cache hit means that the node referenced in that entry may be reused/incorporated. While embodiments are described in which the edges of the graph are stored within the nodes of the graph, alternative embodiments may instead store the edges in the cache 234.

In one embodiment, the query optimizer 230 also includes a query compiler 236 that compiles the query plan into machine code or an interpretable query plan (to enable cross platform portability and which may be lightweight (e.g., an annotated relational algebra expression) or in a lower level language (e.g., Java byte codes)).

Each of the nodes of the directed graphs in the physical query plans 242 represents one of the query plan operators of the physical query plans 242. The nodes of the physical query plans 242 may be referred to as "nodes" or "physical query plan nodes" (PQPNs).

Further, at least one of the nodes of each of the directed graphs identifies a temporal table that is kept in memory (i.e., in volatile memory, non-volatile memory, and/or combinations thereof) after execution and that was created to store a result of executing the query plan operator represented by that node, and at least one of the nodes of each of the directed graphs identifies one of the temporal tables in the temporal-relational database 262. Additionally or alternatively, in one embodiment at least one of the nodes shared by the directed graphs identifies a temporal table that is kept in memory after execution and that was created to store a result of executing the query plan operator represented by that node. Additionally or alternatively, in one embodiment the physical query plans are kept in memory after execution so that the nodes and subgraphs of the directed graphs are available for potential reuse. Additionally or alternatively, in one embodiment each of the temporal tables that was created to store the result of executing the query plan operator represented by that node is being kept in memory after execution for potential reuse. Additionally or alternatively, in one embodiment, where a second query plan includes one or more of the same query plan operations (same query plan operator operating on the same input temporal tables with the same parameter(s)) as a first query plan which has already been executed, the second query plan can reuse, incrementally updating as necessary, the temporal tables(s) in common with the first query plan. Additionally or alternatively, in one embodiment generation of one of the directed graphs includes the: 1) identification of at least one of the nodes that is part of an earlier generated one of the directed graphs and that may be reused; and 2) addition to the one of the directed graphs of an edge connected to the one of the nodes that is part of the earlier generated one of the directed graphs. Additionally, in one embodiment the one of the nodes to which the added edge is connected may be one of the nodes that identify temporal tables that were created to store the result of executing the query plan operator represented by that node, and wherein the execution of the one of the directed graphs may include reusing, including incrementally updating as necessary, the temporal table identified by the one of the nodes to which the added edge was connected. This is more efficient than re-creating that temporal table; and further, if updating is required, there are further efficiency gains when the query plan operator represented by that node may be incrementally executed (as opposed to re-executing the query plan operator represented by that node on the valid rows of the temporal table identified by each child node of that node (full re-execution)). Alternatively, in one embodiment the generation may include: 1) identifying parts of already generated ones of the directed graphs that may be reused as part of others of the directed graphs that are currently being generated; and 2) reusing those identified parts in the generating of the others of the directed graphs rather than recreating those identified parts. Additionally, in one embodiment the reused parts may include one or more of the nodes that identify temporal tables that were created to store the result of executing the query plan operator represented by that node, and wherein the executing may include, reusing, including incrementally updating as necessary, the temporal tables identified by the one or more nodes of the reused parts. This is more efficient than re-creating the one or more temporal tables identified by the one or more nodes of the reused parts; and further, if updating is required, there are further efficiency gains when one or more of the query plan operators represented by one or more of the nodes of the reused parts may be incrementally executed (as opposed to re-executing the query plan operator of such a node on the valid rows of the temporal table identified by each child node of that node (full re-execution)).

Additionally or alternatively, in one embodiment each of the nodes of the directed graphs identify one of the temporal tables of the temporal-relational database or one of the temporal tables that was created to store the result of executing the query plan operator represented by that node. Additionally or alternatively, in one embodiment each of the directed graphs starts with a root node, may include one or more intermediate nodes, and ends in one or more leaf nodes, where each of the root node and the one or more intermediate nodes of each directed graph each identify for that node one or more other of the nodes of that directed graph as child nodes. Additionally or alternatively, each of the query plan operators represented by each of the root node and intermediate nodes operates on the one or more of the temporal tables (or a copy or view thereof) identified by the one or more child nodes of that node. Additionally or alternatively, in one embodiment execution of the query plan operator represented by each of the one or more leaf nodes results in retrieving data from one of the temporal tables in temporal-relational database 262. Additionally or alternatively, in one embodiment the node key maintained in the cache 234, for each of the nodes of the physical query plans 242, is based on that node and that node's zero or more identified child nodes. In another embodiment, the node key maintained in the cache 234, for each of the root and intermediate nodes of the physical query plans 242, is based on that node and that node's identified child nodes. In yet another embodiment, the node key maintained in the cache 234, for each of the nodes of the physical query plans 242, represents just that part of the query plans that include that node and its descendants (child nodes, grandchild nodes, etc.), if any, but does not represent any parts of the query plans represented by any ancestor nodes (parent nodes, grandparent nodes, etc.) of that node. In one embodiment, the node key maintained in the cache 234, for each of the root and intermediate nodes of the physical query plans 242, is based on that node and the keys of that node's identified child nodes, if any.

In the embodiment of FIG. 2, each of the temporal tables (TTs) is encapsulated by an object, and these objects are divided into base temporal tables (BTTs) 260 that are in the temporal-relational database 262 and derived temporal tables (DTTs) 264 that store the results of executing the query plan operators represented by each of the nodes. As discussed above, different embodiment may store the contents of the TTs in memory (i.e., in volatile memory, non-volatile memory, and/or combinations thereof) in different ways (e.g., the contents may be stored using a columnar (also known as column-oriented) organization, using a row-oriented organization, using both a row-oriented and column-oriented organization for one or more temporal tables, using a row-oriented organization for one or more temporal tables and a column-oriented organization for one or more other temporal tables, etc.). While in one embodiment the BTTs 260 and the DTTs 264 are kept in memory (i.e., in volatile memory, non-volatile memory, and/or combinations thereof) with relatively fast read and write times (e.g., dynamic random access memory (DRAM), static random access memory (SRAM), and/or phase change memory), in alternative embodiments some of the BTTs 260 and/or the DTTs 264 may be stored in memory with relatively slower read and write times (e.g., Flash, SSD, magnetic disk).

In some embodiments, the physical query plan nodes (PQPNs) of the physical query plans 242 are referred to as "temporal table nodes" (TTNs), and are divided into derived temporal table nodes (DTTNs) 244 and base temporal tables nodes (BTTNs) 246. The BTTNs 246 refer to the leaf nodes of the directed graphs of the physical query plans 242 (and thus refer to temporal tables that are "visible to the database clients" in that they can be referenced in SQL queries that database clients issue to the system), while the DTTNs 244 refer to the root node(s) and intermediate node(s) of the directed graphs of the physical query plans 242 (and thus refer to temporal tables that are not "visible to the database clients"). While in some embodiments the terms BTTN and DTTN simply distinguish PQPNs that are leaf nodes from PQPNs that are root nodes or intermediate nodes (e.g., the same object-oriented class is used to implement the BTTNs and DTTNs), in other embodiments the terms BTTN and DTTN also distinguish the manner of implementation (e.g., using different object-oriented classes for BTTNs and DTTNs). While in one embodiment each of the PQPNs includes a reference used to locate a corresponding one of the BTTs 260 or a corresponding one of the DTTs 264 (e.g., each of the PQPNs 252A-N is a BTTN and includes a reference used to locate a corresponding one of the BTTs 254A-M, while each of the PQPNs 250A-R is a DTTN and includes a reference used to locate a corresponding one of the DTTs 258A-R), alternative embodiments may store these correspondences another way (e.g., use one or more other data structures to store these correspondences). As illustrated by the ellipses in FIG. 2, it is expected that at times there will many DTTNs 244 that act as intermediate nodes and root nodes (also referred to as higher level DTTNs). Thus, each of the PQPNs that is a DTTN 244 has one or more edges connecting it to a respective one or more other PQPNs that are child nodes; while in one embodiment each of the PQPNs that is a DTTN 244 includes reference(s) used to locate one or more other PQPNs (where each such reference forms an edge from the PQPN to a respective one of the one or more other PQPNs that are child nodes), alternative embodiments may store these edges another way (e.g., using one or more other data structures to store these edges). Typically, some of the PQPNs 250A-R will have an edge connecting it to a corresponding one of the PQPNs 252A-N (BTTNs), while some of the PQPNs 250A-R will have edge(s) connecting it to one or more other of the PQPNs 250A-R (other DTTNs). Certain embodiments also support DTTNs that have one or more other DTTNs and one or more BTTNs that are child nodes.

The non-query executor 228 may execute an INSERT operation (i.e., insert one or more data records in a temporal table of the temporal-relational database), UPDATE operation (i.e., change the contents of one or more data records in one or more temporal tables of the temporal-relational database by inserting new data records and changing the timestamp(s) of modified data records (e.g., set the valid_to column value to the update time)), DELETE operation (i.e., delete one or more data records in one or more temporal tables of the temporal-relational database by changing the timestamp(s) of "deleted" data records (e.g., set the valid_to column value to the update time)), and optionally other operations that modify the contents of a temporal table by adding data records, deleting data records, and/or changing the content of existing data records; as well as executes at least CREATE TABLE, and optionally other Data Definition Language (DDL) operations that don't change the content of temporal tables, but the temporal table themselves (e.g., the schema). In an embodiment with BTTNs 246, the non-query executor 228 interfaces with the BTTNs 252A-N, which in turn perform these operations on their corresponding one of the BTTs 254A-M.

As illustrated by the curved arrows from the BTTs 254 to the PQPNs 252, each of the PQPNs 252A-N has access to its corresponding one of the BTTs 254A-M. As illustrated by the curved arrows from the PQPNs 252A-N to different ones of the PQPNs 250A-R, some of the PQPNs 250A-R have access to the BTTs 254A-M referenced by the PQPNs 252A-N (e.g., PQPN 250A has access to the BTT 254A referenced by the PQPN 252A). Any higher level ones of the PQPNs 250A-R have access to the DTTs 264 which are referenced by their child PQPNs 250. Thus, an edge connecting one of the nodes to another of the nodes represents that they are respectively a parent node and a child node relative to each other and that the results of the child node are accessible by the parent node. While in one embodiment this access is in the form of a child node passing to a parent node a reference to a read-only view, or read-only copy, of that child node's DTT/BTT, and the parent node then accessing the records needed from the TT using the reference (in cases, only some, but not all, data records in the temporal table; in other cases, the whole table); alternative embodiments may be implemented differently (e.g., they may pass the whole TT).

In one embodiment, RDBMS operation begins with no query plans (logical or physical) or TTs being kept in memory (i.e., physical query plans 242, BTTs 260, and DTTs 264 are empty or not-instantiated), and the cache 234 being empty or not-instantiated. Responsive to one or more CREATE TABLE statements in SQL statements 216, one or more leaf nodes (e.g., BTTNs 246) and corresponding TTs (e.g., BTTs 260) are created. Responsive to a first SQL query being received, a first physical query plan is generated and executed, and a query result returned to the client that submitted the first SQL query. The generation of the first physical query plan includes generating the necessary directed graph, which includes creating the one or more necessary intermediate and root nodes (e.g., DTTNs 244) and adding the necessary edges (as described above, while in one embodiment these edges may be stored by storing, in each of the PQPNs acting as a parent node, reference(s) to the child node(s) of that parent node, alternative embodiments may store these edges another way (e.g., using one or more other data structures to store these edges). This directed graph is kept in memory after execution, at least for a time, for potential reuse. Further, the cache 234 is populated with a node key and node reference pair (wherein the node key is associated with the node reference) for each of the nodes in the directed graph. The execution of the first physical query plan includes performing the query plan operations specified by each of the nodes (DTTNs 244) of the directed graph, which includes accessing the TTs of any child node(s), performing the query plan operation, and populating each node's corresponding TT (e.g., one of DTTs 264). The TT (e.g., the one of the DTTs 264) referenced by the root node of the directed graph is used to provide the query result.

Continuing the example, responsive to a second SQL query being received, a second physical query plan is generated and executed, and a query result returned to the client that submitted the second SQL query. However, the generation of the second physical query plan does not require creating those one or more nodes (and possibly one or more subgraphs of nodes and edge(s)) that are already in the first physical query plan and can be shared because they are the same; the generation of the second query plan reuses (also referred to as "incorporates") those of the one or more nodes (and possibly one or more subgraphs) from the first physical query plan that are the same. With reference to FIG. 2, the query plan connector 232 determines whether the required second physical query plan can be generated by reusing/incorporating one or more of the nodes and/or subgraphs (as well as, in some embodiments, entire directed graphs) already in the physical query plans 242 that are currently being kept in memory after execution. If the query plan connector 232 determines that reuse/incorporation is possible, then only the missing part(s) for the second physical query plan (be it a node and edge, a subgraph, etc.) are added to the physical query plans 242 and connected by one or more edges to the one or more nodes and/or subgraphs (as well as, in some embodiments, entire directed graphs) that were determined to be reusable. As described above, in one embodiment the query plan connector 232 utilizes a logical query plan for the second SQL query and the node keys in the cache 234 (which was populated previously responsive to generating the first physical query plan). Where such reuse/incorporation is performed, the first and second SQL queries are such that each of the directed graphs is connected by at least one of its edges to at least one node of the other of the directed graphs such that those directed graphs share at least one node. Thus, the query plans are connected (also referred to as "overlap") in that they share at least a node, and can share more (e.g., a subgraph of two or more nodes and one or more edges). If, on the other hand, the query plan connector 232 determines that reuse/incorporation is not possible, then the nodes and edges for the directed graph of the second physical query plan are added to the physical query plans 242.

As described above, the sharing of nodes by the physical query plans (including intermediate nodes and possibly root nodes) and the keeping of the physical query plans and temporal tables in memory (particularly, the TTs populated by those nodes of each of the directed graphs that execute a query plan operator (e.g., DTTs 264 referenced by the DTTNs 244)) allows some embodiments to support near real-time streaming performance, including when working with large volumes of data. Again, this is in part because: 1) keeping the physical query plans in memory after execution and having them share nodes (where possible), and thus share the temporal tables which those shared nodes identify, reduces required memory, compute resources, and compute time; and 2) the use of temporal tables and keeping them in memory allows certain embodiments to implement one or more of the query plan operators to perform "incremental execution" (execution on only the "delta"; also referred to as "incremental query processing" and "incremental re-computation") to incrementally update, as necessary, the temporal tables identified by the nodes representing those query plan operators (incremental execution reduces required compute resources and compute time as compared to re-execution/re-computation of query plan operators on the entirety of each of the temporal table inputs to those query plan operators (referred to herein as "full re-execution")). Thus, additionally or alternatively, in one embodiment the generation and execution of a second query plan may include the incremental execution of at least the query plan operator represented by one of the nodes that is in the directed graph of a first query plan and that is shared with the directed graph of the second query plan.

The arrowed lines between the PCCM 214, parser 218, query rewriter 224, query optimizer 230, query executor 240, and non-query executor 228 in FIG. 2 represent some type of coupling, such as data flow and/or connectivity. For instance, in some embodiments the PCCM 214 calls each of the parser 218, query rewriter 224, query optimizer 230, query executor 240, and non-query executor 228 to coordinate the executing of the SQL statements 216, and thus the arrowed lines represent an order as opposed to, for example, the parser 218 calling the query rewriter 224.

As previously described, different embodiments may use different techniques to determine how long each of the nodes of the query plans and each of the TTs is kept in memory after execution. In one embodiment, an identification of "active" or "inactive" is maintained for each of the query plans (e.g., the identification may be associated with the root node of the directed graph of each of the query plans), and those nodes (and the TTs they reference) that are not part of an "active" query plan are candidates for removal from being kept in memory. By way of specific example, the Java Development Kit ("JDK") provides a "WeakReference" generic type. Instances of this type allow for the memory of the underlying object to be freed more aggressively by the Java Virtual Machine garbage collector than if a default Java reference (referred to as a "strong reference") were used. In one embodiment implemented in Java, the references in the cache 234 to the root and leaf nodes are of the strong reference type, while the references in the cache 234 to intermediate nodes are of the WeakReference type; and once a given root node in the cache 234 is released, the Java Virtual Machine garbage collector can free the memory consumed by the directed graph extending from that root node. Thus, the strong references for the root nodes in the cache 234 indicate that the query plans that start from those root nodes are "active," and when such a root node is released the query plan that starts with that root node switches to "inactive."

Examples

FIG. 3A illustrates an exemplary temporal table named "CUSTOMERS" at time T=0 according to one embodiment. FIG. 3B illustrates an exemplary temporal table named "ORDERS" at time T=0 according to one embodiment. The temporal tables of FIGS. 3A-B include a valid_from column, each field of which corresponds to the earliest time for which the corresponding data record is valid (also referable to as the valid_from timestamp), and a valid_to column, each field of which corresponds to the latest time for which a data record is valid (and is set to infinity, or INF, if that time is yet unknown) (also referable to as the valid_to timestamp). As previously described, while embodiments are described herein relative to the above discussed logical view and using the terms valid_to and valid_from columns (as is sometimes done in the art), alternative embodiments may implement the temporal tables differently (e.g., store the contents of the temporal tables in different ways (e.g., the contents may be stored using a row-oriented organization, using a column-oriented organization, use both a row-oriented and column-oriented organization for one or more temporal tables, using a row-oriented organization for one or more temporal tables and a column-oriented organization for one or more other temporal tables, etc.), store the timestamp information for the data records another way (e.g., using more or less fields), refer to the timestamp information by different terms, etc.)

In FIG. 3A, the other columns are named "CustomerID," "Name," and "PostalCode." In FIG. 3B, the other columns are named "OrderID," "CustomerID," "Price," and "Quantity." Since "CustomerID" is found in both temporal tables, it can operate as a key to relate the two temporal tables, as is known in the art. At time T=0, the contents of each of the temporal tables includes two data records.

FIG. 3C illustrates an exemplary SQL query according to one embodiment. Specifically, the exemplary SQL query 310 is "select * from CUSTOMERS, ORDERS where ORDERS.CustomerID=CUSTOMERS.CustomerID and CUSTOMERS.PostalCode=10001 and ORDERS.Quantity>4".

Figure 4:
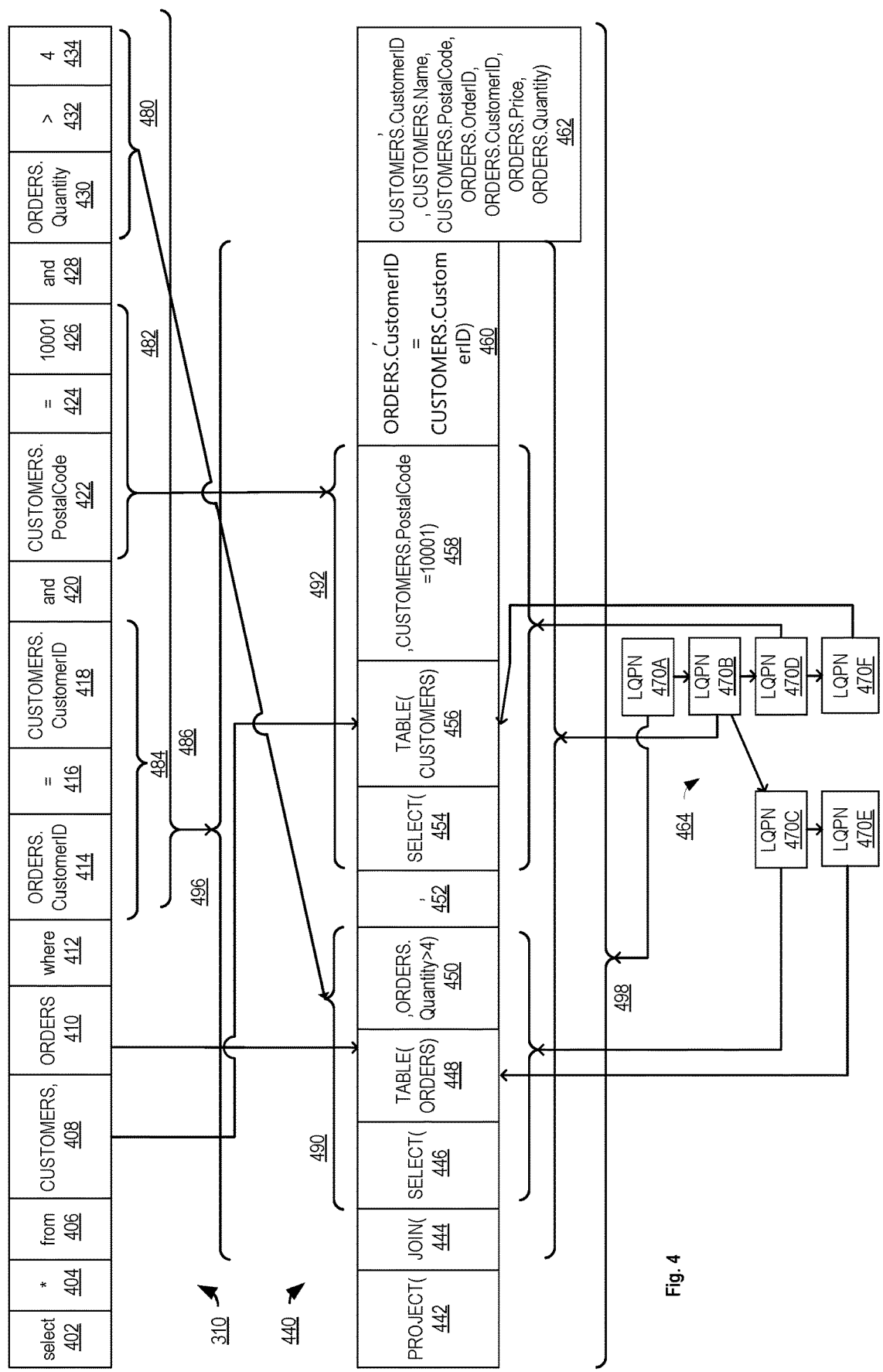
FIG. 4 illustrates a relationship of different parts of the exemplary SQL query 310 to an exemplary logical query plan 464 via an exemplary textual representation 440 according to one embodiment.

FIG. 4 illustrates a relationship of different parts of the exemplary SQL query 310 to an exemplary logical query plan 464 via an exemplary textual representation 440 according to one embodiment. FIG. 4 illustrates the exemplary SQL query 310 as separate elements as follows: "select" 402; "*" 404; "from" 406; "CUSTOMERS," 408; "ORDERS" 410; "where" 412; "ORDERS.CustomerID" 414; "=" 416; "CUSTOMERS.CustomerID" 418; "and" 420; "CUSTOMERS.PostalCode" 422; "=" 424; "10001" 426; "and" 428; "ORDERS.Quantity" 430; ">" 432; and "4" 434.

As described above, some embodiments generate logical query plans. In one embodiment, the logical query plan (e.g., exemplary logical query plan 464) for an SQL query (e.g., the exemplary SQL query 310) is a directed graph comprised of nodes (referred to herein as "logical query plan nodes" (LQPNs) and edges connecting those nodes) as is known in the art. The directed graph starts with a root logical query plan node (e.g., root LQPN 470A), includes zero or more intermediate LQPN (e.g., intermediate LQPNs 470B-D), and ends in one or more leaf LQPNs (e.g., leaf LQPNs 470E-F).

The exemplary textual representation 440 (which is the nodes of the exemplary SQL query plan 310 written out as strings to form a human readable version of the exemplary query plan) is for purposes of explanation, and need not be generated by certain embodiments. Further, alternative embodiments may generate for the exemplary SQL query 310 different query plans than that represented by the exemplary textual representation 440.

The exemplary textual representation 440 includes multiple types of "query plan operators" (e.g., PROJECT, SELECT, JOIN, and TABLE), as well as their "parameters." The "query plan operator type" (or "operator type") of each LQPN 470A-F identifies a particular one of the multiple types of query plan operators that an LQPN may identify. Some embodiments have multiple different implementations for one or more of the query plan operators; and some such embodiments may be configured so that the "operator type" identifies a particular one of the query plan operators and a particular one of the implementations of that query plan operator, while other such embodiments may be configured so that the "operator type" identifies a particular one of the query plan operators without reference to a specific implementation. Both the PROJECT and TABLE query plan operators effectively return data records of the temporal table they operate on (an input temporal table).

The temporal tables "CUSTOMERS" 408 and "ORDERS" 410 of the "from" 406 clause of the exemplary SQL query 310 are respectively mapped to the LQPN 470F and the LQPN 470E, which respectively represent "TABLE (CUSTOMERS)" 456 and "TABLE(ORDERS)" 448 in the exemplary textual representation 440.

A comparison predicate is the combination of a reference to a column of a temporal table (e.g., "ORDERS.Quantity" 430), a comparison operator (e.g., =, >, <), and another reference to a column of a table, a literal (e.g., "4" 434), or expression (e.g., "10001+1"). In one embodiment, if the comparison predicate is of the form "<column reference> <comparison operation> <literal>", then the comparison predicate is mapped to SELECT. This would include the comparison predicate "ORDERS.Quantity>4" 480 and the comparison predicate "CUSTOMERS.PostalCode=10001" 482 respectively being mapped to LQPN 470C and LQPN 470D, where LQPN 470C represents "SELECT(" 446 on the result of its child LQPN 470E (which performs "TABLE (ORDERS)" 448) and the comparison predicate ", ORDER-S.Quantity>4)" 450 (the operation 490), and where LQPN 470D represents "SELECT(" 454 on the result of its child LQPN 470F (which performs "TABLE(CUSTOMERS)" 456) and the comparison predicate ", CUSTOMERS.Postal-Code=10001" 458 (the operation 492).

In one embodiment, if the comparison predicate is of the form "<column reference>=<column reference>" then the comparison predicate is mapped to a JOIN. This would include the comparison predicate "ORDERS.CustomerID=CUSTOMERS.CustomerID" 484 being mapped to LQPN 470B, which represents "JOIN(" 444 on the result of its child LQPNs 470C and 470D (which respectively perform "SELECT(TABLE(ORDERS),OR-DERS.Quantity>4), and SELECT(TABLE(CUSTOMERS), CUSTOMERS.PostalCode=10001)") and the comparison predicate 460 (the operation 496, which completes the "where" 412 clause labeled 486). While the illustrated example has been optimized such that the JOIN operates upon the comparison predicate "ORDERS.CustomerID=CUSTOMERS.CustomerID" 460 and the results of the two SELECT operations (490 and 492), alternative embodiments may optimize differently or not at all.

The SELECT statement (including "select" 402 and "*" 404) is mapped to LQPN 470A, which represents "PROJECT(" 442 on the result of its child LQPN B (which performs "JOIN(SELECT(TABLE(ORDERS),ORDERS.Quantity>4),SELECT(TABLE(CUSTOMERS), CUSTOMERS.PostalCode=10001), ORDERS.CustomerID=CUSTOMERS.CustomerID" and the list of columns "CUSTOMERS.CustomerID,CUSTOMERS.Name,CUSTOMERS.PostalCode,ORDERS.OrderID, ORDERS.CustomerID,ORDERS.Price,ORDERS.Quantity)" 462 (the operation 498).

The term "parameter" is used herein to refer to additional information required to perform the operation corresponding to the "operator type" (e.g., a table reference like "ORDERS" or "CUSTOMERS", a comparison predicate like "ORDERS.Quantity>4," "CUSTOMERS.PostalCode=10001," or "ORDERS.CustomerID=CUSTOMERS.CustomerID," a list of columns like "CUSTOMERS.CustomerID, CUSTOMERS.Name, CUSTOMERS.PostalCode, ORDERS.OrderID, ORDERS.CustomerID, ORDERS.Price, ORDERS.Quantity"; etc.).

In one embodiment, each of the LQPNs 470A-F is implemented with a data structure that includes: 1) a "child reference(s) field" to store reference(s) to any child nodes (e.g., the child nodes of LQPN 470B are LQPN 470C and LQPN 470D); and 2) a set of one or more "descriptor field(s)" to store the operator type and its one or more parameters for the operation. In one embodiment, there are two descriptor fields: 1) an "operator type field" to store an indication of the operator type; and 2) an "other parameters field" to store the parameters. In another embodiment, each of the LQPNs 470A-F implements a descriptor field that stores a whole node key that includes the operator type and its one or more parameters. Some embodiments implement a logical query plan as a "light graph" (i.e., a graph which includes minimal information to represent a query plan), where a light graph is generated to facilitate the generation of a physical query plan. Alternative embodiments may include more, less, and/or different information in the logical query plan and/or forgo the generation of a logical query plan.

Figure 5A:
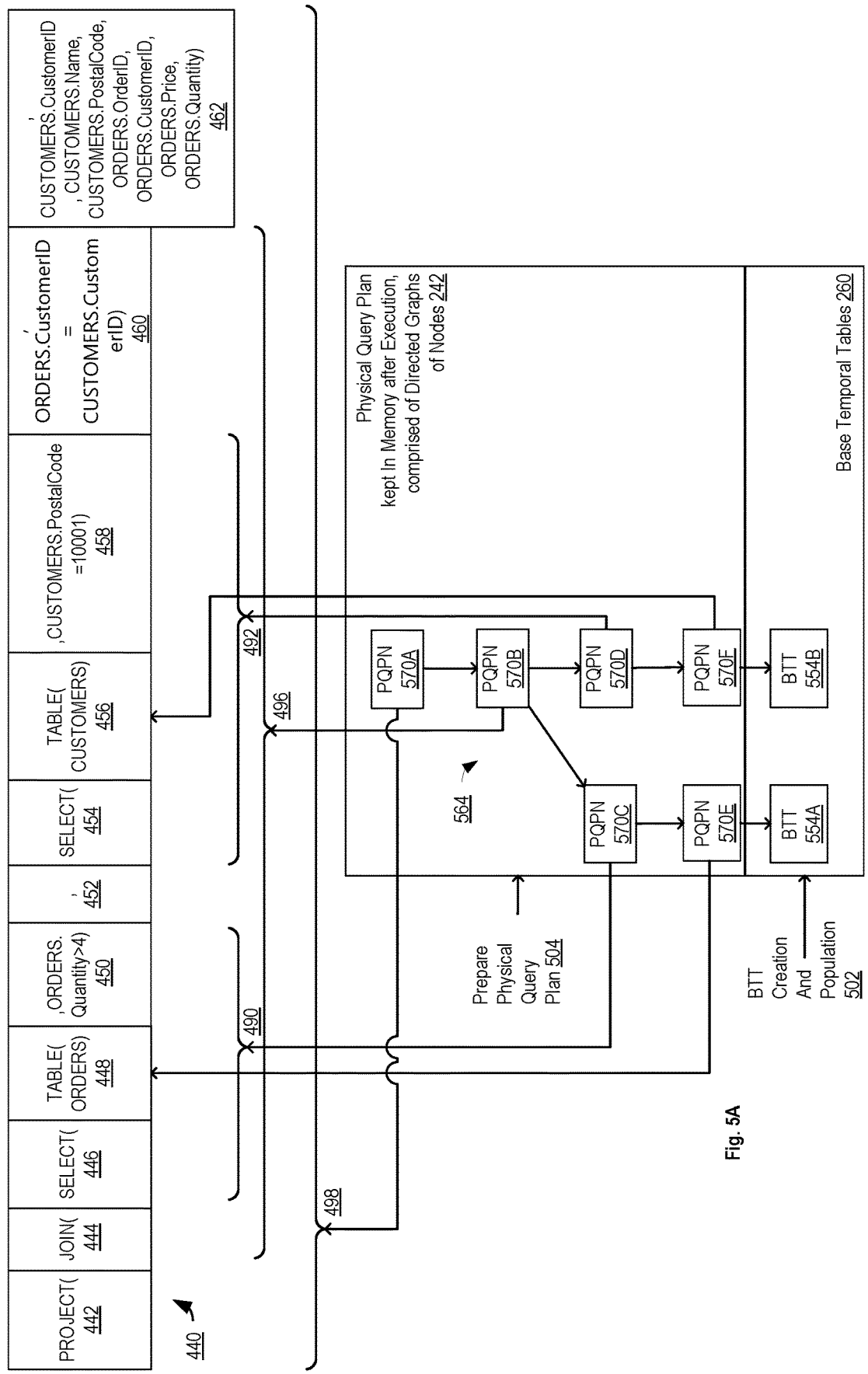
FIG. 5A illustrates a relationship of different parts of the exemplary textual representation 440 to an exemplary physical query plan according to one embodiment.

FIG. 5A illustrates a relationship of different parts of the exemplary textual representation 440 to an exemplary physical query plan according to one embodiment. FIG. 5A reproduces the physical query plans 242 and the base temporal tables 260 of FIG. 2, as well as the exemplary textual representation 440 and the labels identifying the operations 490, 492, 496, and 498 of FIG. 4. As with FIG. 4, the exemplary textual representation 440 (which is the nodes of the exemplary query plan written out as strings to form a human readable version of the exemplary query plan) is for purposes of explanation, and need not be generated by certain embodiments. Further, alternative embodiments may generate for the exemplary SQL query 310 different query plans than that represented by the exemplary textual representation 440. The exemplary textual representation 440 and the different operations 490, 492, and 498 are illustrated to identify the query plan operation (including operator type and parameter(s)) that each of PQPNs 570A-F will perform when executed. The "operator type" of each PQPN 570A-F identifies a particular one of the multiple types of query plan operators that that PQPN performs. Again, some embodiments have different implementations for one or more of the query plan operators; and some such embodiments may be configured so that the "operator type" identifies a particular one of the query plan operators and a particular one of the implementations of that query plan operator, while other such embodiments may be configured so that the "operator type" identifies a particular one of the query plan operators without reference to a specific implementation.

As previously described, operation begins in one embodiment with no query plans (logical or physical) or TTs being kept in memory (physical query plans 242, BTTs 260, and DTTs 264 are empty), and the cache 234 being empty. By way of example, responsive to SQL statements (including two CREATE TABLE SQL statements and two INSERT SQL statements), BTT creation and population 502 occurs and results in: 1) a leaf PQPN 570E and a corresponding BTT 554A being created; and 2) a leaf PQPN 570F and a corresponding BTT 554B being created. In the embodiment of FIG. 2, an entry is created for each of PQPN 570E and PQPN 570F in the cache 234.

Responsive to the exemplary SQL query 310 being received, an exemplary physical query plan 564 is generated at 504. Generating the exemplary physical query plan 564 includes creating the one or more necessary intermediate and root nodes (PQPNs 570A-D) and adding the necessary edges to appropriately connect those nodes to form the directed graph (including adding edges to the leaf PQPNs 570E-F). In this example, it is determined that PQPN 570E and PQPN 570F are already in the physical query plans 242 and can be incorporated into the physical query plan 564; it is also determined that PQPN 570A-D must be added to the physical query plans 242 and connected by one or more edges to PQPN 570E and PQPN 570F to form the direct graph. In the embodiment of FIG. 2, these determinations are made through determining whether there is a cache hit in the cache 234.

In an embodiment that first implements a logical query plan (e.g., the exemplary logical query plan 464), the logical query plan can represent the directed graph that is to be generated as the physical query plan (e.g., the physical query plan 564 has the same number of nodes that are responsible for the same operations (operator type and parameter(s)) and connected by the same number of edges to form the same shape as the exemplary logical query plan 464, and thus the same lettered nodes of PQPN 570A-F correspond to the same lettered nodes of LQPNs 470A-F) and is used to determine whether the required physical query plan can be generated by reusing or incorporating one or more of the nodes and/or subgraphs (as well as, in some embodiments, entire directed graphs) already in the physical query plans 242 that are currently being kept in memory after execution. In the example, it is determined that LQPN 470E and LQPN 470F can respectively be performed by PQPN 570E and PQPN 570F that are already in the physical query plans 242, and thus can be incorporated into the physical query plan 564; it is also determined that PQPN 570A-D must be added to the physical query plans 242 and connected by edges to PQPN 570E and PQPN 570F determined to be reusable. In an embodiment that first generates a logical query plan and uses the cache 234, these determinations are made by determining whether node keys already exist in the cache 234 for one or more of the nodes and/or subgraphs (as well as, in some embodiments, entire directed graphs) based on the directed graph of the logical query plan, and only those PQPN(s) and edges that are not already in the physical query plans 242 are created.

As used herein, the term "query plan" may refer to a "logical query plan" or a "physical query plan," and the terms "node" or "query plan node" (QPN) may refer to a "LQPN" or a "PQPN."

Figure 5B:
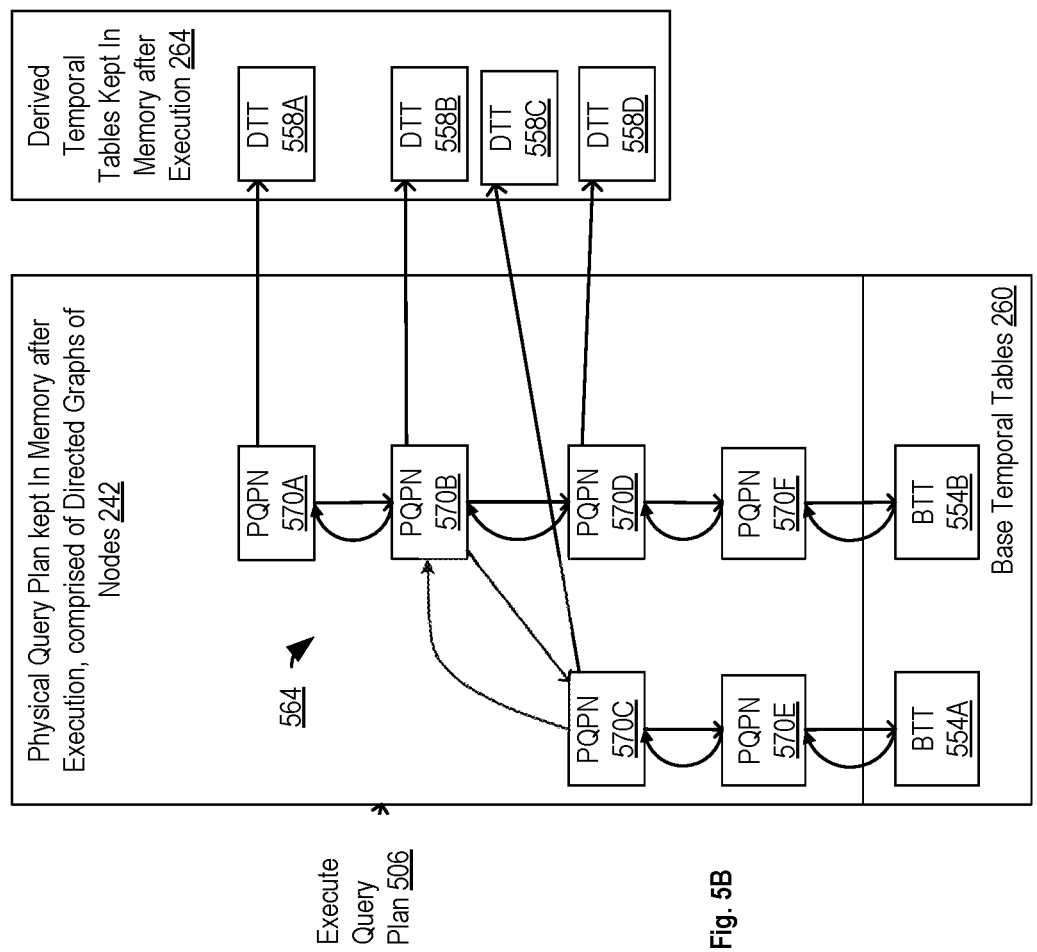
FIG. 5B illustrates the execution of the exemplary physical query plan 564 according to one embodiment.

FIG. 5B illustrates the execution of the exemplary physical query plan 564 according to one embodiment. FIG. 5B reproduces the physical query plans 242, the base temporal tables 260, and the derived temporal tables 264 of FIG. 2, as well as the exemplary physical query plan 564 (including the directed graph comprised of PQPNs 570A-F) and the BTTs 554A-B of FIG. 5A. As previously described, the query plan for each unique query is comprised of a directed graph that starts with a root node (e.g., PQPN 570A), includes zero or more levels of intermediate nodes (e.g., PQPNs 570B-D), and ends in one or more leaf nodes (e.g., PQPNs 570E-F). During execution, recursive calls are made from the root node down to the leaf node(s), and data generated as a result of this execution flows up from the leaf node(s), through the intermediate nodes, to the root node (illustrated by curved arrows); thus, execution results in data flowing from leaf-to-root. In one embodiment, a call is made to the root node (PQPN 570A) to perform its query plan operation, which results in call(s) to the root node's child node(s) (e.g., PQPN 570B), and so on recursively down to the leaf nodes (e.g., PQPN 570B calls PQPNs 570C-D, PQPN 570C calls PQPN 570E; and PQPN 570D calls PQPN 570F); completion of execution of a given node causes the result to be provided to its parent node (if any); when all child node(s) of a given parent node have completed execution and provided their results to that given parent node, then that parent node executes and provides its result to its parent nodes, if any.

Each of the root and intermediate PQPN 570A-D identify a DTT 558A-D in the derived temporal tables kept for potential reuse 264. When each of the root and intermediate PQPNs 570A-D is executed, it updates the corresponding one of the DTTs 558A-D that the PQPN identifies. The query result is produced from the DTT 588A identified by the root PQPN 570A.

In one embodiment, the BTTs 260 and DTTs 264 are objects of a TT class, and an object of the TT class includes: 1) the data of the data records of the temporal table; and 2) one or more methods to access the data records from that TT. In one embodiment, each PQPN: 1) identifies a temporal table (e.g., has a reference that identifies a BTT or a DTT); and 2) includes an Evaluate method, which performs the query plan operation specified by the query plan operator and its one or more parameters (e.g., TABLE(ORDERS), where TABLE is the query plan operator and ORDERS is its parameter), and returns data records of the identified temporal table (e.g., returning a reference to the identified BTT or DTT which a parent node can use to access the data records of the identified temporal table). Since making copies can be expensive (esp. for large tables), a reference to a read-only view, or read-only copy, of the DTT/BTT identified by a PQPN is returned by that PQPN's Evaluate method, allowing a caller (e.g., a parent node) that called that method to then access the records needed from the TT returned (in some cases, only increments, in other cases, the whole table).

In an embodiment in which the nodes of the physical query plans 242 are implemented as "temporal table nodes" (TTNs), and can be classified as derived temporal table nodes (DTTNs) 244 and base temporal tables nodes (BTTNs) 246 as described with reference to FIG. 2, the PQPNs 570A-D would be implemented as DTTNs 244 and the PQPNs 570E-F would be implemented as BTTNs 246. In other words, the DTTNs 244 include the root nodes and intermediate nodes of the directed graphs of the physical query plans 242, while the BTTNs 246 include the leaf nodes of the directed graphs of the physical query plans 242. In one embodiment, the DTTNs 244 and BTTNs 246 are respectively objects of a DTTN class and a BTTN class, and both classes include: 1) a TT reference field; and 2) an Evaluate method (referred to respectively as DTTN.Evaluate and BTTN.Evaluate). A parent node calls a child node's Evaluate method, and the child node's Evaluate method returns a reference to a read-only view, or read-only copy, of the one of the DTTs 264 or BTTs 260 identified by that child node; and the parent node can then call method(s) of that DTT or BTT to access data records (which can be all the data records for some query plan operations, or the delta since the last update for others) of the temporal table encapsulated by that DTT or BTT. Execution of a DTTN.Evaluate method of an instance of the DTTN class performs the query plan operation of that node, stores the results in the one of the DTTs identified by the TT reference field of that DTTN, and returns a reference to a read-only view, or read-only copy, of that DTT. Execution of a BTTN.Evaluate method of an instance of the BTTN class returns a reference to a read-only view, or read only copy, of the one of the BTTs 260 referenced by that BTTN. Thus, execution of the DTTN.Evaluate method of a DTTN implementing PQPN 570A includes: 1) a call to the DTTN.Evaluate method of the child DTTN (PQPN 570B) which returns the read-only view, or read only copy, of the DTT 558B, and then a call to a method(s) to access data records of the DTT 558B as inputs to the operation; 2) performance of the appropriate query plan operation; 3) storage of the result of that query plan operation in the DTT 558A identified by the TT reference field; and 4) return of a reference to the read-only view, or read only copy, of the DTT 558A. Execution of the DTTN.Evaluate method of a DTTN implementing PQPN 570B includes: 1) a call to the DTTN.Evaluate method of the child DTTNs (PQPNs 570C-D) which returns the read-only view, or read only copy, of the DTTs 558C-D, and then calls to a method(s) to access data records of those DTTs 558C-D as inputs to the operation; 2) performance of the appropriate query plan operation; 3) storage of the result of that query plan operation in the DTT 558B identified by the TT reference field; and 4) return of a reference to the read-only view, or read only copy, of the DTT 558B. Execution of the DTTN.Evaluate method of each of the lowest level DTTNs (e.g., PQPNs 570C-D) includes: 1) a call to the BTTN.Evaluate method of the BTTN referenced by that DTTN (e.g., PQPN 570E) which returns the read-only view, or read only copy, of the BTT referenced by that BTTN (e.g., BTT 554A), and then a call to a method(s) to access the data records of that BTT (e.g., BTT 554A); 2) performance of the appropriate query plan operation; 3) storage of the result of that query plan operation in the one of the DTTs 264 identified by the TT reference field (e.g., DTT 558C); and 4) return of a reference to the read-only view, or read only copy, of that DTT (e.g., DTT 558C). It should be apparent to one of ordinary skill in the art that the structure of a directed graph is indicative of which nodes may be executed in parallel (e.g., child nodes of a parent node). While one embodiment is described which implements the nodes of the physical query plans 242 as TTNs (and more specifically, DTTNs 244 and BTTNs 246) for purposes of illustration, alternative embodiments may implement the nodes of the physical query plans 242 differently.

FIG. 6 illustrates exemplary overlapping physical query plans according to one embodiment. FIG. 6 shows the exemplary SQL query 310, exemplary textual representation 440, the physical query plan 564 (including PQPNs 570A-F) in physical query plans 242, and the BTTs 554A-B in the base temporal tables 260. FIG. 6 also shows additional exemplary SQL queries, exemplary textual representations of query plans for those SQL queries, and exemplary physical query plans for those SQL queries according to one embodiment. For each of the additional exemplary SQL queries 602, 604, 606, and 608, FIG. 6 shows the part of that SQL query that is the same as the exemplary SQL query 310 and ellipses where it differs (e.g., additional exemplary SQL query 602 is shown as "select * from . . . , ORDERS, . . . where . . . "). In addition, FIG. 6 shows a respective exemplary textual representation 612, 614, 616, and 618 for the additional exemplary SQL queries 602, 604, 606, and 608. For each of the exemplary textual representations 612, 614, 616, and 618, FIG. 6 shows the part of that textual representation that is the same as the exemplary textual representation 440 and ellipses where it differs (e.g., exemplary textual representation 612 is shown as "PROJECT ( . . . TABLE (ORDERS) . . . )").

In addition, FIG. 6 illustrates part of each of a respective physical query plan 622, 624, 626, and 628 for each of the exemplary textual representations 612, 614, 616, and 618. The part of each of the respective physical query plan 622, 624, 626, and 628 shown includes: 1) a first subpart (a node or subgraph) that is shared with the physical query plan 564; and 2) a second subpart that is not shared, but that includes at least one node connected by one edge to the first subpart. Thus, FIG. 6 illustrates that the directed graphs of the physical query plans 564, 622, 624, 626, and 628 are connected (also referred to as "overlap") in that they share at least a node, and in some cases a subgraph of two or more nodes and one or more edges. For instance, physical query plan 622 includes a PQPN 670A (not shared) having PQPN 570E as a child node (there is an edge connecting PQPN 670A to PQPN 570E), and thus PQPN 570E is a shared node (a leaf node) between physical query plan 622 and physical query plan 564. The physical query plan 628 includes a PQPN 670F (a root node that is not shared) having PQPN 570B (an intermediate node) as a child node, and thus the subgraph of PQPN 570B-F (that is, the subgraph of PQPN 570B and its descendant nodes; that is, PQPN 570B, PQPN 570C-D, and PQPNs 570E-F) is a shared subgraph between physical query plan 628 and physical query plan 564. The physical query plan 624 includes a PQPN 670B (not shared) having PQPN 670C (not shared) and PQPN 570C (an intermediate node) as child nodes, and thus the subgraph of PQPN 570C-E is a shared subgraph between physical query plan 624 and physical query plan 564. The physical query plan 626 includes a PQPN 670D (not shared) having PQPN 670E (not shared) and PQPN 570B (an intermediate node) as child nodes, and thus the subgraph of PQPN 570B-F is a shared subgraph between physical query plan 626 and physical query plan 564.

In the illustrated examples, nodes are shared when a query plan operation is the same in more than one query plan. In other words, if a query plan operation is the same in two (or more) query plans, then the node representing that query plan operation (and any descendent nodes—that is, any node(s) reachable by repeated proceeding from parent to child) can be shared.

As previously described, where a first query plan is already generated and kept in memory after execution (e.g., physical query plan 564), then the generation of a second query plan (e.g., any of physical query plans 622, 624, 626, and 628) does not require creating those one or more nodes (and possibly one or more subgraphs of nodes and edges) required for the second query plan that are already in the first query plan (e.g., physical query plan 564) and can be shared because they are the same as those required nodes; the generation of the second query plan (e.g., any of physical query plans 622, 624, 626, and 628) reuses (also referred to as "incorporates") those of the one or more nodes (and possibly one or more subgraphs) from the first query plan (e.g., physical query plan 564) that are the same as those required for the second query plan. Furthermore, where a first physical query plan is already generated and kept in memory after execution (e.g., physical query plan 564), then the generation of a second logical query plan corresponding to the first physical query plan does not require creating any nodes because the first physical query plan (the entire directed graph, including its nodes and edges) can be reused.

Thus, in the illustrated examples, the shared nodes implement parts of the exemplary SQL queries where clauses, or parts of clauses, of the SQL queries are the same; thus, the SQL queries share parts (also referred to as "overlap") such that the query plans generated to implement those SQL queries can share nodes (also referred to as "overlap"). While FIG. 6 illustrates exemplary SQL queries that overlap, it should be understood the physical query plans for two SQL queries can overlap without those SQL queries overlapping in some embodiments. Additionally, query plan optimizations applied in generating query plans may result in more, less or no overlapping in physical query plans for two or more SQL queries.

Incremental Update and Execution

FIG. 7A is a flow diagram illustrating incrementally updating temporal tables responsive to a modification of at least one of the temporal tables of the temporal-relational database, according to one embodiment. As previously described, implementations of the typical relational database operations (e.g., PROJECT, JOIN, SELECT, TABLE) that operate on temporal tables are known in the art (e.g., D. Pfoser and C. S. Jensen, "Incremental Join of Time-Oriented Data," In Proc. 11$^{th}$ Intl. Conf. Scientific and Statistical Database Management, pages 232-243, 1999; Jun Yang and Jennifer Widom, "Maintaining Temporal Views Over Non-Temporal Information Sources For Data Warehousing," In EDBT '98 Proc. 6$^{th}$ Int. Conf. on Extending Database Technology: Advances in Database Technology, pages 389-403, 1998). In one embodiment, one, some, most, or all of the query plan operators are implemented to support incremental execution to incrementally update the temporal tables, rather than full re-execution/re-computation. The flow diagram of FIG. 7A may occur after the flow diagram in FIG. 1.

At block 702 of FIG. 7A, the contents of at least a given one of the temporal tables that is part of the temporal-relational database and that at least one of the SQL queries requires accessing data from is modified. For example, this may occur responsive to RDBMS receiving an INSERT, UPDATE, or DELETE SQL statement, or other similar SQL statements that modify the contents of a temporal table by adding data records, deleting data records, and/or changing the content of existing data records. As previously described, such an operation may be included in the SQL statements 216 and executed by the non-query executor 228 to modify one of the BTTs 254. From block 702, control passes to block 704.

In block 704, the temporal tables identified by the ancestors of the node identifying the modified temporal-relational database table (those of the temporal tables identified by those of the nodes that are of the directed graph of the query plan for the at least one of the SQL queries and that depend directly or indirectly upon the node that identifies the given one of the temporal tables) are updated. These updates are performed through incremental execution where possible (e.g., where the embodiment implements an Evaluate method that can perform the query plan operation incrementally). The timing for performing block 704 relative to block 702 may be determined differently in different embodiments (e.g., immediately; in embodiments that support lazy update it is delayed until one or more events occur (e.g., a need to send a query result to a client, a fixed amount of time elapses, a programmable amount of time elapses, a calculated amount of time based the nodes and edges (e.g., based on the nodes' connectedness to other nodes, the types of the nodes, their historical use, etc.) elapses, the arrival rate of other SQL queries exceeds a threshold, and/or available computational resources falls below a threshold) as previously described). From block 704, control passes to block 706.

In some embodiments that support skipping update, only those of the query plan operations performed by those of the nodes that depend directly or indirectly upon the node that identifies the temporal table modified in block 702 are executed (the other nodes are skipped (e.g., in one embodiment, the other nodes would have their Evaluate method called but would not execute a query plan operation, and would not call Evaluate on their child nodes (if any)), thus gaining the further performance advantage of not executing updates of temporal tables that were not affected by the modification). In alternative embodiments, the query plan operations performed by all of the nodes that are of the directed graph of the query plan for the at least one of the plurality of SQL queries are executed (through incremental execution where possible and implemented).

As shown in block 706, an incremental update to the query result for the at least one of the plurality of SQL queries is transmitted to those of the clients that submitted the at least one of the plurality of SQL queries. Thus, one embodiment transmits an incremental update to the query result (that is, transmitting just the "delta" and thus avoiding transmitting the entire query result).

For instance, assume that responsive to a client submitting an SQL query, the RDBMS generated a physical query plan and transmitted the query result to the client, and then there is a modification to the contents of a base temporal table that is identified by a leaf node of the directed graph (block 702). If the query plan and temporal tables are still being kept in memory after execution for potential reuse, the RDBMS may incrementally update (block 704) and transmit to the client an incremental update to a previously transmitted query result (that is, transmitting data to the client where the data identifies changes to the query result that satisfies that SQL query since that client was last sent that query result, rather than retransmitting that part of the query result that was already transmitted to the client) (block 706). Of course, if a second client submits the same SQL query while the query plan and temporal tables are still being kept in memory after execution for potential reuse, the RDBMS may incrementally update (block 704) and transmit the full query result to the second client.

FIG. 7B illustrates incremental execution and incremental update relative to the exemplary physical query plan 564 and exemplary physical query plan 628 according to one embodiment. FIG. 7B reproduces: 1) the physical query plans 242, the base temporal tables 260, and the derived temporal tables 264 of FIG. 2; 2) the exemplary physical query plan 564 (including the directed graph comprised of PQPNs 570A-F) and the BTTs 554A-B of FIGS. 5A-B and 6; 3) the DTTs 558A-D identified by the respective PQPNs 570A-D as in FIG. 5B; and 4) the physical query plan 628 (including the directed graph comprising of PQPN 670F and PQPNs 570B-F). FIG. 7B also illustrates a DTT 758A identified by PQPN 670F. Assume the physical query plans 564 and 628 have previously been executed and the query results respectively provided to a first and second client. At 710 the contents of the BTT 554A are modified (e.g., block 702). At 720, nodes of the query plan(s) are incrementally executed responsive to block 710 (e.g., see discussion of block 704 for the possible timing). Assuming that only the physical query plan 564 is to be updated, a first embodiment only incrementally executes PQPNs 570E, C, B, and A as illustrated by the curved arrows 722, 724, and 728 (and only DTTs 558A-C are updated, and only incrementally updated as reflected by incremental updates 740). A second embodiment does the same as the first, but also incrementally executes PQPN 670F because it depends indirectly on BTT 554A as illustrated by the dashed curved arrow 730 (and DTT 758A is also updated, and only incrementally updated as reflected by incremental update 744). A third embodiment does the same as the first, but also incrementally executes PQPNs 570D and F as illustrated by the dashed curved arrows 736 and 732 because they are part of the exemplary physical query plan 564 (but DTT 558D is not updated because there have been no changes that affect it directly or indirectly). A fourth embodiment does the operations of the first, second, and third. In all of these embodiments, the DTTs are only incrementally updated, and thus have the benefits described above with regard to incrementally updating temporal tables.

In the above paragraph, the first and second embodiments avoid the execution (be it incremental execution or full re-execution) of query plan operations performed by PQPNs 570D and F (which is referred to herein as skipping update); this may be accomplished differently in different embodiments. In one embodiment that supports skipping update, each query plan is generated as a bidirectional graph; meaning, each parent node identifies its child node(s) (if any), and each such child node identifies that parent node. Due to the use of bidirectional graphs and query plan overlap/connectedness (node sharing), another perspective is that each leaf node (e.g., PQPNs 570E-F) is also a root node of another directed graph referred to as a "dirty notification directed graph," a "base table directed graph," or a "BTTN directed graph." Each "dirty notification directed graph" starts with its root node (e.g., PQPN 570E), includes one or more levels of intermediate nodes (e.g., PQPNs 570C and B), and ends with one or more leaf nodes (e.g., PQPN 570A and PQPN 670F) of that "dirty notification directed graph" (which are each root nodes of a query plan—e.g., physical query plans 564 and 628). A "dirty notification directed graph" may be used to track each node affected by a change in a BTT by making recursive calls from the root node of that dirty notification directed graph up (e.g., PQPN 570E) to the leaf node(s) of that dirty notification directed graph (e.g., PQPN 570A and PQPN 670F, which are root node(s) of the physical query plans 564 and 628), thereby allowing a dirty indication to flow up from the root node of that dirty notification directed graph up (e.g., PQPN 570E) through the intermediate nodes (e.g., PQPN 570C and B) and to the root nodes of the query plan(s) which consume that BTT (e.g., PQPN 570A and PQPN 670F, which are root node(s) of the physical query plans 564 and 628). These dirty indications can be used in conjunction with lazy update in that they provide a mechanism that tracks the updates that have been delayed, and these dirty indications can be used for skipping update in that they provide a mechanism that tracks for which of the nodes the query plan operation should be executed (be it incremental execution or full re-execution). In other words, all those nodes that are marked as dirty are to be included in the batch to be executed in the next update of the DTTs affected (directly or indirectly) by the modification of the BTT, and the query plan operations for only those nodes that are marked as dirty are to be executed (be it incremental execution or full re-execution) (execution of those nodes that are not marked as dirty is skipped) in the next update of the DTTs affected (directly or indirectly) by the modification of the BTT.

Overlapping Query Plans and Incremental Execution

Figure 8:
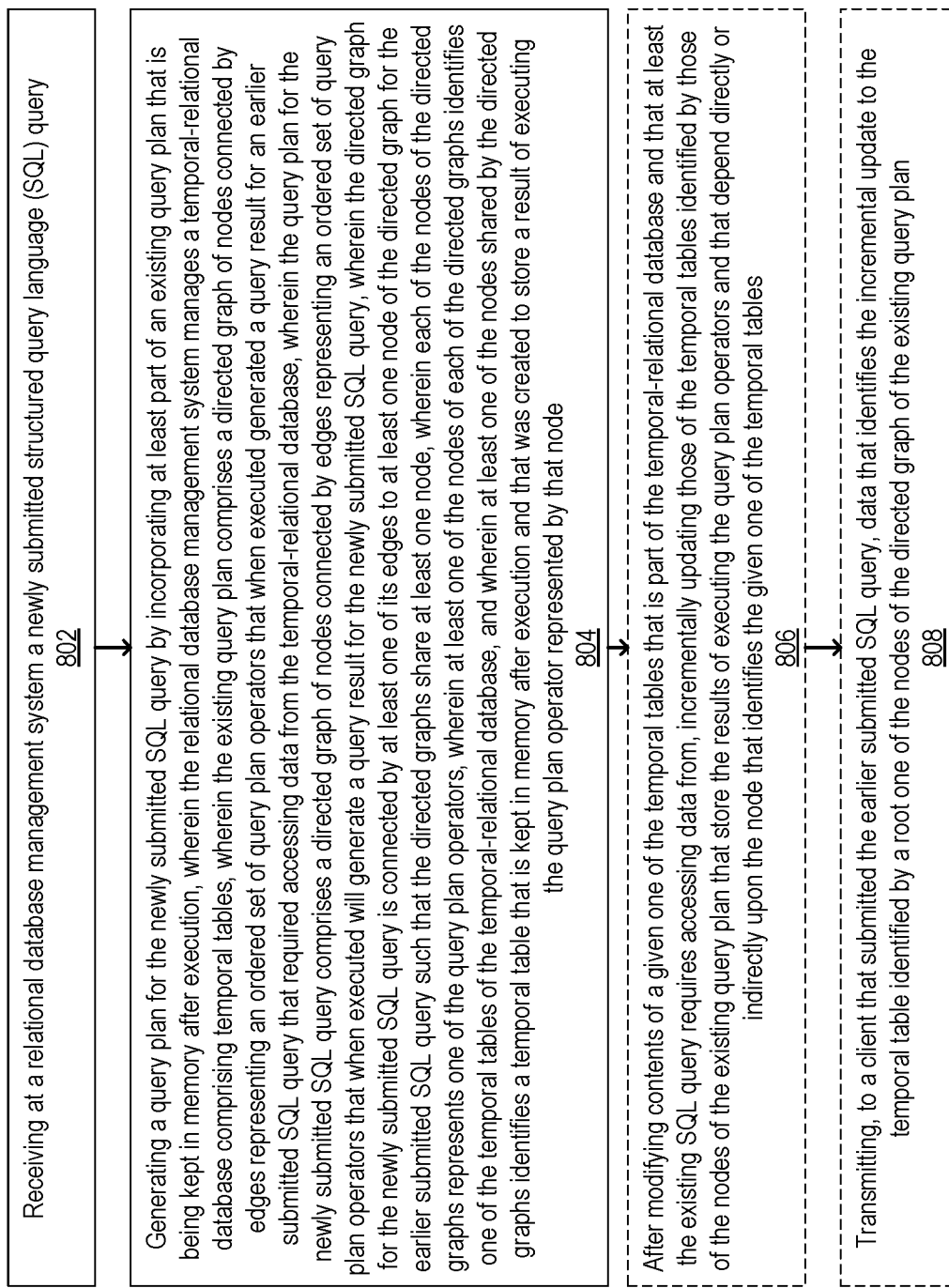
FIG. 8 is a flow diagram illustrating the combination of overlapping query plans and incremental execution according to one embodiment.

FIG. 8 is a flow diagram illustrating the combination of overlapping query plans and incremental execution according to one embodiment. Block 802 illustrates receiving at a relational database management system a newly submitted structured query language (SQL) query, and control passes to block 804.

Block 804 shows generating a query plan for the newly submitted SQL query by reusing at least part of an existing query plan that is being kept in memory (i.e., in volatile memory, non-volatile memory, and/or combinations thereof) after execution. As before, the relational database management system manages a temporal-relational database comprising temporal tables. The existing query plan comprises a directed graph of nodes connected by edges representing an ordered set of query plan operators that when executed generated a query result for an earlier submitted SQL query that required accessing data from the temporal-relational database. The query plan for the newly submitted SQL query comprises a directed graph of nodes connected by edges representing an ordered set of query plan operators that when executed will generate a query result for the newly submitted SQL query. The directed graph for the newly submitted SQL query is connected by at least one of its edges to at least one node of the directed graph for the earlier submitted SQL query such that the directed graphs share at least one node, where each of the nodes of the directed graphs represents one of the query plan operators. Further, at least one of the nodes of each of the directed graphs identifies one of the temporal tables of the temporal-relational database, and at least one of the nodes shared by the directed graphs identifies a temporal table that is kept in memory after execution and that was created to store a result of executing the query plan operator represented by that node. From block 804, control passes to block 806.

Dashed block 806 shows that, after modifying contents of a given one of the temporal tables that is part of the temporal-relational database and that at least the existing SQL query requires accessing data from, incrementally updating those of the temporal tables identified by those of the nodes of the existing query plan that store the results of executing the query plan operators and that depend directly or indirectly upon the node that identifies the given one of the temporal tables. There are further efficiency gains in embodiments in which this incrementally updating includes one or more of the query plan operators, represented by one or more of those of the nodes of the existing query plan that depend directly or indirectly upon the node that identifies the given one of the temporal tables, is incrementally executed (as opposed to re-executing the query plan operator of such a node on the valid rows of the temporal table identified by each child node of that node (full re-execution)). From block 806, control passes to block 808.

Dashed block 808 illustrates transmitting, to a client that submitted the earlier submitted SQL query, data that identifies the incremental update to the temporal table identified by a root one of the nodes of the directed graph of the existing query plan.

Additionally or alternatively to blocks 806 and 808, one embodiment performs the following: 1) executing the query plan for the newly submitted SQL query by reusing, including incrementally updating as necessary, the temporal table identified by the at least one node that is shared by the directed graphs; and 2) transmitting the query result for the newly submitted SQL query to a client that submitted the newly submitted SQL query. Additionally or alternatively to blocks 806 and 808, one embodiment performs the following: 1) incrementally executing the query plan operator represented by the at least one node that is shared by the directed graphs as part of executing the query plan for the newly submitted SQL query; and 2) transmitting the query result for the newly submitted SQL query to a client that submitted the newly submitted SQL query. Additionally or alternatively, in one embodiment the existing query plan is being kept in memory after execution so that the nodes and subgraphs of the directed graph are available for potential reuse. Additionally or alternatively, in one embodiment each of the temporal tables that was created to store the result of executing the query plan operator represented by that node is being kept in memory after execution for potential reuse. Additionally or alternatively, in one embodiment the generating includes: 1) identifying at least one of the nodes of the directed graph of the existing query plan may be reused; and 2) adding to the directed graph of the query plan for the newly submitted SQL query an edge connected to the identified node. Additionally or alternatively, the generating may include: 1) identifying that there is a part of the existing query plan that may be reused, wherein the identified part includes the at least one node of the directed graphs that will be shared; and 2) reusing the identified part in the query plan for the newly submitted SQL query rather than recreating the identified part. The relational database management system may also transmit the query result for the newly submitted SQL query to that same client and/or a different client. Additionally or alternatively, in one embodiment one or more of the query plan operators perform temporal-relational algebra operations. Additionally or alternatively, one embodiment supports the directed graphs each including a root node, at least one or more leaf nodes, and at least one or more intermediate nodes; where an intermediate node is one which has both one or more parent nodes and one or more child nodes (the root node is connected to at least one of the intermediate node(s), and each of the intermediate nodes is connected to at least another of the intermediate nodes or one of the leaf nodes); and these two directed graphs at least sharing one of the intermediate nodes and its descendant nodes. Additionally or alternatively, one embodiment supports the query plans sharing a subgraph of the nodes and edge(s).

Additionally or alternatively, in one embodiment the earlier submitted SQL query was transmitted by the client as a subscription SQL query, and the newly submitted SQL query is received by the relational database management system while the existing query plan is being kept in memory after execution because of the subscription SQL query. Also, the various embodiments described with reference to FIG. 1 generally apply to FIG. 8.

Node Key-To-Node Cache

Figure 9:
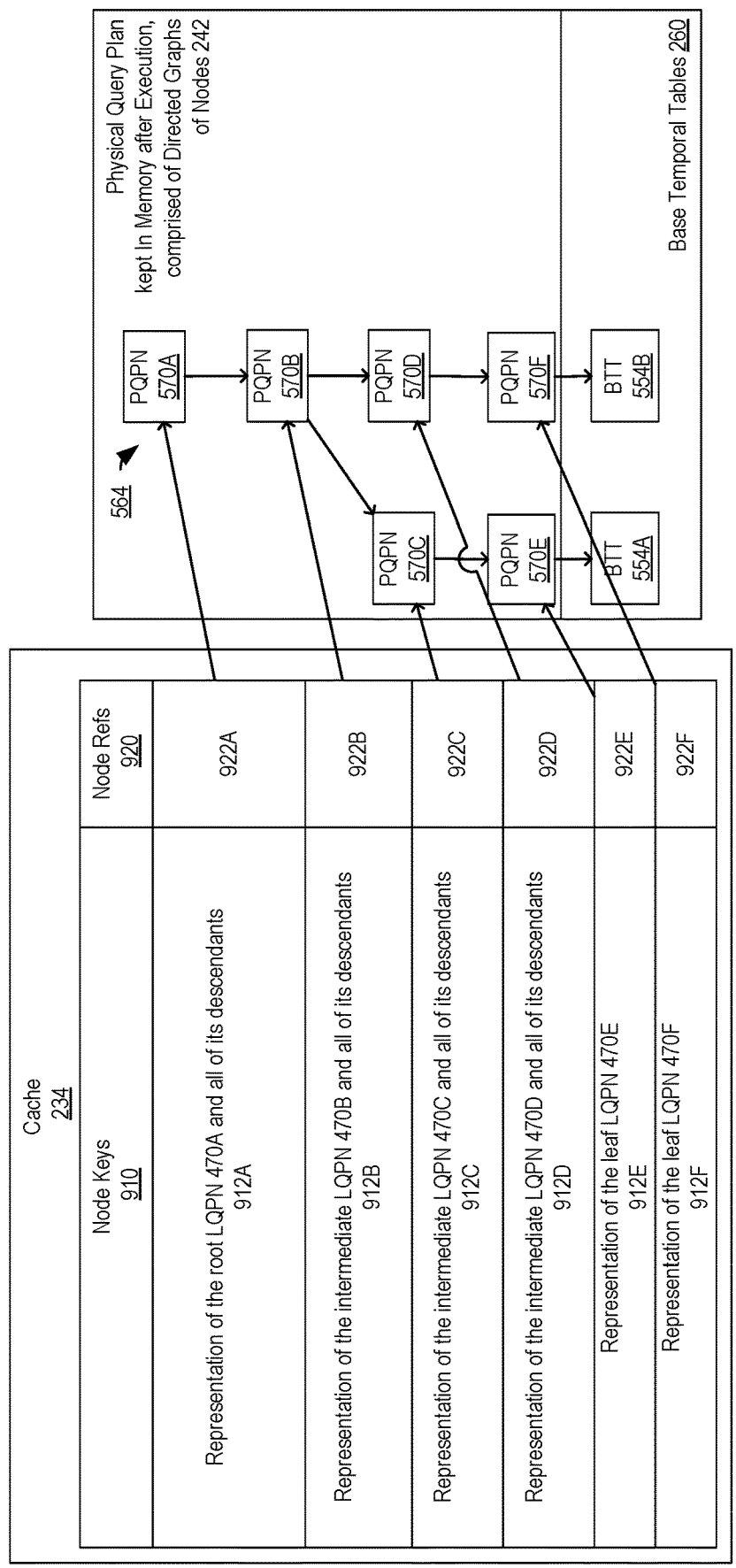
FIG. 9 is a block diagram illustrating the cache 234 according to one embodiment.

FIG. 9 is a block diagram illustrating the cache 234 according to one embodiment. FIG. 9 reproduces: 1) the cache 234, the physical query plans 242, and the base temporal tables 260 of FIG. 2; and 2) the exemplary physical query plan 564 (including the directed graph comprised of PQPNs 570A-F) and the BTTs 554A-B of FIGS. 5A-B, 6 and 7B. FIG. 9 also illustrates the cache 234 having a data structure including a set of node keys 910 and a set of node references 920. In FIG. 9, each of the nodes in the physical query plan 564 has an entry in the data structure of the cache 234, and the entry for each of the nodes stores in set 910 a node key for that node and stores in set 920 a reference used to locate that node in the physical query plans 242. Specifically, FIG. 9 shows node keys 912A-F and respective associated references 922A-F that respectively identify PQPN 570A-F. While FIG. 9 illustrates a data structure in the form of a table, other embodiments may use different data structures (e.g., a hashmap which by default creates a hash of each key passed to it, a graph structure, etc.).

As previously described, one or more node keys each representing all and/or parts of a new query plan being generated are compared to the node keys in the cache 234 to determine whether the generation of the new physical query plan may reuse/incorporate one or more parts (each part being a node or a subgraph of nodes and edge(s)) of one or more existing physical query plans (e.g., physical query plan 564). Thus, there is a node key for each of the PQPNs, and in that sense each PQPN is represented by one of the node keys. In embodiments that first generate a logical query plan prior to a new physical query plan, the logical query plan may be used to generate any required node keys. Further, in embodiments that generate logical query plans, a node key generated from an LQPN represents that LQPN, and eventually the PQPN used to implement that LQPN.

In some embodiments, the node key for a given node represents just that part of the query plan(s) that include that node, but does not represent any parts of the query plan(s) that include ancestors of that node, if any (parent nodes, grandparent nodes, etc.). In some such embodiments, the node key for a given node represents just that part of the query plan(s) that include that node and its descendants (child nodes, grandchild nodes, etc.), if any, but does not represent any parts of the query plan(s) that include ancestors of that node, if any (parent nodes, grandparent nodes, etc.). For instance: 1) in one embodiment, the node key for each node is based on that node and that node's descendants, if any (e.g., based on that node's query plan operator and parameter(s), and each of that node's descendants, if any); and 2) in another embodiment, the node key for each node is based on that node (e.g., that node's query plan operator type and parameter(s)) and that node's descendants' keys, if any (note: in this embodiment, some information is replicated since each lower level key represents all of its own descendants already). Thus, for a given query plan: 1) the node key for the root node of that query plan represents the entire query plan; 2) the node key for each leaf node (e.g., BTTN) represents just that part of the query plan that identifies the BTT which the leaf node references; 3) where there are one or more intermediate nodes in the query plan, then: a) the node key of each of the nodes connected to a leaf node (the nodes which have a leaf node as a child) represents just that part of the query plan that includes that node (e.g., the query plan operator type and its parameters (e.g., a comparison predicate)) and its descendant node (e.g., a leaf node); and b) the node key for each higher level node (if any) represents just that part of the query plan that includes that higher level node (e.g., the query plan operator and its parameters (e.g., a comparison predicate) that the node is to perform on the results provided by that node's child nodes) and its descendant nodes (e.g., other intermediate node(s) and leaf node(s)). By way of a specific embodiment: 1) a leaf node represents a TABLE query plan operator that operates on a table reference, and its node key is based on the TABLE query plan operator type and the table reference on which it operates (e.g., TABLE(CUSTOMERS)); 2) A second level node represents a query plan operator (e.g., SELECT) that operates on the results of a table query plan operator, and its node key is based on that query plan operator type, its parameters (e.g., a comparison predicate for that query plan operator), and the leaf node that it depends on (e.g., the leaf node that represents TABLE(CUSTOMERS)); 3) A higher level node represents a query plan operator (e.g., a JOIN) that operates on the results of its children nodes, and its node key is based on that query plan operator type, its parameters (e.g., a comparison predicate for that query plan operator), and the descendant nodes; and 4) a root node represents a PROJECT query plan operator that operates on the results of its children nodes, and its node key represents the entire query plan and is based on the PROJECT query plan operator type, its parameters (e.g., a list of column names for that PROJECT query plan operator), and its descendant nodes.

In another embodiment, the node key for each node is based on that node (e.g., based on that node's query plan operator type and parameter(s)) and the keys of that node's child nodes, if any; which child node keys are themselves based on the keys of their child nodes, if any, and so on (note: this embodiment may avoid the replication mentioned above). In yet another embodiment, the node key for each node is based on that node (e.g., based on that node's query plan operator type and parameter(s)) and that node's zero or more child nodes (e.g., based on the query plan operator and parameter(s) of the child node(s), if any).

By way of specific example, FIG. 9 illustrates an embodiment that first generates a logical query plan, generates the node keys from the logical query plan, and the node key for each node is based on that node and that node's descendants, if any (e.g., based on that node's query plan operator and parameter(s), and each of that node's descendants, if any). Thus, the node key 912F is a representation (e.g., "TABLE(CUSTOMERS)") of the leaf LQPN 470F (which does not have any descendants); the node key 912E is a representation (e.g., "TABLE(ORDERS)") of the leaf LQPN 470E (which does not have any descendants); the node key 912D is a representation (e.g., "SELECT(TABLE(ORDERS),ORDERS.Quantity>4)") of the intermediate LQPN 470D its descendant LQPN 470F; the node key 912C is a representation (e.g., "SELECT(TABLE(CUSTOMERS),CUSTOMERS.PostalCode=10001)") of the intermediate LQPN 470C and its descendant LQPN 470E; the node key 912B is a representation (e.g., "JOIN(SELECT(TABLE(ORDERS),ORDERS.Quantity>4),SELECT(TABLE(CUSTOMERS), CUSTOMERS.PostalCode=10001), ORDERS.CustomerID=CUSTOMERS.CustomerID)") of the intermediate LQPN 470C and its descendants LQPNs 470C-F; and the node key 912A is a representation (e.g., "PROJECT(JOIN(SELECT(TABLE(ORDERS),ORDERS.Quantity>4),SELECT(TABLE(CUSTOMERS),CUSTOMERS.PostalCode=10001), ORDERS.CustomerID=CUSTOMERS.CustomerID), CUSTOMERS.CustomerID, CUSTOMERS.Name, CUSTOMERS.PostalCode, ORDERS.OrderID, ORDERS.CustomerID, ORDERS.Price, ORDERS.Quantity)") of the root LQPN 470A and all of its descendants LQPNs 470B-F.

While in the above example the node keys are described as strings, other embodiments may use different data types as keys (e.g., in one embodiment, keys may be non-string objects, in another embodiment, keys are "hashed" and the resulting hash value is used). For example, in some embodiments the output of a pretty printer (a well-known software component that may be used to produce a string representation of a subgraph starting from a particular node and including its descendants), or a hash thereof, is used to create the key. As another example, in some embodiments the key for a given LQPN is created (e.g., by generating a hash) using information from the LQPN's child nodes' hashes, recursively, data in the LQPN's operator type field, and data in the LQPN's other parameter field (if any).

As previously described, while embodiments are described in which the edges of the graph are stored within the nodes of the graph, alternative embodiments may instead store the edges in the cache 234.

As previously described, different embodiments may use different techniques to determine how long each of the nodes of the query plans and the TTs is kept in memory after execution. In one embodiment, an identification of "active" or "inactive" is maintained for each of the query plans (e.g., the identification may be associated with the root node of the directed graph of each of the query plans), and those nodes (and the TTs they reference) that are not part of an "active" query plan are candidates for removal from being kept in memory after execution. As previously described, in one embodiment implemented in Java, the references (e.g., 922A, E, F) in the cache 234 to the root and leaf nodes are of the strong reference type, while the references in the cache 234 to intermediate nodes (e.g., 922B, C, D) are of the WeakReference type; and once a given root node in the cache 234 is released, the Java Virtual Machine garbage collector can free the memory consumed by the directed graph extending from that root node.

Loading Base Temporal Tables

Figure 10:
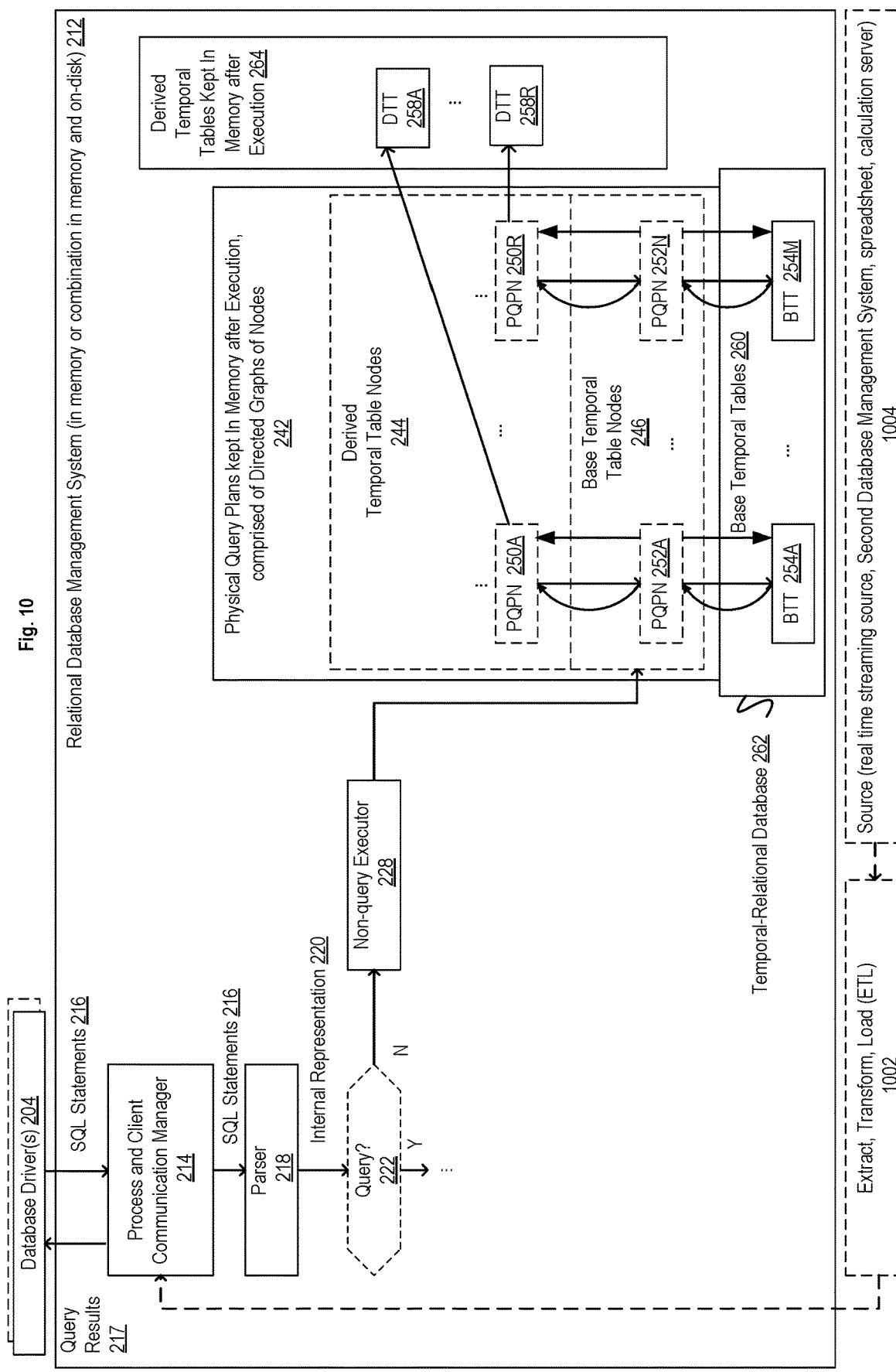
FIG. 10 is a block diagram illustrating ways in which the data for the base temporal tables may be populated according to certain embodiments.

FIG. 10 is a block diagram illustrating ways in which the data for the base temporal tables may be populated according to certain embodiments. FIG. 10 reproduces the database driver(s) 204 and parts of the RDBMS 212 from FIG. 2. In one embodiment, data is loaded from one or more other sources into RDBMS 212. For example, FIG. 10 illustrates dashed box 1004 being a source, such as a real time streaming source, a second RDBMS system (such as Oracle® RDBMS manufactured by Oracle Corporation of Redwood Shores, California), a spreadsheet, a calculation server, etc. Block 1002 represents the well-known technique of performing an extract, transform, and load (ETL) operation on data received from source 1004 and providing SQL statements (e.g., CREATE TABLE and INSERT) to the process and client communication manager 214 to load the transformed data. Such statements are provided to the parser 218 and reach the non-query executor 228 in the form of an internal representation 220, responsive to which the necessary base temporal tables 260 are created and populated as previously described. While in one such embodiment the RDBMS 212 is an in-memory RDBMS that operates on one or more sources, in other such embodiments the RDBMS 212 is an on-disk system or a hybrid in-memory and on-disk system. While in the illustrated embodiment the ETL 1002 interacts with the process and client communication manager 214 via a database driver, alternative embodiments may operate differently (e.g., instead of ETL, a client that generates or computes data (as opposed to extracting and transforming) may use a database driver to provide the SQL statements (e.g., CREATE TABLE and INSERT) to the process and client communication manager 214 to load the data).

In another embodiment, the RDBMS 212 is a combination in-memory and on-disk system, and the base temporal tables store data accessible to end-users (and thus, the data need not be loaded from another source). For instance, in one embodiment, an existing RDBMS, which is an in-memory and on-disk system, is extended to include features of the invention. As used herein, "in-memory" and "on-disk" are well-known terms used to distinguish storage of code/data in in a volatile main memory (e.g., dynamic random access memory (DRAM)) with relative fast read/write times from storage in a non-volatile long term storage (e.g., magnetic disk, Flash memory, phase change memory, solid state drive (SSD)) with slower read/write times. However, as discussed herein, the historical distinction of volatile main memory and non-volatile long term storage will become obsolete with the adoption of non-volatile memory with faster read/write times (e.g., phase change memory). Thus, the use herein of the term "in memory" (i.e., without the hyphen) refers to storage in volatile memory, non-volatile memory, and/or combinations thereof.

User Interface

Figure 11:
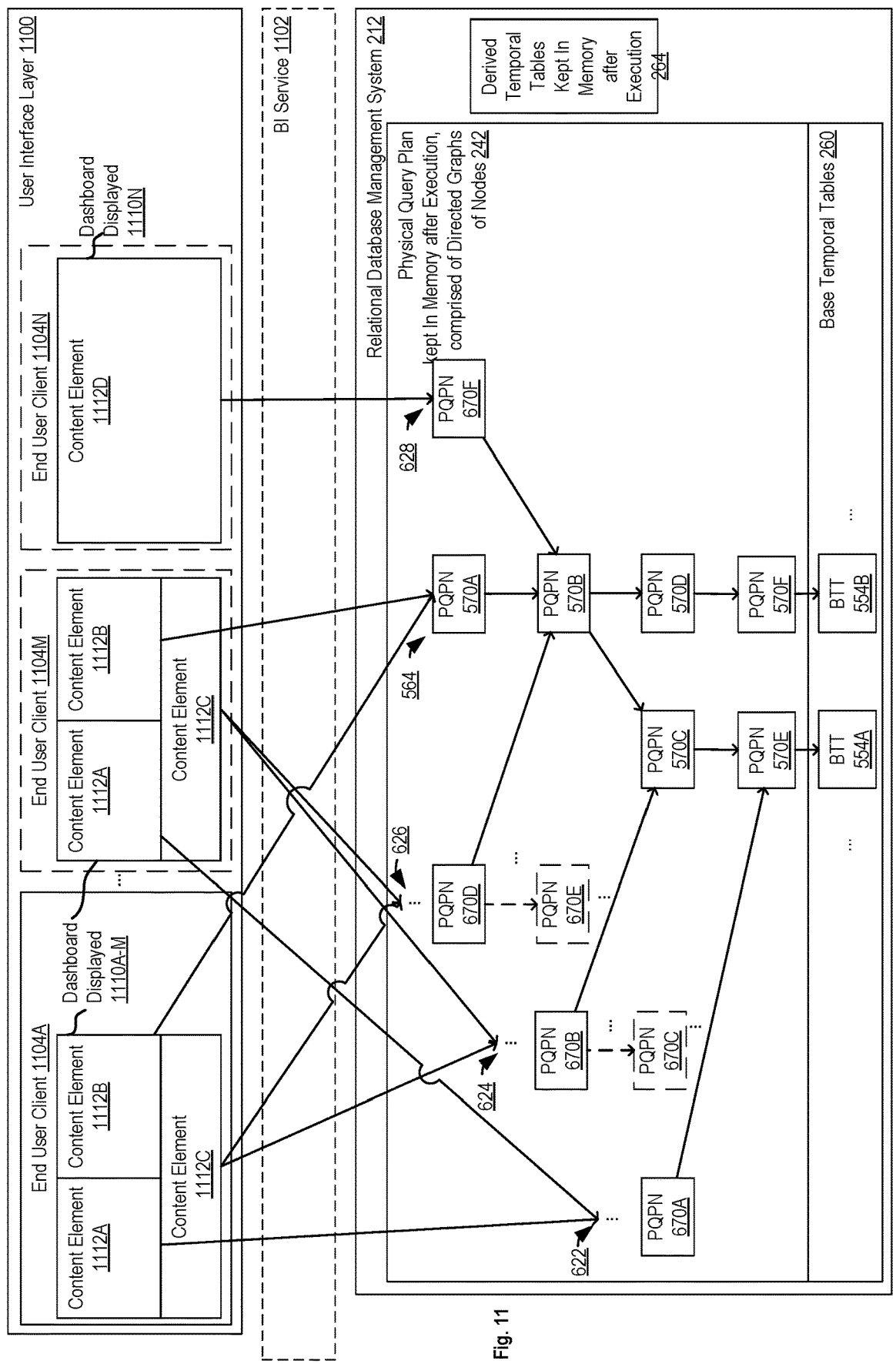
FIG. 11 illustrates a user interface layer on top of the RDBMS 212 according to one embodiment.

As previously described, there are various reasons for there to be multiple overlapping queries simultaneously. Another such reason is the use of a user interface layer that provides a common user interface (e.g., a dashboard) to multiple, often many, end users through end user clients running on different electronic devices. FIG. 11 illustrates a user interface layer on top of the RDBMS 212 according to one embodiment. FIG. 11 reproduces: 1) the physical query plans 242, the base temporal tables 260, and the derived temporal tables 264 of FIG. 2; 2) the exemplary physical query plan 564 (including the directed graph comprise of PQPNs 570A-F) and the BTTs 554A-B of FIGS. 5A-B and 6; and 3) the exemplary physical query plans 622-628 (including PQPNs 670A-F). In FIG. 11, a user interface layer 1100 provides a user interface to multiple end users through end user clients (end user clients 1104A-N) running on different end user electronic devices. In one embodiment, the user interface layer provides a "dashboard." For example, the end user clients 1104A-M each display an instance of the same dashboard (illustrated as dashboard displayed 1110A-M), while the end user client 1104N displays a different dashboard 1110N. While in the illustrated example only two different dashboards are shown for illustrative purposes (dashboard displayed 1110A-M versus dashboard displayed 1110N), embodiments may support more or less dashboards.

A dashboard is typically a collection of boxes (often rectangular and referred to as tiles or panels) that often fits on a single webpage or application window (also called a canvas) and that is for display to an end user through an electronic device; in fact, typically a given dashboard is for display to many end users through multiple electronic devices. Each box of a dashboard contains a content element (e.g., a chart, a graph, an image (e.g., a color-coded map), a spreadsheet, a pivot table, a list, a table, a widget; some of which are sometimes referred to as a "view" or a "visual") which represents data from a data set (or based thereon). A dashboard and/or one, more, or all of the boxes may include a "menu bar" or other type of display item that allows the user to interact with the dashboard and/or the boxes. A data set is a collection of data used to create a content element, and it can be one data point or data (which may be filtered) from a single data source or data (which may be filtered) from multiple sources (e.g., one or more tables from an Excel workbook, one or more databases (e.g., an SQL database), a website, software services (e.g., Salesforce), etc.). In one embodiment, the user interface layer 1100 produces SQL queries that are submitted to the RDBMS 212, which responds with query results that form the data sets from which the content elements are populated. In the context of FIG. 11, the end user clients 1104A-N transmit SQL statements (including SQL queries) to generate the data sets (not shown) for the content elements 1112A-D, and the relational database management system 212 responds to the SQL queries with the query results which are the data sets provided to the appropriate end user clients for the content elements 1112A-D. As such, the end user clients are clients of the RDBMS 212 (and can be referred to as database clients or RDBMS clients) and each includes a database driver(s) 204. In other embodiments, the user interface layer 1100 produces requests in a formula or "BI query language" (e.g., Data Analysis eXpressions (DAX) language, Multidimensional Expression (MDX) language, a proprietary language, etc.), and a BI service 1102 between the end user clients 1104A-N and the RDBMS 212: 1) translates the requests from the end user clients 1104A-N into SQL queries (and, in some embodiments, subscription SQL queries) that it provides to the RDBMS 212; and 2) translates the responsive query results from the RDBMS 212 into datasets that are used by the user interface layer 1100 to populate content elements. In the context of FIG. 11, the end user clients 1104A-N (including software (not shown) to interface with the BI service 1102 (e.g., an API, a web browser, a native client, a BI portal, a command-line interface, etc.)), running on end user electronic devices, transmit requests (not shown) that are translated by the BI service 1102 into SQL statements (including SQL queries) designed to generate the data sets (not shown) for the content elements 1112A-D; the BI service 1102 includes the database driver(s) 204 and submits these SQL statements to the RDBMS 212. The RDBMS 212 responds to the SQL queries by sending the query results to the BI service 1102, which translates them into the data sets provided to the appropriate end user clients for the content elements 1112A-D. As such, the end user clients 1104A-N are clients of the BI service 1102 (and can be referred to as BI clients), and the BI service is a client of the RDBMS 212 (and can be referred to as a database client or RDBMS client). Yet other embodiments have both types of end user clients (e.g., may have end user clients that are RDBMS clients (and thus have one of the database driver(s) 204) and other end user clients that are BI clients (and thus have software to interface with the BI service 1102 (e.g., an API, a web browser, a native client, a BI portal, a command-line interface, etc.), which in turn is a RDBMS client and includes the database driver(s) 204), or even end user clients that are both a BI client and a RDBMS client (and thus include both software to interface with a BI service and one of the database driver(s) 204).

In FIG. 11, the data sets for the content elements 1112A-B are respectively provided by the query results from the physical query plans 622 and 564, the data set for the content element 1112C is provided by the query results for the physical query plans 624 and 626, and the data set for the content element 1112D is provided by the query result for the physical query plan 628. In FIG. 11, the query plans that provide the query results for the data sets for the content elements 1112A-D all overlap. The query plans that provide the data sets for different content elements of different dashboards may overlap (e.g., the directed graph of the physical query plan 628 is connected by at least one of its edges to at least one node (PQPN 570B) of the directed graph for the physical query plan 564 such that those directed graphs share at least one node (at least PQPN 570B), the physical query plans 564 and 628 were respectively generated and executed for a first and second SQL query to respectively populate a first dashboard content element (e.g., content element 1112B) and a second dashboard content element (e.g., content element 1112D), and the first dashboard content element (e.g., content element 1112B) and a second dashboard content element (e.g., content element 1112D) are part of different dashboards to be displayed by different ones of the end user clients (dashboards 1110A and 1110N to be respectively displayed by end user clients 1104A and 1104N)). Thus, even though a content element on one dashboard may not be the same as the content element on another dashboard, the SQL queries submitted for those content elements may result in query plans that overlap.

Further, the query plans that provide the data sets for different content elements of the same dashboard may overlap (e.g., the directed graph of the physical query plan 622 is connected by at least one of its edges to at least one node (PQPN 570E) of the directed graph for the physical query plan 564 such that those directed graphs share at least one node, the physical query plans 564 and 622 were respectively generated and executed for a first and second SQL query to respectively populate a first dashboard content element (e.g., content element 1112B) and a second dashboard content element (e.g., content element 1112A), and the first dashboard content element (e.g., content element 1112A) and a second dashboard content element (e.g., content element 1112B) are part of a same dashboard of which instances are to be displayed by different ones of the end user clients (e.g., dashboards 1110A and 1110M to be respectively displayed by end user clients 1104A and 1104M)). While the example in FIG. 11 illustrates a moment when the query plans that provide the query results for the data sets for the content elements 1112A-D are all overlapping, that is not required at all times (there can be other separate physical query plans, other separate sets of physical query plans that overlap with each other, etc.).

In some embodiments, since the dashboards are typically displayed for some time and there is a desire for the content elements to be updated in near real-time, the SQL queries transmitted to the relational database management system 212 may be transmitted as subscription SQL queries. As previously described, some embodiments can incrementally execute query plan operators, which improves efficiency relative to full re-execution. Thus, the use of a subscription SQL query to provide the query results for a content element of a dashboard combined with incremental execution, provides for faster updating responsive to changes in data on which that SQL query result depends.

Further, in some embodiments, since the query plan for a subscription SQL query is kept in memory after execution for as long as at least one of the clients is subscribed to receive updates to the SQL query for which that query plan was generated, the use of a subscription SQL query by a first client extends the time window during which the query plan (and temporal tables its nodes identify) for that subscription SQL query will be kept in memory after execution for potential reuse, and thus the time window within which another client may submit an overlapping, or the same, SQL query (non-subscription or subscription) and the RDBMS may detect that an existing query plan can be reused (i.e., the relational database management system 212 detecting that the query plan for the SQL query submitted by the another client fully or partially overlaps with the existing query plan already being kept in memory after execution for the subscription SQL query submitted by the first client).

The use of the same dashboard by different end users on different electronic devices at the same time results in each such electronic device issuing, for each content element of the dashboard, the same SQL query to populate that content element. For instance, if a given dashboard is being displayed by X electronic devices, the SQL query used to populate a given content element of that dashboard may be issued X times (once for each of the X of the electronic devices). Since, as previously described, embodiments can generate overlapping query plans, the transmittal of the same SQL query by the multiple clients may result in a single query plan being generated and shared for that same SQL query (this is a case where the query plans fully overlap such that only a single query plan is kept in memory after execution). Thus, the use of a common dashboard by multiple end user clients at the same time may result in the submission of the same one or more SQL queries for the content elements of that common dashboard (the submission being direct if the end user clients are RDBMS clients, or indirect if they are clients for the BI service which is an RDBMS client and which does not address the query duplication itself), which will result in reuse by the RDBMS of one or more fully overlapping query plans for that common dashboard. In sum, in one embodiment, multiple end user clients simultaneously using the same dashboard may result in the submission of a same set of subscription SQL queries (potentially at different times) to the RDBMS, and the RDBMS generates a single set of query plans for the subscription SQL queries and provides the query results to each of the subscribed clients (both an initial query result including all valid data records and incremental query results (e.g., in the form of a change list) over time to each of the subscribed clients while it is subscribed). Thus, the use of a subscription SQL query to provide the query results for a content element of a dashboard combined with multiple end user clients using the same content element in their dashboards provides a larger time window within which the query plan for that subscription SQL query will be kept in memory after execution for potential reuse, and thus the time window within which another client may submit the same SQL query and the relational database management system may detect that an existing query plan can be reused.

Also, the user interface in certain embodiments allows end users to interact with one or more content elements such that the SQL queries issued to populate the content element are not the same, but are overlapping, for different ones of the end user clients. For instance, the end user clients for a first and second end user may be displaying the same content element which relies on a same SQL query for which a single query plan was generated and executed. However, the first end user may interact with the content element of the dashboard in a way that causes the underlying SQL query to be changed in a manner that requires a different query plan, but the different query plan still partially overlaps with the query plan for the content element being displayed to the second end user.

Also, while in some embodiments the user interface providing the dashboard is such that the available dashboards are relatively fixed, in other embodiments the user interface allows end users to create and edit dashboards, as well as share them with other end users. There are existing user interfaces (sometimes referred to as Business Intelligence tools) that allow for this. The ability to create and/or edit dashboards is sometimes referred to as self-service or user-customizable dashboards. This ability enables the well-known concept of "data discovery." Data discovery is a user-driven process of understanding a data set, including searching for patterns or specific items in a data set. Data discovery applications often use visual tools (e.g., maps, pivot-tables) to make the process of finding patterns or specific items rapid and intuitive. Data discovery may leverage statistical and data mining techniques to accomplish these goals. Data discovery is made more efficient and practical when the underlying database is more responsive; thus, the relational database management system 212 supporting incremental execution and query plan reuse allows for a more responsive temporal-relational database that supports multiple clients and more efficient data discovery. Specifically, since data discovery may result in a series of overlapping queries to be issued as the end users search for patterns and items in the datasets, the ability of the relational database management system 212 to perform incremental execution and query plan reuse allows for the relational database management system 212 to be relatively quick to respond; thereby enabling more efficient data discovery.

In sum, some embodiments have a user interface layer 1100 on top of the relational database management system 212, where: 1) the user interface layer provides self-service end user dashboards that allow end users to create, edit, and share dashboards, and transmits the required SQL queries (including subscription SQL queries when appropriate) to the relational database management system; and 2) the relational database management system that manages a temporal-relational database and that supports simultaneous SQL queries (including subscription SQL queries): (a) supports overlapping query plans, (b) keeps the query plans in memory (i.e., in volatile memory, non-volatile memory, and/or combinations thereof) after execution, (c) keeps the temporal tables identified by the intermediate and root nodes of those query plans in memory after execution, and (d) performs incremental execution to incrementally update those temporal tables and, ultimately, the query results for the required SQL queries.

Exemplary Implementations

Embodiments will now be described which use instances/objects of classes, and optionally generate bidirectional query plan graphs to generate dirty notification directed graphs.

Figure 12:
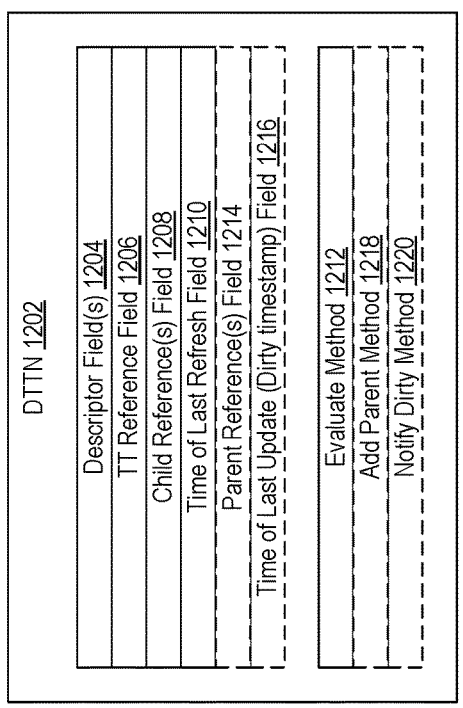
FIG. 12 is a block diagram of a DTTN class according to one embodiment.

FIG. 12 is a block diagram of a DTTN class according to one embodiment. FIG. 12 shows that the DTTN class 1202 includes a set of one or more descriptor field(s) 1204, a TT reference field 1206, a child reference(s) field 1208, a Time of Last Refresh field 1210, and an Evaluate method 1212. The set of descriptor field(s) 1204 may be implemented in the same manner as those described for the LQPNs in FIG. 4. As previously described, each root and intermediate node is an instance/object of the DTTN class 1202, and the TT reference field 1206 is to store a reference identifying the one of the derived temporal table objects encapsulating the temporal table storing the result of the query plan operation performed by that node. The child reference(s) field 1208 may be implemented in the same manner as those described for the LQPNs in FIG. 4 (e.g., a list of references to child node(s) (i.e., direct descendants)). The Time of Last Refresh field 1210 is to store a time as of which the query plan operation was last executed (in other words, a timestamp reflecting, for a given instance/object of the DTTN class 1202 that is a node of a query plan, the last timestamp value passed to the Evaluate method 1212 and stored in the Time of Last Refresh field).

The Evaluate method 1212 is executed to perform a query plan operation (which operates on temporal table(s), and in at least some cases, performs a temporal-relational algebra operation in that it utilizes the temporal content in the table (e.g., in some embodiments, at least some of the content of the valid_from and/or valid_to columns)) represented by a given instance/object of the DTTN class 1202 (where each root and intermediate node is an instance/object of the DTTN class 1202). In one embodiment, the Evaluate method 1212 is passed an Evaluation Start Time, and if it is decided that the query plan operation needs to be executed, it: 1) calls the Evaluate method of its child node(s); 2) on return from these call(s), accesses the BTT/DTT(s) of its child node(s) (or, in some embodiments, references to read-only views or copies of such BTT/DTT(s)) to get the data records needed; 3) performs any update to its own DTT identified with the reference in its TT reference field 1206; and 4) returns a reference to a read-only view, or read-only copy, of its DTT. In some programming languages, such as Java, objects are passed by reference by default, and thus no special programming is required to pass an object by reference.

In addition, FIG. 12 shows with dashed boxes that DTTN class 1202 may optionally include a parent reference(s) field 1214, a Time of Last Update field 1216 (also referred to as a dirty timestamp field), an Add Parent method 1218, and a Notify Dirty method 1220. These dashed boxes are used in an exemplary implementation that generates bidirectional query plan graphs to create dirty notification directed graphs. The parent reference(s) field 1214 is to store a list of references to any parent node(s) (i.e., direct ancestor(s))). The Time of Last Update field 1216 it to store the time as of which a BTT, on which the query plan operation depends (directly or indirectly), was last updated (in other words, a timestamp reflecting, for a given instance/object of the DTTN class 1202 that is a node of a query plan, when a BTT on which that node relies became dirty (was modified)). The Add Parent method 1218 is called by a parent node (during initialization of that parent node) with a reference to that parent node, and this method stores the reference to the parent node in the parent reference(s) field 1214. Thus, during initialization of a parent node, this method of each child node is called passing a reference to the parent node, and this method of each child node inserts the reference to this parent node in the parent reference(s) field 1214 of that child node; this assists in making the bidirectional query plan graphs and to generate dirty notification directed graphs. The Notify Dirty method 1220 of a given node is called by a child node, and its execution updates the Time of Last Update field 1216 of that given node and calls the Notify Dirty method 1220 of the given node's parent nodes (if any) listed in the parent reference(s) field 1214 of the given node. In operation, when a BTT is modified, the dirty notification directed graph is used to identify each node affected by the change by making recursive calls from the root node of that dirty notification directed graph (e.g., the BTTN that encapsulates the modified BTT) up to the leaf nodes(s) of that dirty notification directed graph (which are root node(s) of query plan(s)), thereby allowing a dirty indication to flow up through the intermediate node(s) and to the root node(s) of the query plan(s) which consume that BTT.

Figure 13:
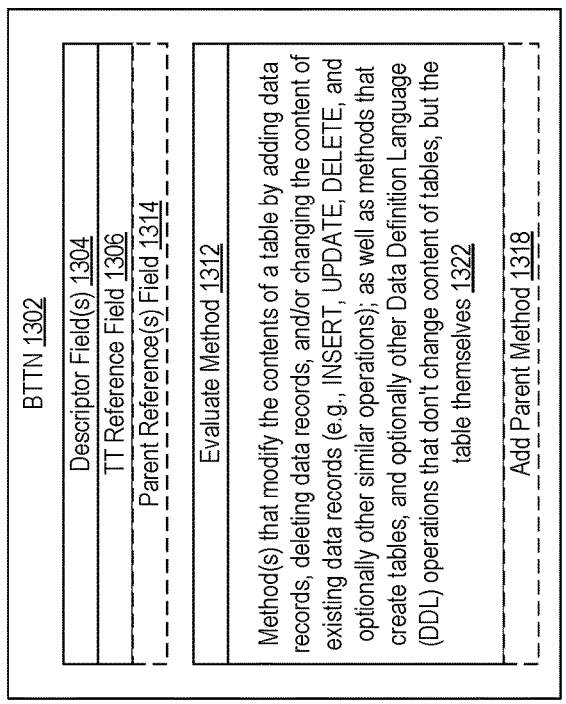
FIG. 13 is a block diagram of a BTTN class according to one embodiment.

FIG. 13 is a block diagram of a BTTN class according to one embodiment. FIG. 13 shows that the BTTN class 1302 includes a set of one or more descriptor field(s) 1304, a TT reference field 1306, an Evaluate method 1312, and method(s) 1322. The set of descriptor field(s) 1304 fields may be implemented in the same manner as those described for the LQPNs in FIG. 4. As previously described, each leaf node is an instance/object of the BTTN class 1302, and the TT reference field 1306 is to store a reference identifying the one of the base temporal table objects encapsulating the temporal table of that leaf node (i.e., a temporal table of the temporal-relational database).

The Evaluate method 1312 of a given instance/object of the BTTN class 1302 returns a reference to a read-only view, or read-only copy, of the BTT identified in the TT reference field 1306 of the given instance/object.

The method(s) 1322 include method(s) that cause the modification of the contents of the temporal table identified by that node (where each leaf node is an instance/object of the BTTN class 1302, the temporal table encapsulated by the base temporal table object identified by the TT reference field 1306 of that leaf node) by adding data records, deleting data records, and/or changing the content of existing data records (e.g., INSERT, UPDATE, DELETE, and optionally other similar operations); as well as method(s) that create tables, and optionally other Data Definition Language (DDL) operations that don't change content of tables, but the table themselves.

In addition, FIG. 13 shows that BTTN class 1302 optionally includes a parent reference(s) field 1314 and an Add Parent method 1318. The parent reference(s) field 1314 is to store a list of references to any parent node(s) (i.e., direct ancestor(s))). The Add Parent method 1318 is called by a parent node (during initialization of that parent node) with a reference to that parent node, and this method stores the reference to the parent node in the parent reference(s) field 1314. Thus, during initialization of a parent node, this method of each child node is called passing a reference to the parent node, and this method of each child node inserts the reference to this parent node in the parent reference(s) field 1314 of that child node; this assists in making the bidirectional query plan graphs and to generate dirty notification directed graphs.

Figure 14:
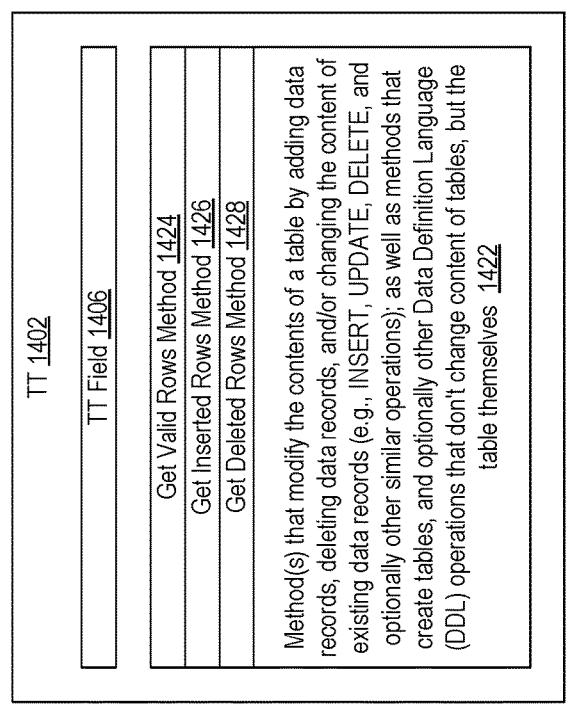
FIG. 14 is a block diagram of a TT class according to one embodiment.

FIG. 14 is a block diagram of a TT class according to one embodiment. FIG. 14 shows that the TT class 1402 includes a TT field 1406, a set of one or more get row methods (in the illustrated embodiment, including a Get Valid Rows method 1424, a Get Inserted Rows method 1426 and a Get Deleted Rows method 1428), and method(s) 1422. Where each temporal table is encapsulated by an instance/object of the TT class 1402 (referred herein as a derived temporal table (DTT) or base temporal table (BTT)), the TT field 1406 is to store that temporal table. The "Get . . . Rows" methods are called to access data in the temporal table of the TT field 1406. The Get Valid Rows method 1424 is passed a timestamp and returns all data records valid as of the time represented by that time stamp, and is for providing an initial query result. In one embodiment that supports incremental execution of query plan operations and/or subscription SQL queries, the Get Inserted Rows method 1426 and a Get Deleted Rows method 1428 are used to return just the changes to a temporal table (or "delta(s)"). In one embodiment, each of these methods is passed two timestamps and returns data records which were respectively inserted or deleted at a time between those time stamps. The Get Inserted Rows method 1426 is passed the two timestamps and returns the data records inserted between the two times represented by the timestamps, while the Get Deleted Rows method 1428 is passed the two timestamps and returns the data records deleted between the two times represented by the timestamps. While one embodiment implements the illustrated three "Get . . . Rows" methods, alternative embodiments may implement more, less, and/or different methods (e.g., a single method). Similar to the concept of valid_from and valid_to above, while embodiments are described with reference to the logical view and the terms "set of one or more get row methods" (illustrated as the Get Valid Rows method 1424, a Get Inserted Rows method 1426 and a Get Deleted Rows method 1428) to ease understanding, use of these terms is not limiting to embodiments that use only row-oriented temporal tables and synonyms for these terms include get data records methods (e.g., including a Get Valid Data Records method, a Get Inserted Data Records method, and a Get Deleted Data Records method).

The method(s) 1422 include method(s) that modify the contents of the temporal table in the TT field 1406 by adding data records, deleting data records, and/or changing the content of existing data records (e.g., INSERT, UPDATE, DELETE, and optionally other similar operations); as well as method(s) that create tables, and optionally other Data Definition Language (DDL) operations that don't change content of tables, but the table themselves. In one embodiment, method(s) 1422 are called by the Evaluate method 1212 of the DTTN class 1202 and/or the method(s) 1322 in the BTTN class 1302.

FIG. 15 is a flow diagram for the non-query executor 228 of FIG. 2 according to one embodiment. FIG. 15 starts with block 1502, in which different non-query SQL statement types are distinguished. In the case of SQL statements with CREATE TABLE, control passes to block 1504. In contrast, control passes to block 1510 for those SQL statements that modify the contents of a table by adding data records, deleting data records, and/or changing the content of existing data records. Embodiments of the invention may further distinguish the non-query SQL statement types in block 1504 and/or support additional non-query SQL statements.

In block 1504, a base temporal table is created and the flow ends. In one embodiment, block 1504 is optionally broken into two operations and the base temporal table is created prior to a base temporal table node being created. Specifically, in block 1506 the base temporal table is created (e.g., an instance/object of the TT class 1402 is instantiated) and control passes to block 1508 in which a base temporal table node (BTTN) is created (e.g., a instance/object of the BTTN class 1302 is instantiated, and the following is performed to initialize the BTTN: 1) the descriptor field(s) 1304 are populated; 2) the TT reference field 1306 is populated with a reference to the BTT created in block 1506; and 3) in embodiments that implement the parent reference(s) field 1314, a value indicating "empty" is stored therein). In an alternative embodiment, the BTTN is created first, and it creates its BTT either greedily (when the BTTN is instantiated) or lazily (when the BTT needs to be written to via an INSERT for example).

In block 1510, those SQL statements that modify the contents of a table by adding data records, deleting data records, and/or changing the content of existing data records are performed and the flow diagram ends. In one embodiment that implements BTTNs and accesses the BTTs through them, block 1510 includes block 1512 in which the appropriate one of the method(s) 1322 of the BTTN is called, which calls the appropriate one of the method(s) 1422 of the BTT. In one embodiment that implements the parent reference(s) field 1314 and the Notify Dirty method 1220, block 1510 includes calling the Notify Dirty method 1220 of any parent nodes listed in the parent reference(s) field 1314.

In one embodiment, SQL statements should be submitted to create the base temporal tables (BTTs) (e.g., creation of the BTT(s) and BTTN(s) for those BTT(s) by the non-query executor 228) required for an SQL query prior to submission of that SQL query; and responsive to one of the SQL statements including such an SQL query, the task of the parser 218 includes confirming that the required BTT(s) have been created.

FIG. 16 is a flow diagram for the query plan connector 232 of FIG. 2 according to one embodiment. As previously described, in one embodiment a logical query plan is generated for the SQL query prior to generation of a physical query plan for that SQL query, and the logical query plan is utilized by the query plan connector 232. In such an embodiment, FIG. 16 starts with block 1602 at which a logical query plan node is selected from the logical query plan as a current logical query plan node.

Control passes to block 1604 in which it is determined whether the node key for the selected logical query plan node is in the cache 234. In one embodiment, a node key for the selected logical query plan node is generated, and then it is determined if that node key is in the cache 234 (indicating that there is already a physical query plan node, and possibly a subgraph, that may be reused/incorporated). If it is, control passes to block 1612 in which it is determined if all the logical query plan nodes have been accounted for. If they have, then control passes to block 1614 where the flow diagram ends. If not, control passes back to block 1602 in which another of the logical query plan nodes is selected as the current logical query plan node. Different embodiments may select the logical query plan nodes in different orders. For instance, one embodiment starts by selecting parent node(s) of the leaf node(s) of the logical query plan, and then selecting the selected logical query plans node's parent nodes, and so on, until reaching the root node of the logical query plan. Thus, this embodiment "works its way up the logical query plan." Another embodiment starts by selecting the root node of the logical query plan; and if the node key for that logical query plan node is in the cache 234, then there is no physical query plan that needs to be generated because a physical query plan for the SQL query is already in memory; but if not, then selecting the parent node(s) of the leaf node(s) of the logical query plan, and then selecting the selected logical query plans node's parent nodes, and so on, until reaching the root node of the logical query plan. Thus, if the root node of the logical query plan is not found, this embodiment also "works its way up the logical query plan." Another embodiment starts by selecting the root node of the logical query plan; and if the node key for that logical query plan node is in the cache 234, then there is no physical query plan that needs to be generated because a physical query plan for the SQL query is already in memory; but if the node key for the root node of the logical query plan is not in the cache 234, then child node(s) of the current logical query plan node are selected, and so on, until the leaf nodes of the logical query plan are reached; this embodiment "works its way down" the logical query plan.

If it is determined in block 1604 that the node key for the selected logical query plan node is not in the cache 234, control passes to block 1606. In block 1606, a physical query plan node is instantiated and control passes to block 1608. In one embodiment, this involves the instantiation of an object of the DTTN class 1202.

In block 1608, the physical query plan node is initialized. With regard to an instance/object of the DTTN class 1202, the following is performed: 1) the descriptor field(s) 1204 are populated; 2) the TT reference field 1306 is populated with a value indicating empty; 3) in embodiments that implement the parent reference(s) field 1214, a value indicating empty is stored therein; 4) in embodiments that work their way up the nodes of the logical query plan, the child reference(s) field 1208 is populated based on lookups in the cache 234 using node key(s) generated for the child node(s) of the selected logical query plan node; 5) the Time of Last Refresh field 1210 is populated with a value indicating "never" (e.g., zero); 6) in embodiments that implement a Time of Last Update field 1216, it is populated with the current time; and 7) in embodiments that work their way up and implement the Add Parent methods 1280 and 1318, the Add Parent method 1218 or 1318 of each of the child node(s) in the child reference(s) field 1208 is called with the reference to the physical query plan node being initialized. While block 1608 is described with reference to embodiments that work their way up the logical query plan, embodiments that take one of the other approaches to selecting logical query plan nodes would require operations 4 and 7 at another time. From block 1608, control passes to block 1610.

In block 1610, the node key for the current logical query plan and a reference to the physical query plan node instantiated in block 1604 are stored in an entry of the cache 234. From block 1610, control passes to block 1612.

FIG. 17 is a flow diagram for the query executor 240 according to one embodiment. FIG. 17 starts with block 1702, in which a call is made to the Evaluate method of the root node of the current query plan (the root PQPN) with an Evaluation Start Time set to the Time of the Current SQL Query (e.g., the time the SQL query was sent by the client (assuming the client has a way to communicate this), the time the SQL query is received by the RDBMS, the time execution of the query plan begins). The call to the Evaluate method 1212 of the root node of the physical query plan (which is an instance/object of the DTTN class 1202) causes recursive calls down the PQPNs of the physical query plan (each parent calls the Evaluate method of its child node(s), if any) until the leaf PQPNs are reached (instances/objects of the BTTN class 1302), where such calls return references to read-only views, or read-only copies, of a node's DTT/BTT as previously described. Thus, the Evaluate method 1212 of the root node of the physical query plan will eventually return a reference to the read-only view, or read-only copy, of that root node's DTT. From block 1702, control passes to block 1704.

In block 1704, a call is made to the Get Valid Rows method 1424 (also referable to as the Get Valid Data Records method) of the DTT for which the reference was returned by the Evaluate method 1212 of the root node of the current query plan, passing the Evaluation Start Time. From block 1704, control passes to block 1706 in which the initial query result to send to the client is created. In one embodiment, block 1706 includes removing the valid_from and valid_to columns of the table (i.e. removing the valid_from and valid_to fields) from the data records from the Get Valid Rows method (also referable to as the Get Valid Data Records method) to create the initial query result.

From block 1706, control passes to block 1708 in which a reference to the root node of the current physical query plan and the initial query result are provided for sending to the client that submitted the SQL query. In one embodiment, the query executor 240 is implemented with a single method, and this single method returns the reference to the root node of the current physical query plan and the initial query result. This single method is called by: 1) the process and client communication manager (PCCM) 214 in the case of a non-subscription SQL query, and the returned reference to the root node is ignored; and 2) the subscription manager (described later herein) in the case of the subscription SQL query. In alternative embodiments, the query executor 240 may be implemented using more than a single method. For instance, in one such embodiment the query executor 240 is implemented as two separate methods, one that is called by the PCCM 214 in the case of a non-subscription SQL query and that returns the initial query result and not the reference to the root node of the current physical query plan, and another method that is called by the subscription manager (described later herein) in the case of the subscription SQL query and that returns the reference to the root node of the current physical query plan, and the initial query result. In another such embodiment, the query executor 240 is implemented as two separate methods, one that returns the initial query result and is called by both the PCCM 214 and subscription manager (described later herein), and another that returns the reference to the root node of the current physical query plan and is called by the subscription manager (but not the PCCM 214).

FIG. 18 is a flow diagram for the Evaluate method 1212 according to one embodiment. Thus, the DTTN.Evaluate method 1212 of a current node of the physical query plan is called. As previously described, the Evaluate method 1212 is passed the Evaluation Start Time when it is called. FIG. 18 starts with decision block 1802, in which it is decided if computation is needed. If not, control passes to block 1816; otherwise, control passes to block 1808. Block 1802 is an optimization (referred to above as skipping update) that avoids execution (be it incremental execution or full re-execution) if it is not required.

In one embodiment, block 1802 includes blocks 1804 and 1806. In block 1804, it is determined whether the Evaluation Start Time is less than (i.e., an earlier time than) the Time of Last Refresh (the Evaluation Start Time passed to the Evaluate method 1212 is compared to the time in the Time of Last Refresh field 1210 of the current node). If so, control passes to block 1816; otherwise, control passes to block 1806. Block 1804 is an optimization that avoids performing the query plan operation of the current node, as well as calling the Evaluate method of any child nodes, if the current node was refreshed after the passed Evaluation Start Time. For example, this could occur in embodiments that support the execution of query plans in parallel and/or that support query execution "as of a past date." In block 1806, it is determined whether the Time of Last Refresh is less than (i.e., an earlier time than) the Time of Last Update (in an embodiment that implements the Time of Last Update field 1216, it is determined if the time in the Time of Last Refresh field 1210 of the current node is less than the time in the Time of Last Update field 1216). If so, control passes to block 1808; otherwise, control passes to block 1816. Block 1806 is an optimization that determines if an update has occurred after the last refresh, and therefore if the current node needs to be refreshed because it depends (directly or indirectly) on a dirty BTT (i.e., it is known that the node's inputs have changed).

In block 1808, a call is performed to the Evaluate method of each node in the child reference(s) field 1208 of the current node, passing the Evaluation Start Time. From block 1808, control passes to block 1810.

As shown in block 1810, one or more calls are made to the Get Inserted Rows and Get Deleted Rows methods (also referable to as the Get Inserted Data Records method and Get Deleted Data Records method) of the TT object(s) for which the reference(s) was returned by the Evaluate method(s) of the called child node(s), passing those methods either: 1) the Evaluation Start Time and the Time of Last Refresh from the Time of Last Refresh field 1210 of the current node to retrieve incrementally inserted and deleted data records (if the current node supports incremental execution of the query plan operation); or 2) a suitably late time (e.g., MAX(Evaluation Start Time, Time of Last Update), infinity) and a suitably early time (e.g., 0) to retrieve all inserted and deleted data records (if the current node does not support incremental execution of the query plan operation, or if the node supports incremental execution of the query plan operation but nevertheless requires all inserted and deleted data records to perform the corresponding query plan operation (e.g., an incremental JOIN)). As discussed above, if the execution of a query plan operator, which has as input(s) a set of one or more temporal tables, includes accessing from at least one of those temporal tables only the incrementally inserted and deleted data records (the delta, as opposed to all data records), then the execution is an "incremental execution." In contrast, if the execution of a query plan operator, which has as input(s) a set of one or more temporal tables, requires accessing all of the inserted and deleted data records from all of the temporal tables in the set, then the execution is a "full execution." A given query plan operator may be implemented to perform incremental execution, full execution, or both (and in the case of both, it performs incremental execution when possible). From block 1810, control passes to block 1812.

In block 1812, the query plan operation of the current node is performed and the result merged into the DTT identified by the current node (identified in the TT reference field 1206). In one embodiment, the result is merged by calling the appropriate ones of the method(s) 1322 of the DTT identified by the TT reference field 1206 of the current node. From block 1812, control passes to block 1814.

In block 1814, the Time of Last Refresh of the current node is set [to the Time of Last Update if the Time of Last Update field 1216 is implemented OR the Evaluation Start Time if not], and control passes to block 1816.

In block 1816, a reference to a read-only copy, or a read-only view, of the DTT identified in the TT reference field 1206 of the current node is returned.

FIG. 19 is a flow diagram for the method(s) 1322 according to one embodiment. In block 1902, the BTT is updated by modifying the contents of the temporal table. In one embodiment, the BTTN calls the appropriate one(s) of the method(s) 1422 of the BTT identified in that BTTN's TT reference field 1306, and responsive to this call(s) the BTT updates the data in the TT field 1406. From block 1902, control passes to block 1904. In block 1904, in embodiments that implement the Notify Dirty method 1220, a call is made to the Notify Dirty method 1220 of the node(s) identified in the parent reference(s) field 1314 of the BTTN, passing the Time of Last Update.

FIG. 20 is a flow diagram for the Notify Dirty method 1220 according to one embodiment. In block 2002, the Time of Last Update field 1216 of the current node is set to the Time of Last Update that was passed. From block 2002, control passes to block 2004 in which a call is made to the Notify Dirty method of the node(s) in the parent reference(s) field 1214 of the current node, passing the Time of Last Update.

Subscriptions

Figure 21:
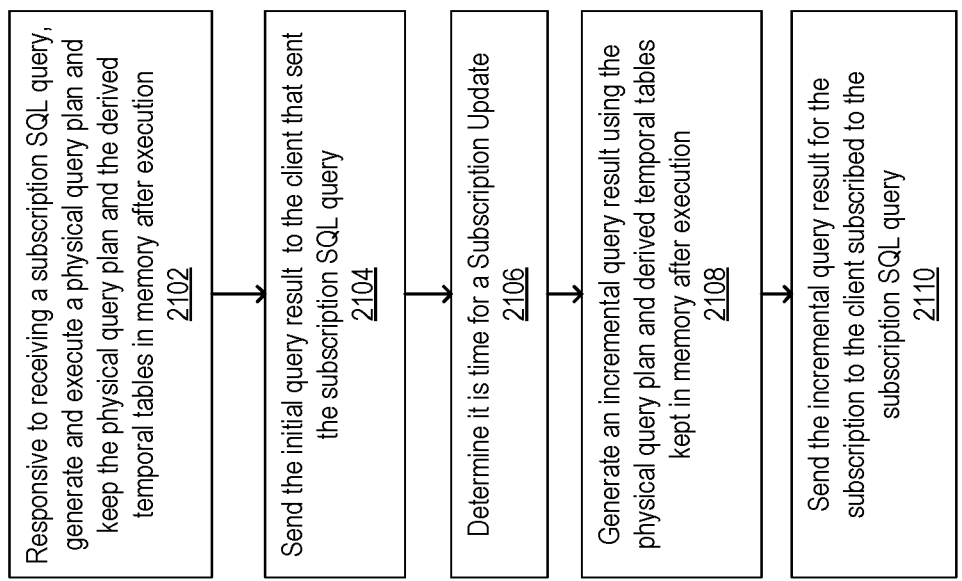
FIG. 21 is a flow diagram for a subscription SQL query according to one embodiment.

FIG. 21 is a flow diagram for a subscription SQL query according to one embodiment. In block 2102, responsive to receiving a subscription SQL query, the RDBMS generates and executes a physical query plan and keeps the physical query plan and the derived temporal tables in memory (i.e., in volatile memory, non-volatile memory, and/or combinations thereof) after execution. From block 2102, control passes to block 2104 in which the initial query result is sent to the client that submitted the subscription SQL query. Blocks 2102 and 2104 may be performed in the manner previously described. From block 2104, control passes to block 2106.

In block 2106, a determination is made that it is time for a subscription update. The purpose of the subscription update is to provide an update responsive to modification(s) of the contents of at least a given one of the temporal tables that is part of the temporal-relational database and that the subscription SQL query requires accessing data from. However, as previously described, different embodiments may respond to such modifications with different timing (e.g., immediately; in embodiments that support lazy update it is delayed until one or more events occur (e.g., a need to send a query result (e.g., initial or incremental) to a client, a fixed amount of time elapses, a programmable amount of time elapses, a calculated amount of time based the nodes and edges (e.g., based on the nodes' connectedness to other nodes, the types of the nodes, their historical use, etc.) elapses, the arrival rate of other SQL queries exceeds a threshold, and/or available computational resources falls below a threshold) as previously described). Further, different embodiments may allocate responsibility for performing block 2106 differently. By way of examples, a push model embodiment and a pull model embodiment are described later herein.

From block 2106, control passes to block 2108 in which an incremental query result is generated using the physical query plan and derived temporal tables kept in memory after execution. As previously described, incremental execution may be used to avoid full re-execution of query plan operations, and skipping update may be used to avoid execution of certain of the query plan operations. In addition, in one embodiment the incremental query result that is to be sent to the client includes only changes to the results that have already been sent to the client (an exemplary format is described later herein).

From block 2108, control passes to block 2110 in which the incremental query result for the subscription is sent to the client subscribed to the subscription SQL query. In embodiments that support multiple clients being simultaneously subscribed to the same SQL query, the incremental query result from the subscription may be sent to the multiple clients.

Figure 22:
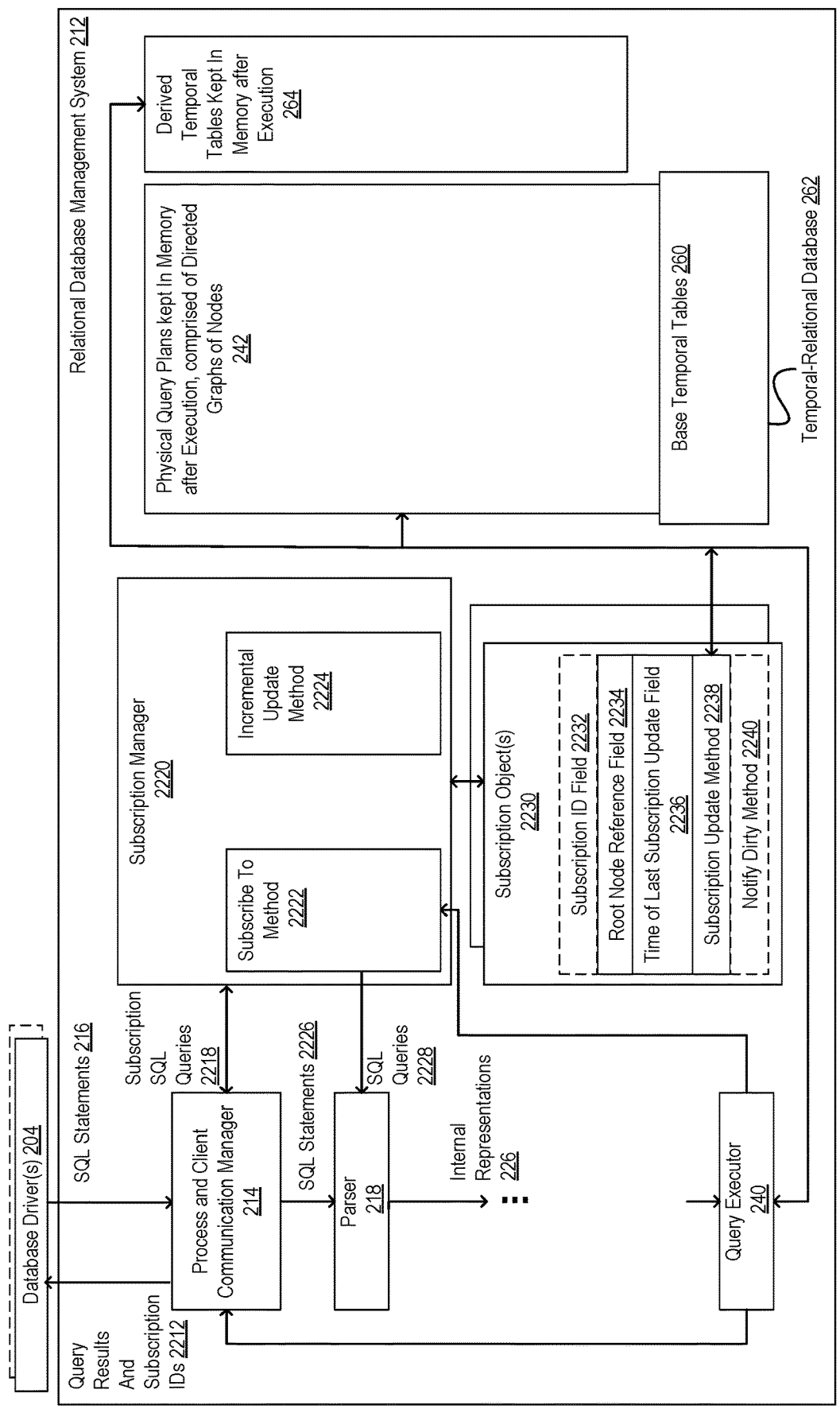
FIG. 22 is a block diagram illustrating the relational database management system 212 with additional blocks to support both non-subscription and subscription SQL queries according to one embodiment.

FIG. 22 is a block diagram illustrating the relational database management system 212 with additional blocks to support both non-subscription and subscription SQL queries according to one embodiment. FIG. 22 reproduces the following from FIG. 2: 1) the database driver(s) 204; 2) the relational database management system 212, including the process and client communication manager (PCCM) 214, the parser 218, the query executor 240, physical query plans 242, the base temporal tables 260 of the temporal-relational database 262, and the derived temporal tables 264. FIG. 22 also reproduces the SQL statements 216, which may include subscription SQL queries. The PCCM 214 routes such subscription SQL queries 2218 to a subscription manager 2220, which includes a Subscribe To method 2222 and an Incremental Update method 2224. In one embodiment, the PCCM 214 receives a "Subscribe To" remote procedure call from one of the database driver(s) 204 of the client that is sending the subscription SQL query, and the PCCM 214 calls the Subscribe To method 2222, passing the subscription SQL query. Again, the arrowed lines represent some type of coupling, such as data flow and/or connectivity.

The Subscribe To method 2222 1) transmits the SQL query part (2228) of the subscription SQL query to the parser 218 so that a physical query plan will be generated and executed, 2) receives the resulting initial query result from the query executor 240, and 3) causes the initial query result, along with a subscription identifier (ID), to be sent by the PCCM 214 to the client that submitted the subscription SQL query (see query results and subscription IDs 2212). In some embodiments, the Subscribe To method 2222 generates, for each subscription SQL query, a subscription ID that is unique among the current subscriptions, and returns that subscription ID (together with the initial query result) to the PCCM 214 to return to the one of the database drivers 204 for the client that sent the subscription SQL query; and the database driver retains the subscription ID for the subscription SQL query of the client. In alternative embodiments data identifying a "unique connection" over which the subscription SQL query was sent is used as the subscription ID (that is, the "unique connection" uniquely identifies the combination of a client and a subscription SQL query, such as by using a unique TCP connection for each subscription SQL query submitted by a given one of the database driver(s) 204). Further, the PCCM 214 transmits all other of the SQL statements 216 (those that are not subscription SQL queries 2218) to the parser 218 as before as illustrated by SQL statements 2226. The parser 218 generates the internal representations 226 as before.

The Subscribe To method 2222 also creates for each subscription SQL query a subscription object in the subscription object(s) 2230. Each of the subscription object(s) 2230 includes: 1) optionally, a Subscription ID (identifier) field 2232; 2) a Root Node Reference field 2234; 3) a Time of Last Subscription Update field 2236; 4) a Subscription Update method 2238; and 5) in an embodiment using the push model (which requires the dirty notification graphs), a Notify Dirty method 2240. The subscription ID field 2232 is to store the subscription ID for the subscription, which can be used for tracking purposes. The Root Node Reference field 2234 is to store a reference to the location in the physical query plans 242 of the root PQPN (e.g., DTTN) of the physical query plan generated for the subscription SQL query. The Time of Last Subscription Update field 2236 is to store a timestamp reflecting the time when the subscription was last updated. The Subscription Update method 2238, when executed, causes the execution of the physical query plan identified by its root node in the root node reference field 2234. The Notify Dirty method 2240 is executed responsive to a call to it from the root node identified in the Root Node Reference field 2234, which signifies that a modification has been made to a BTT from which data is accessed for the subscription SQL query. Execution of the Notify Dirty method 2240 causes the Subscription Update method 2238 to be executed. When initializing a subscription object, the subscription object calls the Add Parent method 1218 of the root node in the Root Node Reference field 2234 with a reference to that subscription object, and this Add Parent method 1218 stores the reference to the subscription object in the Parent Reference(s) field 1214 of that root node; this adds the subscription objects as parent nodes of the appropriate ones of the root nodes of the bidirectional query plan graphs so that the subscription objects are part of the generated dirty notification directed graphs. In operation, when a BTT is modified, the dirty notification directed graph is used to identify each node affected by the modification by making recursive calls from the root node of that dirty notification directed graph (e.g., the BTTN that encapsulates the modified BTT) up to the leaf nodes(s) of that dirty notification directed graph (which are each a root node of a query plan or a subscription object that was added on top of that root node), thereby allowing a dirty indication to flow through the intermediate node(s) and up to the root node(s) and/or subscription object(s) of the query plan(s) which consume that BTT.

The Incremental Update method 2224 facilitates determining incremental updates to the subscription SQL queries. The database driver(s) 204 and the Incremental Update method 2224 may be implemented differently in embodiments that implement the push or pull model as described later herein. For instance, the Incremental Update method 2224 may be called by a Get More Results method (not shown) of the database driver(s) 204 via a remote procedure call each time an update is desired in an embodiment implementing a pull model, while the Incremental Update method 2224 may be called once by a Listen method (not shown) of the database driver(s) 204 in an embodiment implementing a push model.

As previously described, in one embodiment, the query plan for a subscription SQL query, and derived temporal tables identified by the nodes of that query plan, are kept in memory after execution at least until the client that submitted that subscription SQL query submits a close subscription message for that subscription SQL query. Such a close subscription message may include, for example, the subscription ID to identify the subscription SQL query to close. In one embodiment, the PCCM 214 also send such close subscription messages (not shown) to the subscription manager 2220, which: 1) determines if one or more nodes of the physical query plan no longer need to be kept in memory after execution, and takes the necessary action to allow their removal and the removal of the corresponding entries in the cache 234 (e.g., removing the corresponding entry from the cache 234); and 2) deletes the subscription object for that subscription SQL query.

FIG. 23 is a flow diagram for the Subscribe To method 2222 according to one embodiment. In block 2302, the subscription SQL query is received and control passes to block 2304. In block 2304, the execution of the SQL query part of the subscription SQL query is caused. In one embodiment, this execution includes a physical query plan for the SQL query being generated and executed (involving the parser 218, the query rewriter 224, the query optimizer 230 (including the query plan connector 232), and the query executor 240—and thus, the generation may include the previously described reuse/incorporation of existing nodes and edges, and the execution may include incremental execution); for example, responsive to calls from the Subscribe To method 2222 which coordinates the initial execution of subscription SQL queries. From block 2304, control passes to block 2306.

In block 2306, responsive to receiving a reference to the root node of the physical query plan for the subscription SQL query from the query executor 240, a subscription object is created and initialized. In one embodiment, this initialization includes: 1) storing the subscription ID in the subscription ID field 2232 if implemented; 2) storing a reference to the root node of the physical query plan in the root node reference field 2234; 3) storing in the Time of Last Subscription Update field 2236 a sufficiently early time to ensure that on the first subscription update all updates are captured (e.g., the max of the valid_from and valid_to timestamps in the result table); and 4) in embodiments that implement the Add Parent methods 1280 and 1318, the Add Parent method 1218 of the root node in the Root Node Reference field 2234 is called with the reference to the subscription object being initialized.

From block 2306, control passes to block 2308. In block 2308, responsive to receiving the initial query result from the query executor 240, the initial query result is provided to the PCCM 214 to be sent to the client that submitted the subscription SQL query.

FIG. 24A is a flow diagram for the Incremental Update method 2224 according to an embodiment that implements a pull model. In this embodiment, each time an RDBMS client determines an update to a previously submitted subscription SQL query is desired, the client calls a Get More Results method in the database driver(s) 204. The Get More Results method makes a remote procedure call (RPC) to the RDBMS 212 for an incremental update of the subscription SQL query (in embodiments in which the subscription ID is a value generated by the Subscribe To method 2222, the subscription ID is sent by the database driver; in embodiments in which the subscription ID data identifies the unique connection over which the subscription SQL query was sent, the RPC is made over that unique connection, because the connection itself can be used to identify the subscription SQL query since the connection was previously established between the client and PCCM 214 in association with the subscription SQL query submission). Responsive to this, the PCCM 214 calls the Incremental Update method 2224, passing the subscription ID. In block 2402, such a call is received from the PCCM 214 and control passes to block 2404.

In block 2404, a call is made to the Subscription Update method 2238 of the subscription object identified by the subscription ID. While in one embodiment the subscription manager 2220 maintains a data structure (e.g., a table) that maps subscription IDs to the subscription object(s) 2230, alternative embodiments could use other types of well-known mechanisms to locate the appropriate one of the subscription object(s) 2230. From block 2404, control passes to block 2406.

As shown in block 2406, responsive to receiving the incremental query result from the Subscription Update method 2238 of the subscription object, the incremental query result is returned to the PCCM 214 to be sent to the client that desired an update to the previously submitted subscription SQL query. While in one embodiment the incremental query result is sent to the client by the PCCM 214 (which manages the connection and was called by the client), in another embodiment the Incremental Update method sends the incremental query result to the client via the unique connection over which the subscription SQL query was sent (e.g., using the subscription ID in an embodiment in which the subscription ID is data identifying the unique connection over which the subscription SQL query was sent).

FIG. 24B is a flow diagram for the Incremental Update method 2224 according to an embodiment that implements a push model. In a first such embodiment, after submitting the subscription SQL query, the client code calls once a Listen method in the database driver(s) 204 to receive push-based updates to the subscription SQL query. The Listen method makes a remote procedure call (RPC) to the RDBMS 212 for a particular subscription SQL query (in embodiments in which the subscription ID is a value generated by the Subscribe To method 2222, the subscription ID is sent by the database driver(s) 204; the subscription ID need not be sent in embodiments in which the subscription ID is data identifying the unique connection over which the subscription SQL query was sent, because the connection itself identifies the subscription SQL query since the connection was previously established between the client and PCCM 214 responsive to the subscription SQL query submission). Responsive to this, the PCCM 214 calls the Incremental Update method 2224, including data identifying the connection over which the subscription SQL query was sent (which is the subscription ID in some embodiments as previously described; in embodiments in which the subscription ID is a value generated by the Subscribe To method 2222, the subscription ID is also sent). In block 2412, such a call is received from the PCCM 214 and control passes to block 2414. While in the first embodiment described in this paragraph the subscription ID is provided from the Subscribe To method 2222 to the Incremental Update method 2224 indirectly through the client code, alternative embodiments operate differently. For example, in one such alternative embodiment, block 2302 includes data identifying a call back method (such as an "On Data Update" method, which can be passed as a function pointer, a function object, etc., to the Listen method, etc.) within the database driver; block 2308 includes providing the subscription ID from the Subscribe To method 2222 to the Incremental Update method 2224 within the RDBMS 212 (e.g., as an argument to the Incremental Update method, via an area of shared memory, via other inter-process communication mechanisms, etc.) as opposed to through the client code; in which case, block 2412 does not involve a call through the PCCM to listen responsive an RPC from the Listen method of the client code.

In block 2414, a subscription thread is created, with the subscription object and connection information, and it: 1) calls the Add Parent method 1218 of the root node in the root node reference field 2234 of the appropriate one of the subscription object(s) 2230, passing a reference to that subscription object; and the Add Parent method 1219 (as previously described), stores the reference to the subscription object in the parent reference(s) field 1214 of that root node; and 2) sleeps waiting for the Notify Dirty method 1220 of the subscription object to be called by the root node's Notify Dirty method. From block 2414, control passes to block 2416.

As shown in block 2416, each time the subscription thread is awakened by a call to the subscription object's Notify Dirty method 2240 (which is passed the Time of Last Update) from the Notify Dirty method 1220 of the root node, the subscription thread calls the Subscription Update method 2238 of the subscription object (passing it the Time of Last Update passed to it by the Notify Dirty method 2240), and then causes the incremental query result to be pushed to the client subscribed to the SQL query responsive to receiving the incremental query result from the Subscription Update method 2238 (e.g. via a blocking call from the database driver (e.g., an RPC), via sending data over the unique connection established with the database driver (e.g., via RPC streaming), etc.), and then goes back to sleep. While in one embodiment the incremental query result is sent to the client by the PCCM 214 (which manages the connection and was called by the client), in another embodiment the Incremental Update method 2224 sends the incremental query result to the client via the unique connection identified in the call to the Incremental Update method 2224 (e.g., using the subscription ID in an embodiment in which the subscription ID is data identifying the unique connection over which the subscription SQL query was sent). In embodiments where block 2302 includes data identifying a call back method in the database driver, the database driver calls that call back method to provide the incremental query result to such method.

FIG. 25 is a flow diagram for the Subscription Update method 2238 according to one embodiment. This flow diagram can be used embodiments that use the above described pull and push models. In block 2502, a call is made to the Evaluate method 1212 of the root node identified by the Root Node Reference field 2234 of the subscription object, passing an Evaluation Start Time. Different embodiments may set the Evaluation Start Time differently (e.g., set to Current time (e.g., system time as of when this method is called, the time the client calls the Incremental Update method (if it is sent with the method call), the time the call to the Incremental Update method is received (e.g., by the PCCM)) in the pull model and set to the Time of Last Update in the push model). From block 2502, control passes to block 2504.

In block 2504, calls are made to the Get Inserted Rows and Get Deleted Rows methods (also referable to as the Get Inserted Data Records method and Get Deleted Data Records method) of the TT object for which the reference or view was returned by the Evaluate Method of the called root node, passing those methods the Evaluation Start Time and the Time of Last Subscription Update from the Time of Last Subscription Update field 2236 of the subscription object. From block 2504, control passes to block 2506.

In block 2506, the incremental query result is created. In one embodiment, the incremental query result is a change list to be sent to the client. In one embodiment, the change list includes for each change (i.e., change to the temporal table (identified by the root node of the corresponding query plan) representing the previously-calculated query results): 1) the value in each column of the corresponding data record of such temporal table; 2) a change type (e.g., insert or delete); and 3) a timestamp identifying the time of the change. In one embodiment, the change list is generated from the data records returned in block 2504 by: 1) removing the "valid_from" and "valid_to" columns; 2) adding a "change type" column that stores the change type (which indicates for each data record whether that data record was inserted or deleted); and 3) adding a "Time of Change" column that stores the timestamp identifying the Time of the Change (which indicates for each data record when the data record was inserted or deleted). From block 2506, control passes to block 2508.

In block 2508, the Time of Last Subscription Update field 2236 of the subscription object is updated [to Evaluation Start Time in the pull model embodiment or Time of Last Update in the push model embodiment]. From block 2508, control passes to block 2510.

In block 2510, the incremental query result is caused to be sent to the client subscribed to the SQL query. In the embodiment that uses a pull model, the Subscription Update method 2238 is called by the Incremental Update method 2224 of the subscription manager 2220, and the incremental query result is sent back through the subscription manager 2220 to the client (which may send the incremental query result to the client through the PCCM 214 or to the client itself via the unique connection identified in the call to the subscription manager 2220). Alternative embodiments that use the pull model may operate differently (e.g., the Subscription Update method 2238 may send the incremental query result to the client itself via the unique connection identified in the call to the Subscription Update method 2238). Similarly, in embodiments that use a push model, responsibility for sending the incremental query result to the client may vary (e.g., the subscription thread may send it to the PCCM 214, which sends it to the client; the Subscription Update method 2238 may send the incremental query result to the client itself via the unique connection identified in the call to the Subscription Update method 2238).

Exemplary Use Cases

Various ones of the above embodiments may be combined to satisfy certain use cases. By way of example, one use case is incremental risk aggregation for financial markets. This use case typically requires complex analytics on a combination of near real-time data with large amounts of historical data (to provide a long-term view) by multiple end users at different user electronic devices using dashboards. Certain embodiments support this use case with the user interface layer 1100 and relational database management system 212 of FIG. 11. Specifically, the user interface layer 1100 supports the use of dashboards, including the same dashboard being presented to multiple, in fact many, end users on different end user electronic devices simultaneously (thereby, resulting in multiple simultaneous overlapping query plans); and in certain embodiments self-service end user dashboards to create, edit and share dashboards and enable data discovery. The relational database management system 212 (which in certain embodiments is an in-memory and analytical relational database management system) manages a temporal-relational database, is a server supporting multiple clients simultaneously, supports multiple SQL queries (including subscription SQL queries) simultaneously, keeps query plans in memory after execution (including root and intermediate PQPNs), keeps derived temporal tables for those query plans in memory after execution (including for the root and intermediate PQPNs), supports overlapping query plans (including the sharing of intermediate and leaf PQPNs), and supports incremental query plan execution for at least certain query plan operators. Thus, the content elements in the dashboard(s), in some such embodiments, can be updated in near real-time. This near real-time performance, including for SQL queries of relatively large query depth, is particularly suited for incremental risk aggregation for financial markets. Additionally or alternatively, in some embodiments the RDBMS 212 is a transactional RDBMS and the temporal tables (BTTs and DTTs) are stored in-memory using a column-oriented organization.

Further, in certain such embodiments, the user interface layer 1100 supports self-service end user dashboards relying on a BI query language, and the BI service 1102 converts such language into SQL statements (including SQL queries) before transmitting them to the relational database management system 212. In one such embodiment, both the BI query language and SQL have been extended to support subscriptions as described herein, such that a BI query language subscription is converted into a subscription SQL query that is submitted to the relational database management system 212.

Exemplary Electronic Devices

One or more parts of an embodiment may be implemented using different combinations of software, firmware, and/or hardware. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), Flash memory, phase change memory, solid state drive (SSD)) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory (with slower read/write times, e.g., magnetic disks, optical disks, read only memory (ROM), Flash memory, phase change memory, SSDs) containing the code since the non-volatile memory can persist code/data even when the electronic device is turned off (when power is removed), and while the electronic device is turned on that part of the code that is to be executed by the processor(s) of that electronic device is copied from the non-volatile memory into volatile memory (e.g., dynamic random access memory (DRAM), static random access memory (SRAM)) of that electronic device because volatile memory has faster read/write times (and some of all of the data to be operated on is also stored in this volatile memory). As another example, an electronic device may include a non-volatile memory (e.g., phase change memory) to store the code/data when the electronic device is turned off, and that same non-volatile memory has sufficiently fast read/write times such that, rather than copying that part of the code to be executed into volatile memory, the code/data may be provided directly to the processor(s) (e.g., loaded into a cache of the processor(s)); in other words, this non-volatile memory operates as both long term storage and main memory, and thus the electronic device may have no or only a small amount of DRAM for main memory. Typical electronic devices also include a set of one or more physical network interface(s) to establish network connections (to transmit and/or receive code and/or data using propagating signals) with other electronic devices.

Figure 26:
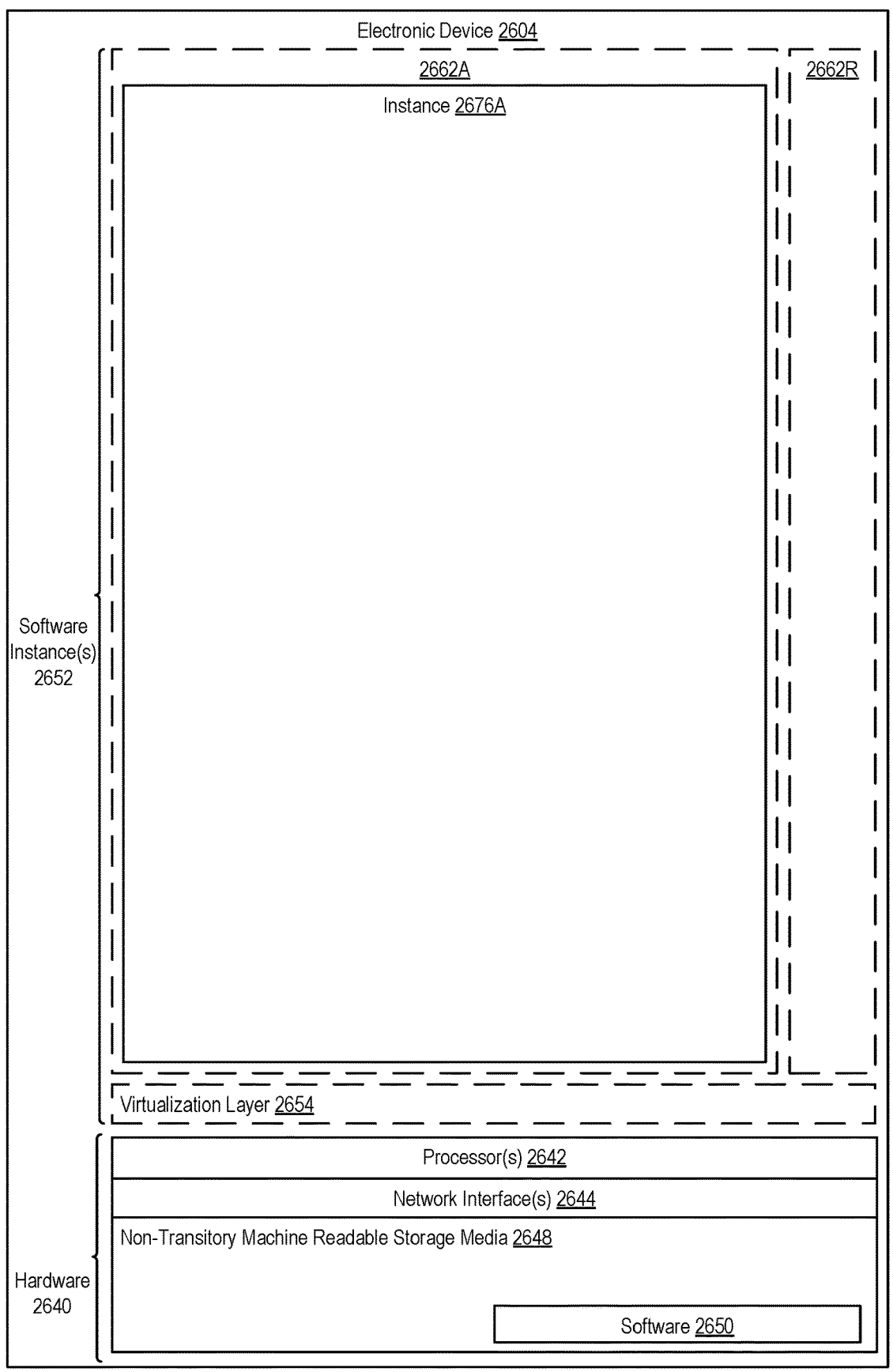
FIG. 26 illustrates an electronic device 2604 according to one embodiment.

FIG. 26 illustrates an electronic device 2604 according to one embodiment. FIG. 26 includes hardware 2640 comprising a set of one or more processor(s) 2642 and a set or one or more network interfaces 2644 (wireless and/or wired), as well as non-transitory machine-readable storage media 2648 having stored therein software 2650. Each of the previously described end user clients, the BI service, and the relational database management system 212 may be implemented in one or more electronic devices 2604. In one embodiment, each of the end user clients is implemented in a separate one of the electronic devices 2604 (e.g., in an end user electronic device operated by an end user; in which case, the software 2650 in each such end user electronic device includes the software to implement one of the end user clients, including one of the database driver(s) 204 and/or software to interface with a BI service 1102 (e.g., an API, a web browser, a native client, a BI portal, a command-line interface, etc.)) and the relational database management system 212 is implemented in a separate set of one or more of the electronic devices 2604 (in which case, the software 2650 is the software to implement the relational database management system 212); in operation, the end user electronic devices and the electronic device(s) implementing the RDBMS would be commutatively coupled (e.g., by a network) and would establish between them (or through one or more other layers (e.g., BI services, which may be implemented in a set of one or more electronic devices that is separate from, overlapping with, or the same as the set of one or more electronic devices on which the RDBMS is implemented (in which case, the software 2650 includes the software to implement the BI service))) the above discussed connections for submitting SQL queries to the RDBMS 212 and returning query results. Other configurations of electronic devices may be used in other embodiments (e.g., an embodiment in which the end user client, the BI service if used, and the RDBMS are implemented on a single electronic device).

In electronic devices that use compute virtualization, the processor(s) 2642 typically execute software to instantiate a virtualization layer 2654 and software container(s) 2662A-R (e.g., with operating system-level virtualization, the virtualization layer 2654 represents the kernel of an operating system (or a shim executing on a base operating system) that allows for the creation of multiple software containers 2662A-R (representing separate user space instances and also called virtualization engines, virtual private servers, or jails) that may each be used to execute a set of one or more applications; with full virtualization, the virtualization layer 2654 represents a hypervisor (sometimes referred to as a virtual machine monitor (VMM)) or a hypervisor executing on top of a host operating system, and the software containers 2662A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 2650 (illustrated as instance 2676A) is executed within the software container 2662A on the virtualization layer 2654. In electronic devices where compute virtualization is not used, the instance 2676A on top of a host operating system is executed on the "bare metal" electronic device 2604. The instantiation of the instance 2676A, as well as the virtualization layer 2654 and software containers 2662A-R if implemented, are collectively referred to as software instance(s) 2652.

Alternative embodiments of an electronic device may have numerous variations from that described above. For example, customized hardware and/or accelerators might also be used in an electronic device.

Alternative Embodiments

While the flow diagrams in the figures show a particular order of operations performed by certain embodiments, such order is exemplary (e.g., alternative embodiments may perform the operations in a different order, combine certain operations, perform certain operations in parallel, etc.).

In addition, while the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A non-transitory machine-readable storage medium having stored thereon computer program code, which when executed by a set of one or more processors, causes the processors to perform operations comprising:

responsive to receiving at a relational database management system a plurality of structured query language (SQL) queries that will require accessing data from temporal tables of a temporal-relational database managed by the relational database management system, executing the plurality of SQL queries to generate a query result for each, the executing the plurality of SQL queries including:
  generating and executing a plurality of query plans that are kept in memory after execution, wherein the generating includes,
    determining that at least part of an earlier generated one of the plurality of query plans can be incorporated into another of the plurality of query plans that is still being generated;
    incorporating the part of the earlier generated one of the query plans into the another one of the plurality of query plans, wherein each of the plurality of query plans comprises a directed graph of nodes connected by edges, wherein each of the directed graphs represents an ordered set of query plan operators that when executed generates the query result for one of the plurality of SQL queries, wherein each of the nodes of the directed graphs represents one of the query plan operators, wherein each of the directed graphs is connected by at least one of its edges to at least one node of another of the directed graphs such that those directed graphs share at least one node, wherein at least one of the nodes of each of the directed graphs identifies one of the temporal tables of the temporal-relational database, and wherein at least another of the nodes of each of the directed graphs identifies a temporal table that is kept in memory after execution and that was created to store a result of executing the query plan operator represented by that node; and
  transmitting the query result for each of the plurality of SQL queries to one or more clients that transmitted that SQL query to the relational database management system.

2. The non-transitory machine-readable storage medium of claim 1, wherein each of the nodes of the directed graphs identify one of the temporal tables of the temporal-relational database or one of the temporal tables that was created to store the result of executing the query plan operator represented by that node.

3. The non-transitory machine-readable storage medium of claim 1, wherein at least two of the plurality of query plans share a subgraph of the nodes and at least one edge.

4. The non-transitory machine-readable storage medium of claim 1, wherein one of the plurality of query plans is generated and executed prior to another of the plurality of query plans being generated and executed.

5. The non-transitory machine-readable storage medium of claim 1, wherein each of the temporal tables that was created to store the result of executing one of the query plan operators is kept in memory for at least as long as the node that identifies that temporal table is kept in memory after execution.

6. The non-transitory machine-readable storage medium of claim 1, wherein each of the directed graphs starts with a root node, includes one or more intermediate nodes, and ends in one or more leaf nodes, wherein the root node and the one or more intermediate nodes of each directed graph each identify for that node one or more other of the nodes of that directed graph as child nodes, wherein each of the query plan operators represented by each of the root node and intermediate nodes operates on the one or more of the temporal tables identified by the one or more child nodes of that node.

7. The non-transitory machine-readable storage medium of claim 6, wherein execution of the query plan operator represented by each of the one or more leaf nodes results in retrieving data from one of the temporal tables in temporal-relational database.

8. The non-transitory machine-readable storage medium of claim 6, wherein the generating and executing the plurality of query plans includes,
  maintaining, for each of the nodes of the query plans, a key that is based on that node and that node's zero or more identified child nodes.

9. The non-transitory machine-readable storage medium of claim 6, wherein the generating and executing the plurality of query plans includes,
  maintaining, for each of the nodes of the query plans, a key that represents just that part of the query plans that include that node and its descendants, if any, but does not represent any parts of the query plans represented by any ancestor nodes of that node.

10. The non-transitory machine-readable storage medium of claim 1 further comprising:
  responsive to modifying contents of at least a given one of the temporal tables that is part of the temporal-relational database and that at least one of the plurality of SQL queries requires accessing data from, performing the following,
    incrementally updating those of the temporal tables identified by those of the nodes that are of the directed graph of the query plan for the at least one of the plurality of SQL queries and that depend directly or indirectly upon the node that identifies the given one of the temporal tables; and
    transmitting, to those of the clients that submitted the at least one of the plurality of SQL queries, an incremental update to the query result for the at least one of the plurality of SQL queries.

11. The non-transitory machine-readable storage medium of claim 1, further comprising:
  transmitting, for the one of the plurality of SQL queries to the one of the clients that transmitted that SQL query to the relational database management system, data that identifies changes to the query result that satisfies that SQL query since that client was last sent that query result.

12. The non-transitory machine-readable storage medium of claim 1, wherein one or more of the query plan operators perform temporal-relational algebra operations.

13. The non-transitory machine-readable storage medium of claim 1, wherein each of the plurality of query plans is kept in memory after execution for at least as long as at least one of the clients is to receive updates to the one of the plurality of SQL queries for which that query plan was generated.

14. The non-transitory machine-readable storage medium of claim 1, further comprising:
  responsive to receiving at the relational database management system another SQL query that will require accessing data from the temporal-relational database managed by the relational database management system, generating and executing another query plan, wherein the another query plan comprises a directed graph of nodes connected by edges, wherein the directed graph of the another query plan represents an ordered set of query plan operators that when executed generates the query result for the another query plan, wherein the directed graph for the another query plan is connected by at least one of its edges to at least one node of another of the directed graphs such that those directed graphs share at least one node, wherein at least one of the nodes of the directed graph for the another query plan identifies one of the temporal tables of the temporal-relational database, and wherein at least one of the nodes of the directed graph for the another query identify a temporal table that is kept in memory after execution and that was created to store a result of executing the query plan operator represented by that node.

15. The non-transitory machine-readable storage medium of claim 14, wherein:
   each of the directed graphs starts with a root node, includes one or more intermediate nodes, and ends in one or more leaf nodes, wherein the root node and the one or more intermediate nodes of each directed graph each identify for that node one or more other of the nodes of that directed graph as child nodes;
   the generating the plurality query plans includes,
      maintaining, for each of the nodes of the plurality of query plans, a key that is based on that node and that node's one or more identified child nodes; and
   the generating and executing the another query plan includes determining that the directed graph for the another query plan may be connected by at least one of its edges to at least one node of another of the directed graphs based on one or more of the keys.

16. The non-transitory machine-readable storage medium of claim 1, wherein the plurality of SQL queries includes a first SQL query and a second SQL query that were received by the relational database management system, wherein the generating and executing the plurality of query plans includes generating a first of the plurality of query plans for the first SQL query and a second of the plurality of query plans for the second SQL query, and wherein the directed graph for the second query plan is connected by at least one of its edges to at least one node of the directed graph for the first query plan such that those directed graphs share at least one node.

17. The non-transitory machine-readable storage medium of claim 16, wherein the at least one node shared by the directed graphs for the first and second query plans is one that was created to store the result of executing the query plan operator represented by that node.

18. The non-transitory machine-readable storage medium of claim 16, wherein the generating and executing of the second query plan includes incrementally executing at least the query plan operator represented by the at least one node shared by the directed graphs for the first and second query plans.

19. The non-transitory machine-readable storage medium of claim 16, wherein the first SQL query and the second SQL query were received by the relational database management system to respectively populate a first dashboard content element and a second dashboard content element.

20. The non-transitory machine-readable storage medium of claim 19, wherein the first dashboard content element and the second dashboard content element are part of different dashboards to be displayed by different end user clients.

21. The non-transitory machine-readable storage medium of claim 19, wherein the first dashboard content element and the second dashboard content element are part of a same dashboard to be displayed by a same end user client.

22. The non-transitory machine-readable storage medium of claim 16, wherein the first SQL query was transmitted as a subscription SQL query.

23. The non-transitory machine-readable storage medium of claim 22, wherein the second SQL query was received after the first query plan was generated and while the first query plan was being kept in memory after execution because of the subscription SQL query.

24. The non-transitory machine-readable storage medium of claim 1, wherein each of the edges connecting one of the nodes to another of the nodes represents that they are respectively a parent node and a child node relative to each other and that the results of the child node are accessible by the parent node.

25. The non-transitory machine-readable storage medium of claim 1, wherein:
   the determining includes identifying at least one of the nodes that is part of an earlier generated one of the directed graphs and that may be reused; and
   the incorporating includes adding to the one of the directed graphs an edge connected to the one of the nodes that is part of the earlier generated one of the directed graphs.

26. The non-transitory machine-readable storage medium of claim 25, wherein the one of the nodes to which the added edge is connected is one of the nodes that identify temporal tables that were created to store the result of executing the query plan operator represented by that node, and wherein the generating and executing includes:
   as part of executing the one of the directed graphs, reusing, including incrementally updating as necessary, the temporal table identified by the one of the nodes to which the added edge was connected.

27. The non-transitory machine-readable storage medium of claim 1, wherein the generating and executing includes incrementally executing at least the query plan operator represented by one of the nodes shared by two of the directed graphs.

28. The non-transitory machine-readable storage medium of claim 4, wherein at least two of the plurality of query plans share a subgraph of the nodes and at least one edge.

29. The non-transitory machine-readable storage medium of claim 13, wherein at least two of the plurality of query plans share a subgraph of the nodes and at least one edge.

30. The non-transitory machine-readable storage medium of claim 25, wherein at least two of the plurality of query plans share a subgraph of the nodes and at least one edge.

* * * * *